United States Patent
Kojima et al.

[11] Patent Number: 5,815,221
[45] Date of Patent: Sep. 29, 1998

[54] PROJECTOR APPARATUS

[75] Inventors: Masanori Kojima; Ko Nishino, both of Kyoto; Yasuhito Myoi, Hyogo; Masaaki Tanaka, Hyogo; Teruo Miyamoto, Hyogo; Fumio Suzuki, Kyoto; Fumio Itoh, Kyoto; Yoshisuke Otsuru, Kyoto, all of Japan

[73] Assignee: Mitsubishi Denki Kabushiki Kaisha, Tokyo, Japan

[21] Appl. No.: 565,249

[22] Filed: Nov. 30, 1995

[30] Foreign Application Priority Data

Dec. 1, 1994 [JP] Japan ................................ 6-298462

[51] Int. Cl.$^6$ ........................................ H04N 9/31
[52] U.S. Cl. .............................. 348/751; 348/750
[58] Field of Search .................... 348/751, 750, 348/756, 744, 766, 761, 790, 760, 757, 196, 758, 779, 781, 764, 749, 791, 745, 753, 115, 755, 804; H04N 9/31, 5/74

[56] References Cited

U.S. PATENT DOCUMENTS

| | | |
|---|---|---|
| 3,588,324 | 6/1971 | Marle . |
| 5,028,121 | 7/1991 | Baur et al. . |
| 5,534,949 | 7/1996 | Baron ........................ 348/742 |
| 5,629,743 | 5/1997 | Lee et al. .................... 348/751 |
| 5,642,125 | 6/1997 | Silverstein ................. 348/751 |
| 5,663,775 | 9/1997 | Kawamura et al. .......... 348/751 |

FOREIGN PATENT DOCUMENTS

| | | |
|---|---|---|
| 0274391 A2 | 7/1988 | European Pat. Off. . |
| 0283290 A2 | 9/1988 | European Pat. Off. . |
| 0372905 A2 | 6/1990 | European Pat. Off. . |
| 0463500 A1 | 1/1992 | European Pat. Off. . |
| 0523988 A1 | 1/1993 | European Pat. Off. . |
| 0560636 A1 | 9/1993 | European Pat. Off. . |
| 1512355 | 7/1969 | Germany . |
| 4025136 A1 | 8/1990 | Germany . |
| 3-152526 | 6/1991 | Japan . |
| 3-296030 | 12/1991 | Japan . |
| 4-267246 | 2/1992 | Japan . |
| 2089616 | 6/1982 | United Kingdom . |
| 2195854 | 4/1988 | United Kingdom . |
| WO 85/01630 A1 | 4/1985 | WIPO . |
| WO 87/01896 A1 | 3/1987 | WIPO . |

OTHER PUBLICATIONS

"A Polarization–Transforming Optics for a High–Luminance LCD Projector", Shinsuke Shikama et al., Jun. 24, 1992.

"Light–Valve Technologies for High–Definition Television Projection Displays", R. Gerhard–Multhaupt, 1991.

*Primary Examiner*—Michael Lee

[57] ABSTRACT

A polarizing beam splitter extracts orthogonally polarized light beams from natural light and distributes those to liquid crystal panels, which modulate polarization states of those polarized light beams in accordance with a luminance signal and chrominance signals of video signals, respectively. The modulated light beams are combined by the same polarizing beam splitter, and the combined light is enlarged and projected onto a screen by a projection lens, to reproduce a projected image.

14 Claims, 17 Drawing Sheets

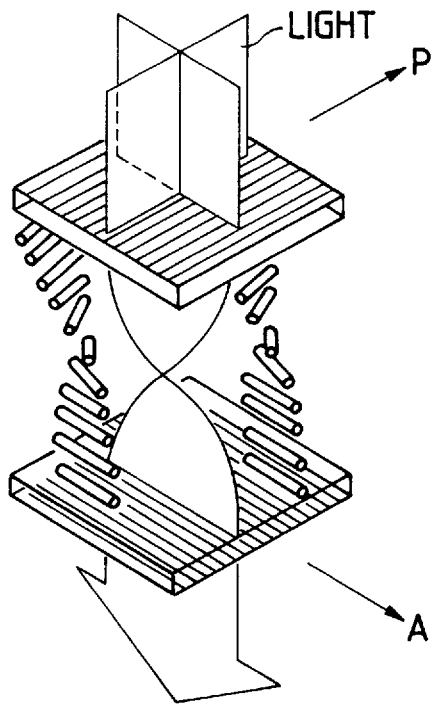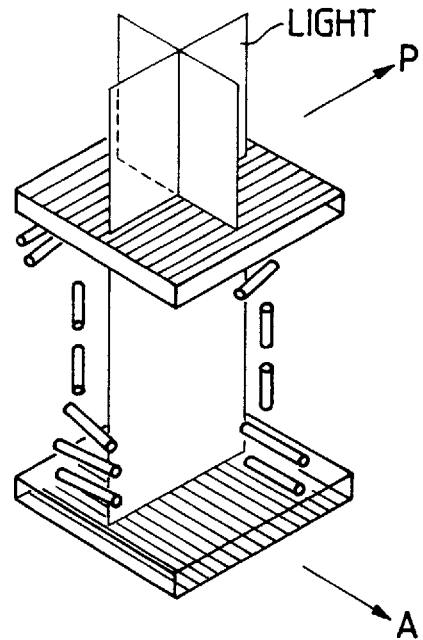
FIG. 27A PRIOR ART
FIG. 27B PRIOR ART

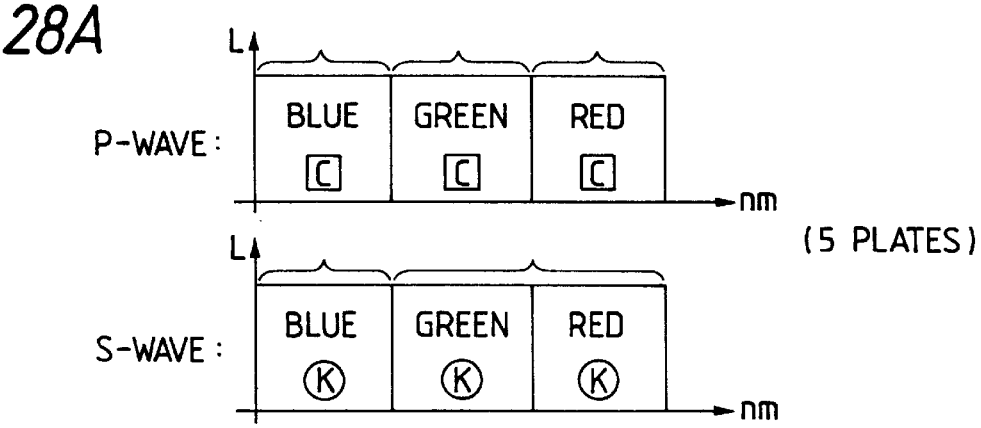
FIG. 28A (5 PLATES)
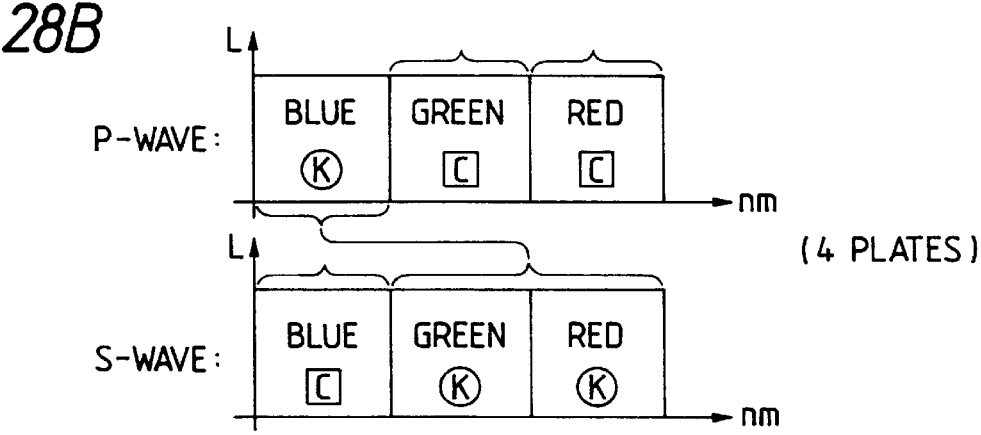
FIG. 28B (4 PLATES)
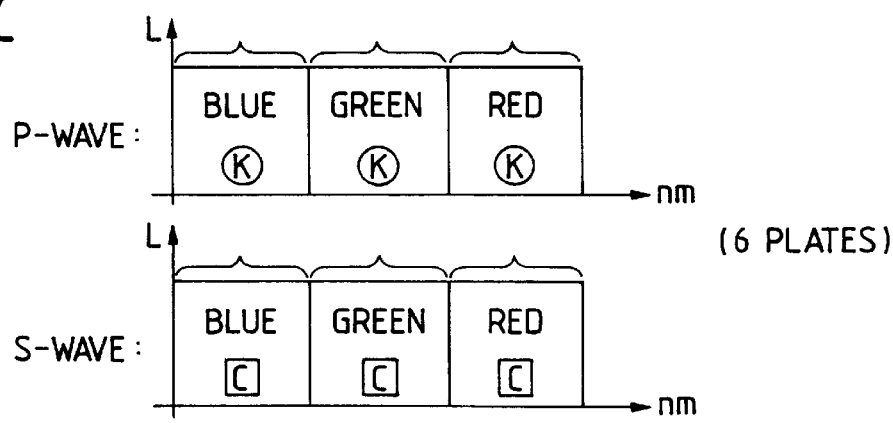
FIG. 28C (6 PLATES)

PROJECTOR APPARATUS

BACKGROUND OF THE INVENTION

1. Field of the Invention

The present invention relates to a projector apparatus using liquid crystal panels as a light modulating means. More particularly, the present invention concerns a projector apparatus which employs an optical system in which optical elements for absorbing light, such as a polarizer, an analyzer, and a color filter, are not disposed in the path of the optical system, and the light which does not contribute to the formation of a projected image is returned to a light source so as to be reutilized.

More specifically, the present invention concerns a projector apparatus provided with an optical system which has the following characteristic features: Preprocessing of light is effected in which two beams of polarized light which are perpendicular to each other are obtained from emergent light (i.e., natural light or light in which various states of polarization are mixed) from a light source by using such as a polarizing beam splitter as a polarizing optical means. Concurrently, the two beams of the polarized light which are perpendicular to each other are distributed to light modulating means for video signals. At this time, since the directions of polarization are already set in the preprocessing of the light, the directions of polarization of the light are controlled on the basis of video signals for each color without using optical elements which absorb the light (by approx. 50%), such as a polarizer and an analyzer for arranging the direction of polarization before and after the light modulating means. In this configuration, the two beams of the optically modulated light are optically combined by the polarizing beam splitter. A light distributing means and a light combining means are formed by the single polarizing beam splitter, so that the configuration provided is such that the polarized light which does not contribute to the image formation can be returned to a light collecting means so as to reutilize the light from the light source.

2. Description of the Related Art

FIG. 26 shows a schematic diagram of an optical system of a conventional video projector apparatus.

In FIG. 26, reference numerals 10 and 10A denote lamps; 11 and 11A denote reflecting mirrors; 1 and 1A denote projecting light sources constituted by the lamp 10 and the reflecting mirror 11, and the lamp 10A and the reflecting mirror 11A, respectively; 700, 700A, 700B, and 700C denote polarizers; 640 denotes a high-resolution liquid crystal panel; 2 denotes a luminance-signal light modulating means constituted by the high-resolution liquid crystal panel 640 and the polarizers 700 and 700A; 630 denotes a low-resolution liquid crystal panel; 32 denotes a color filter; 3 denotes a chrominance-signal light modulating means constituted by the polarizers 700B and 700C, the low-resolution liquid crystal panel 630, and the color filter 32; 4 denotes a projection lens for enlarging and projecting an image formed by the luminance-signal light modulating means 2 onto a screen 6; and 4A denotes a projection lens for enlarging and projecting an image formed by the chrominance-signal light modulating means 3 onto the screen 6. Here, the aforementioned liquid crystal panels 630 and 640 are, in general, 90° twisted nematic (TN) liquid crystal panels.

FIGS. 27A and 27B illustrate the operation of the 90° twisted nematic (TN) liquid crystal panel (Kobayashi: "Color Liquid Crystal Display," Sangyo Tosho Shuppan Co., Ltd., 1st edition on Dec. 14, 1990, page 1). FIG. 27A shows a state in which, when the voltage applied to the liquid crystal panel is off (=0), of the emergent light, the polarized light aligned with the direction of a polarizing plate (or polarizer) is transmitted through the polarizing plate, is then twisted 90°, and passes through an emergent-side polarizing plate (or polarizer or analyzer). On the other hand, FIG. 27B shows the case where the voltage applied to the liquid crystal panel is on, and shows that the incident light is shielded (blocked) by the emergent-side polarizing plate (or the polarizer or the analyzer). Incidentally, the description of the TN liquid crystal panel is given as an example in which the direction of polarization is controlled while maintaining the state of the linearly polarized light.

Next, a description will be given of operation. The projecting light sources 1 and 1A are constituted by the lamp 10 and the reflecting mirror 11 and the lamp 10A and the reflecting mirror 11A, respectively, and emit white emergent light 101 and 101A which is substantially parallel.

So-called white light sources, such as metal halide lamps, xenon lamps, and halogen lamps, are used as the lamps 10 and 10A. The reflecting surfaces of the reflecting mirrors 11 and 11A are light collecting means, and are basically paraboloidal. As the light-emitting center of each of the lamps 10 and 10A is disposed at the substantially focal position of the paraboloid, the emergent light 101 and 101A which is substantially parallel can be obtained. The arrangement of each of the emergent light 101 and 101A shall be the same in the subsequent embodiments as well.

The emergent light 101 and 101A, which is natural light polarized in various directions, is made incident upon the luminance-signal light modulating means 2 and the chrominance-signal light modulating means 3, respectively. The natural light incident upon the respective modulating means is converted to linearly polarized light by the polarizer 700 or 700B, and after it is made incident upon the liquid crystal panel 640 or 630, the linearly polarized light is converted to a polarized state corresponding to the voltage applied to the liquid crystal panel (e.g., elliptically polarized light). As a result, a linearly polarized light component oriented in a particular direction is obtained by the emergent-side polarizer (also called the analyzer) 700A or 700C. As the light is thus transmitted through the respective modulating means, the light is subjected to the control of the intensity of light, i.e., optical modulation. The light beams subjected to the optical modulation are projected onto and combined on the screen 6 by the projection lenses 4 and 4A, respectively, thereby forming an image.

In the above-described configuration, if the polarizers 700 (or 700B) and 700A (or 700C) are arranged with their polarization directions set perpendicular to each other, the configuration becomes that of a so-called normally white system in which the screen becomes a white screen when the voltage applied to the liquid crystal panel is zero. If, on the other hand, if these polarizers are arranged with their polarization directions set parallel to each other, the configuration becomes that of a so-called normally black system in which the screen is black when the voltage applied to the liquid crystal panel is zero. FIGS. 27A and 27B, when viewed in this light, show the configuration of the normally white system.

Since the conventional apparatus is arranged as described above, more than 50% of the light from the lamps is absorbed by the polarizers, the color filter, and the like, and the quantity of light contributing to the image formation by the light modulating means using the liquid crystal panels decreases, so that the light has not been effectively utilized.

For this reason, there has been a problem in that it is difficult to obtain a bright image. Further, since the light absorbed by the color filter and the like is converted to heat to increase the temperature of such as the polarizers and the element fitted with the color filter, the polarizers or the color filter is liable to deteriorate, and the life of the polarizers has been short as a result.

In addition, two light sources and two projection lenses are required for the luminance-signal light modulating means and the chrominance-signal light modulating means, and both the light sources and the projection lenses are large and heavy in terms of the volume and weight as the projector apparatus. Consequently, there has been problems in that the apparatus becomes large in size and high in cost.

Furthermore, since the luminance-modulated image and the chrominance-modulated image are separately superposed on each other on the screen, each time the distance between the projection lenses and the screen is changed, it has been necessary to adjust the angle of projection formed by the normal line of the screen and the central axis of each of the projection lenses for luminance and chrominance. Moreover, since the image is projected at an angle with respect to the screen, the image becomes optically trapezoidal. Hence, there has been a problem in that it is necessary to devise various measures for inversely correcting the same (devise the lenses).

SUMMARY OF THE INVENTION

The present invention has been devised to overcome the above-described problems, and its object is to provide a projector apparatus which makes it possible to obtain a bright image by mean of an optical configuration for making effective use of the light, wherein the optical system employs no polarizers to reduce the amount of light absorption by the optical system after the emergent light from the light source is processed in advance into perpendicular polarized light. Another object of the present invention is to provide a projector apparatus which is more compact and inexpensive by reducing the number of component parts of the optical system, particularly the light source and the projection lens, and which, even if the distance between the projection lens and the screen is changed, does not require adjustment of the projecting angle on each such occasion as in the conventional example, and in which the optical system can be handled easily only by the adjustment of the focusing of the projection lens.

The objects of the invention are achieved by providing a first configuration in which video-signal light modulating means is comprised of the luminance-signal light modulating means and the chrominance-signal light modulating means for the luminance signal and the chrominance signal of video signals. The emergent light from the light collecting means is distributed toward the luminance-signal light modulating means and the chrominance-signal light modulating means by the polarizing optical means constituting the first light distributing means. Polarized light beams whose polarization states are respectively controlled by the luminance-signal light modulating means and the chrominance-signal light modulating means are combined by the polarizing optical means constituting the first light combining means, and image based on the combined light is enlarged and projected onto the screen by the projecting means.

Here, each light modulating means performs optical modulation by controlling the polarization state of the polarized light distributed and made incident by the first light distributing means on the basis of the luminance video signal or the chrominance video signal.

Then, the optically modulated light beams whose polarization states are controlled are combined by the polarizing optical means constituting the first light combining means.

In other words, an optical system concerning the polarization control of light and optical modulation are used. Here, in a second configuration a set of polarized light beams are mutually perpendicular.

Particularly in the first configuration above, the polarizing optical means not only optically distributes the light into a set of mutually perpendicular polarized light beams or combines a set of mutually perpendicular polarized light beams, but a polarizing optical means which optically distributes the light into a plurality of sets of mutually perpendicular polarized light beams or is adapted for a plurality of mutually perpendicular polarized light beams is used.

In the third configuration, the luminance-signal light modulating means and the chrominance-signal light modulating means are constituted by reflection-type light modulating means for reflecting the optically modulated light, and the distribution of the emergent light from the light collecting means toward the luminance-signal light modulating means and the chrominance-signal light modulating means is effected by the polarizing optical means serving as the first light distributing means. The reflected light beams from the luminance-signal light modulating means and the chrominance-signal light modulating means are combined by jointly using as the light combining means the same polarizing optical means as the first light distributing means used for distributing the light, so as to project a color image onto the screen.

In the fourth configuration, the light modulating means for the luminance signal and the chrominance signal constituting the video-signal light modulating means of claim 1 are set to be transmission-type light modulating means. In other words, the luminance-signal light modulating means and the chrominance-signal light modulating means are constituted by the transmission-type light modulating means for transmitting the optically modulated light.

In the fifth configuration, both of the luminance-signal light modulating means and the chrominance-signal light modulating means are constituted by the light modulating means of the transmission type or the reflection type for transmitting or reflecting the optically modulated light, and the distribution of the emergent light from the light collecting means toward the luminance-signal light modulating means and the chrominance-signal light modulating means is carried out by the first light distributing means. However, in the distribution of light toward the two modulating means, either one of the emergent light from the luminance-signal light modulating means or the chrominance-signal light modulating means which does not contribute to image formation is redistributed as light incident upon at least one of the light modulating means, i.e., the chrominance-signal light modulating means or the luminance-signal light modulating means. Thus, the second light distributing means for making effective use of the light is configured.

In the sixth through twelfth configurations, the basic arrangement provided is such that, in addition to the first light distributing means for merely distributing the emergent light uniquely in the configuration according to claim 1, there is provided light-quantity distributing means including at least polarization controlling means for determining a ratio of quantities of light for transmission and/or reflection of the mutually perpendicular polarized light beams in the optical path of the light distributing means. In other words, the polarization controlling means includes light distributing means for distributing quantities of light to the respective light modulating means for the luminance video signal and the chrominance video signal at the predetermined ratio determined by the polarization controlling means.

In the seventh configuration, in particular, the polarization controlling means (with the light distributing means) which constitutes the light-quantity distributing means is comprised of polarizing optical means having different polarizing/separating characteristic,i.e., rates at which the polarized light is transmitted or reflected differ, as well as means whereby, of the polarized light in which mutually perpendicular polarized light beams are present in mixed form due to the different polarizing/separating characteristics, one of the perpendicular mixed polarized light beams is changed to a polarized light beam having a polarization direction different from that of that light beam, i.e., a polarization direction perpendicular thereto.

In the eight configuration, the means for changing the polarizing/separating characteristics of the polarized light beams in the optical path is similarly the polarizing optical means. However, the means whereby, of the polarized light occurring due to different polarizing/separating characteristics, i.e., of the polarized light in which mutually perpendicular polarized light beams are present in mixed form, one of the perpendicular mixed polarized light beams is changed to a polarized light beam having a polarization direction different from that of that light beam, i.e., a polarization direction perpendicular thereto, is clearly set forth as being constituted by the phase difference means having a medium for causing a difference in the phase velocity of the propagating polarized light and for changing its polarization state.

In the ninth configuration, the polarization controlling means is comprised of the phase difference means having a medium for causing a difference in the phase velocity of the propagating polarized light and for changing its polarization state and polarizing optical means for separating the natural light into the mutually perpendicular polarized light beams. However, as the means for changing the polarizing/separating characteristics of the polarized light beams in the optical path, the polarizing optical means and the phase difference means are arranged in the optical path in a cascade manner. At the same time, in the spatial relationship between a set of mutually perpendicular polarized light beams outputted from the phase difference means and another set of mutually perpendicular polarized light beams to be inputted to the polarizing optical means, the angle of spatial combination between the two sets is made different (i.e., made nonparallel) so as to change the polarizing/separating characteristics in the optical path.

In the tenth configuration, the polarization controlling means is comprised of means having a medium which optically rotates (twists) the first polarized light beam into the second polarized light beam perpendicular thereto and optically rotates the second polarized light beam into the first polarized light beam perpendicular thereto, and in which the proportion of the quantity of the former rotated light and the proportion of the quantity of the latter rotated light are different (anisotropically polarizing, rotatory medium).

The light-quantity distributing means is comprised of that polarization controlling means with the light distributing means.

In the eleventh configuration, the polarization controlling means is comprised of a panel constituted by pixels having a medium which is provided with both the optical rotatory function for rotating the P polarized light in the direction of the S polarization direction and the S polarized light in the direction of the P polarization direction, and so-called optical anisotropy concerning the quantity of light in which the proportion of the quantity of the former rotated light and the proportion of the quantity of the latter rotated light differ (anisotropically polarizing, rotatory medium).

In addition, in the twelfth configuration, the polarization controlling means is comprised of a panel which is not provided with pixels, instead of the panel having the pixels in the eleventh configuration described above, and the medium used therein is the same as the one used in the eleventh configuration.

In the thirteenth and fourteenth configurations, a plurality of usable wavelength bands are allotted to the polarizing optical means for effecting polarization and separation, and a plurality of the polarizing optical means having polarizing/separating characteristics for the respective allotted wavelength bands are used in combination.

In the fourth configuration, two or three usable wavelength bands are allotted to the polarizing optical means for effecting polarization and separation.

When two wavelength bands are allotted, there is a case where the wavelength bands are allotted in steps, or a blue color in the range of 400 nm–500 nm and a wavelength band having a wavelength longer than that range are allotted.

When three wavelength bands are allotted, the allotment is effected by being characterized in that part of the wavelengths of green (approx. 500 nm–600 nm) overlaps in the entire allotted ranges.

In the configuration according to claim 15, the video-signal light modulating means is comprised of the chrominance-signal light modulating means for green for optically modulating green light on the basis of a green chrominance signal of the inputted video signals and the chrominance-signal light modulating means for the respective colors of red and blue for optically modulating red light and blue light on the basis of red and blue chrominance signals of the inputted vide signals. At the same time, in correspondence with the fact that the human eye is sensitive to green information, the pixel size of each of the chrominance-signal light modulating means for the respective colors of red and blue is made larger than the pixel size of the chrominance-signal light modulating means for green, and the frequency bandwidth of the green chrominance signal is made wider than the frequency bandwidth of each of the red and blue chrominance signals.

In the sixteenth configuration, there are provided the point-light-source generating means for receiving the light which does not contribute to image formation, of the light emergent from the light source, and for generating a point light source by using that received light, and light receiving means for receiving the light from the point light source of the point-light-source generating means by the light collecting means for collecting the emergent light from the light source.

In the seventeenth configuration, the light source means, the light collecting means, the video-signal light modulating means, and the projecting means are provided. In particular, the apparatus further comprises: the light separating means for spectrally separating the emergent natural light from the light collecting means into three primary color components of red (R), green (G), and blue (B); the fourth light distributing means for distributing the spectrally separated light to the video-signal light modulating means; the video-signal light modulating means being provided in a plural number in correspondence with the three primary colors; the plurality of optically-modulated-light emitting means for emitting a plurality of optically modulated light beams; and the second light combining means for combining the emergent light beams and emitting the combined light toward the projecting means. When the emergent natural light from the light collecting means is subjected to optical modulation, in the combination among the mutually perpendicular first and second polarized light beams, the brightness or luminance components (K components) of the respective primary-color video signals, and the chrominance components (C components) of the respective primary-color video signals, one of the following first, second, and third combinations is used.

In the first combination, the first polarized light beam in all of the primary-color wavelength bands is independently subjected to optical modulation on the basis of the K components of the primary red, green, and blue video signals, respectively, and, at the same time, the second polarized light is similarly independently subjected to optical modulation on the basis of the respective C components of the primary red, green, and blue video signals, respectively (6-panel configuration of FIG. 28C).

The second combination is similar to the above-described first combination. However, although the first combination is comprised of the respectively independent luminance-signal light modulating means and chrominance-signal light modulating means, the second combination is comprised of a single luminance-signal light modulating means and a plurality of chrominance-signal light modulating means. In other words, the first polarized light is subjected to optical modulation by a single first luminance-signal light modulating means on the basis of the K components of two video signals of the primary video signals, while the second polarized light is subjected to optical modulation by respectively independent chrominance-signal light modulating means on the basis of the C components of the two video signals. At the same time, the second polarized light is subjected to optical modulation by the first luminance-signal light modulating means on the basis of the K component of the remaining video signal among the primary video signals, while the first polarized light is subjected to optical modulation by the respectively independent chrominance-signal light modulating means on the basis of the C component of the remaining video signal among the primary video signals (4-panel configuration of FIG. 28B). That is, the arrangement provided is such that the single first luminance-signal light modulating means is used for the first polarized light with respect to the K components of two video signals and for the second polarized light with respect to the K component of the remaining one video signal in terms of its combination, and the chrominance-signal light modulating means are independently provided for the respective three primary colors.

The third combination is similar to the second combination. However, the configuration provided is such that, instead of the single first luminance-signal light modulating means used as the luminance-signal light modulating means in the second combination, the luminance-signal light modulating means is comprised of two luminance-signal light modulating means, i.e., the first and second luminance-signal light modulating means, and a plurality of chrominance-signal light modulating means are used. That is, each of the first and second polarized light beams is subjected to optical modulation by the single first luminance-signal light modulating means and the independent chrominance-signal light modulating means, respectively, on the basis of the K components and the C components of two video signals of the primary video signals. At the same time, each of the first and second polarized light beams is subjected to optical modulation by the second luminance-signal light modulating means and the independent chrominance-signal light modulating means on the basis of the K component and the C component of the remaining video signal of the primary video signals (5-panel configuration of FIG. 28A).

The light modulating system uses a polarization controlling system for controlling a polarization state of light so as to emit light which does not contribute to image formation toward the projecting means. The video-signal light modulating means is constituted by a reflection-type panel provided with pixels, and the light distributing means and the optically-modulated-light emitting means are constituted by polarizing optical means, and the light separating means and the light combining means are constituted by optical elements for reflecting or transmitting a particular wavelength of light.

In the nineteeth configuration, in addition to the general condition of the video signals that the bandwidth of the luminance signal is made wider than the bandwidth of the chrominance signal, the pixel size of the video-signal light modulating means concerning the brightness or luminance component (K component) is made smaller (finer) than the pixel size of the video-signal light modulating means concerning the chrominance signal (C component). Incidentally, the respective pixels are those of the polarization controlling element means for modulating the polarization direction of the polarized light.

In the twentieth configuration, each of the mutually perpendicular first and second polarized light beams from the natural light from the light collecting means is subjected to optical modulation (the polarization state is modulated) by the video signals of the K components (luminance components) and the C components (chrominance components). Then, the second light distributing means for guiding the second polarized light toward the chrominance-signal light modulating means for the respective colors in response to the respective lightwaves of the primary colors and for combining the optically modulated light beams of the respective colors as well as the second light combining means for combining the optically modulated light beams for the respective colors are integrally formed by a set of dichroic mirrors. Also, the first light distributing means for polarizing and separating the natural light into the first and second polarized light beams and optically distributing the polarized light beams to the respective video-signal light modulating means for the K and C components, as well as the first light combining means for combining the optically modulated light from the second light combining means and the optically modulated light from the video-signal light modulating means for the K components are integrally formed by a single polarizing optical means.

In the twenty-first configuration, instead of the video-signal light modulating means (independent for the respective colors of R, G, and B) for the C component (chrominance component) described in the twentieth configuration described above, the chrominance-signal light modulating means is constituted by a single light modulating means in which color filters of the respective primary colors of R, G, and B are arranged. Consequently, the configuration provided is such that the dichroic mirrors constituting the second light distributing means and the second light combining means are not used.

It should be noted, however, that the fact that the first light distributing means and the first light combining means are integrally formed by a single polarizing optical means and the fact that the video-signal light modulating means is of the reflection type are the same as in the configuration described in the twentieth configuration.

In the twenty-second configuration, both video-signal light modulating means for the luminance signal and the chrominance signal are constituted by transmission-type light modulating means for transmitting the optically modulated light, respectively. Accordingly, the first light distributing means and the first light combining means are constituted by exclusive-use optical means, respectively.

The relationship of combination between the first and second polarized light beams and the K and C components of the video signals is provided in a corresponding manner, respectively.

In the twenty-third configuration, the video-signal light modulating means is comprised of a set of respectively independent light modulating means for the respective colors of R, G, and B corresponding to the three primary colors, and reflecting means is provided for totally reflecting one of the first and second polarized light beams which is not distributed toward the respectively independent light modulating means for the respective colors of R, G, and B by the first light distributing means.

In the twenty-fourth configuration, the pixel size of the video-signal light modulating means is set forth, and the arrangement provided is such that the pixel size of each of the light modulating means for the respective colors of R, g, and B corresponding to the primary colors can be changed over between a fine size and a plural-pixel size larger than the same and consisting of a plurality of the fine sizes. In this configuration, each of the light modulating means is adaptively changed over between the small pixel size and the larger pixel size in correspondence with a primary-color level of the video signal and the relative magnitude of a high-frequency component.

In the twenty-fifth configuration, instead of the reflecting means according to claim 23, another set of respectively independent light modulating means for the respective colors of R, G, and B is provided. The first and second polarized light beams are subjected to optical modulation by using the so-called dual light modulating means.

The twenty-sixth configuration one set of the dual video-signal light modulating means (two light modulating means) according to claim 25 described above is used as a video-signal light modulating means for the left eye, and the other set thereof is used as a video-signal light modulating means for the right eye. In other words, these two sets of light modulating means are used as the three-dimensional light modulating means.

The twenty-seventh configuration also uses the polarization controlling system for controlling the polarization state of the light by optically modulating the same. However, to state a conclusion, the respectively independent light modulating means for R, G, and B of the chrominance components (C components) of the video signals and the light modulating means for the luminance component (K component), i.e., four light modulating means, are provided. The basic arrangement is such that one (the first polarized light beam) of the mutually perpendicular polarized light beams from the natural light is subjected to optical modulation on the basis of the K components of the video signals, while the other polarized light beam (the second polarized light beam) perpendicular to the first polarized light beam is similarly subjected to optical modulation on the basis of the chrominance signals (C components).

In addition, the transmission type for transmitting the optically modulated light is used as all the light modulating means.

For this reason, the first light distributing means for distributing the first and second polarized light beams from the natural light to the luminance-signal light modulating means and the chrominance-signal light modulating means, and the first light combining means for optically combining the optically modulated light beams from the four light modulating means and emitting the same toward the projecting means are respectively constituted by exclusive-use polarizing optical means (polarizing beam splitters).

In addition, the second light distributing means for spectrally separating the second polarized light beam optically distributed by the first light distributing means into light components corresponding to the respective wavelength bands of the respective primary colors, as well as the second light combining means for combining the optically modulated light beams from the respective light modulating means for the primaries and for emitting the same toward the first light combining means, are respectively independently by dichroic mirrors serving as optical elements for reflecting or transmitting a specific wavelength of light.

In the twenty-eight configuration, the first optical means for enlarging the cross-sectional area of the optical path from the first light distributing means, as well as the second optical means for reducing the cross-sectional area of the optical path of the optically modulated light obtained by optically modulating the light from the optical path section enlarged by the first optical means, are provided before and after the luminance-signal light modulating means of the configuration according to the twenty-seventh configuration, respectively.

In accordance with the configuration according to the first through fifth configurations, since the first light distributing means for distributing the emergent light from the light collecting means toward the luminance-signal light modulating means and the chrominance-signal light modulating means is constituted by polarizing optical means for fetching mutually perpendicular polarized light beams from the natural light, the preprocessing of the light, which is performed by the polarizer used in the conventional TN liquid crystal for arranging in advance the polarization direction of the light incident upon the respective light modulating means, is carried out simultaneously at the same time as the distribution processing of the light. For this reason, since the polarizer is, in principle, not required in the optical path, there is an advantage in that the optical loss in the optical path can be reduced. The first light combining means for combining the optically modulated light beams which are reflected from or transmitted through the luminance-signal light modulating means and the chrominance-signal light modulating means also uses the polarizing optical means. As a consequence, the light combining means performs the function of combining the light and the function of the polarizer for setting the polarization direction of each optically modulated light beam from each light modulating means to a predetermined direction.

In particular, in accordance with the configuration according to the second configuration, since it is possible to fetch not only two mutually perpendicular polarized light beams but also light in other kinds of polarization states from nonpolarized light, it is possible to cope with a video-signal light modulating means adapted for the so-called three-dimensional image signals by forming the video signals into two channels (two-channel three-dimensional image signals for the left and the right, for example).

Moreover, in accordance with this aspect of the present invention, not only one set of linearly polarized light beams can be used in terms of the polarization direction of the light, but a combination of, for instance, two sets of linearly polarized light beams, or a combination of elliptically polarized light combining the two mutually perpendicular linearly polarized light beams and their phases and amplitudes, is allowed in terms of the state of the light. Hence, the emergent light from the light collecting means can be advantageously utilized as a more effective information medium.

In accordance with the third configuration, the four functions, i.e., the function of the first light distributing means for distributing the emergent light from the collecting means toward the luminance-signal light modulating means and the chrominance-signal light modulating means, the function of the polarizer for polarizing the light into particular polarized light beams with respect to the respective light modulating means, the function of the analyzer for polarizing the light emergent from the two light modulating means into particular polarized light beams, and the combining function of the first light combining means for combining the light beams emergent from the light modulating means for both signals, are optically processed by a single polarizing optical means, e.g., a polarizing beam splitter. Furthermore, this configuration makes it possible to perform, simultaneously with the above-described four functions, a new operation derived from the combination in which the light distributing means and the light combining means are constituted by the single polarizing optical means, wherein, of the light reflected by the respective light modulating means, the mutually perpendicular polarized light which does not form an image is returned toward the light collecting means by, for example, the polarizing beam splitter.

In accordance with the third configuration, since the first light distributing means and the first light combining means are constituted by the single polarizing optical means (e.g., the polarizing beam splitter), in addition to the above-described four operations (the function of the polarizer and the function of the analyzer for arranging the polarized light, the light distributing function, and the light combining function), the other operation, i.e., the operation in which the mutually perpendicular polarized light which does not contribute to the image formation is returned toward the light collecting means, while the polarized light contributing to the image formation is emitted toward the projection side, can be executed in a shortest optical path in this configuration. Namely, the distribution of light and the combination of light can be executed with a minimum optical loss.

In accordance with the fourth configuration, since the light modulating system uses the polarization controlling system for modulating the polarization state of the light on the basis of video signals, and since the luminance-signal light modulating means and the chrominance-signal light modulating means are both of the transmission type, in a case where liquid crystal panels (e.g., TN liquid crystal panels) are used as the respective light modulating means, the overall operational mode can be used either as the normally black mode or as the normally white mode.

Furthermore, if the applied voltages are respectively adjusted, the transmission rates for determining the identical polarized light beams made incident upon the liquid crystal can be substantially set to a predetermined identical value. Hence, by adjusting the respective applied voltages, it is possible to appropriately obtain the white balance in the formation of a projected image in the normally black operational mode, and the black-level balance in the formation of the projected image in the normally white operational mode.

In accordance with the fifth configuration, the same operation as that of the above-described fourth configuration is basically performed. However, for example, the aperture ratio of the transmission-type liquid crystal panel for forming the transmission-type optical modulation signals is low, and the brightness of its projected image is lower than that of the reflection-type liquid crystal panel having a high aperture ratio. The invention according to the fifth configuration has the advantage of remedying this condition.

That is, of the light transmitted through the luminance-signal light modulating means or the chrominance-signal light modulating means, the light which does not contribute to the image formation is guided to either the chrominance-signal light modulating means or the luminance-signal light modulating means by using the second light distributing means constituted by the aforementioned polarizing optical means, thereby advantageously increasing the amount of light incident upon the chrominance-signal light modulating means or the luminance-signal light modulating means. It goes without saying that this means can be used for the reflection-type liquid crystal panels as well.

In accordance with the configurations according to any one of the sixth through twelfth configurations, in addition to the first light distributing means for distributing the light uniquely, the light-quantity distributing means has at least the polarization controlling means (with the light distributing means) for determining proportions of transmission and/or reflection of the quantities of the mutually perpendicular polarized light located in the optical path of the light-quantity distributing means. Therefore, the light-quantity distributing means is capable of exhibiting the operation of allotting the overall quantities of the two polarized light beams perpendicular to each other without a loss, of the light emergent from the light collecting means, and of optically distributing the polarized light beams to the light modulating means for the respective signals at the predetermined ratio determined by the polarization controlling means.

In accordance with the invention according the seventh configuration, in particular, of the polarization controlling means (with the light distributing means) which constitutes the light-quantity distributing means, the polarization controlling means is comprised of polarizing optical means having different polarizing/separating characteristics, i.e., rates at which the polarized light is transmitted or reflected differ, as well as means whereby, of the polarized light in which mutually perpendicular polarized light beams are present in mixed form due to the different polarizing/separating characteristics, one of the perpendicular mixed polarized light beams is changed to a polarized light beam having a polarization direction different from that of that light beam, i.e., to the polarized light beam having the other perpendicular component. Accordingly, the first operation occurs in which one polarized light beam having a lower polarizing/separating characteristic is consequently mixed in the other polarized light beam perpendicular to the one polarized light beam.

In addition, the second operation is produced in which the one mixed polarized light beam is recombined with the other polarized light beam by the means for converting the one mixed polarized light beam to the other perpendicular component which is different from the one mixed polarized light beam, i.e., perpendicular thereto. If the overall configuration is viewed by taking into consideration the light distributing means for optically distributing the recombined polarized light beam, the operation is produced whereby the overall quantities of a set of mutually perpendicular polarized light beams are allotted to the quantities of mutually perpendicular polarized light on the basis of the predetermined values determined by the degree of the difference in the different polarizing/separating characteristics.

In accordance with the eight configuration, as for the polarizing optical means having different polarizing/separating characteristics and the means for changing the polarization direction of polarized light occurring due to the difference in the polarizing/separating characteristic to a polarization direction different therefrom, which together form the polarization controlling means, the phase difference means is used particularly as the latter means. Therefore, in addition to the operation of converting one polarized light beam into the polarized light beam having the other polarization direction perpendicular to the polarization direction of that polarized light beam, there is produced an auxiliary operation of performing oppositely correcting coloration after estimating the coloration of light due to the birefringence of the light (i.e., the characteristic in which the refractive index differs between the case where the plane of polarization of the light is perpendicular to the direction of orientation of the long axis of the molecules of the medium, i.e., the case of ordinary light, and the case where the plane of polarization is parallel thereto, i.e., the case of extraordinary light; the liquid crystal material has this characteristic) in the entire optical path leading from the light collecting means to this light-quantity distributing means and to the following video-signal light modulating means.

In addition, in accordance with the configurations according to the seventh and eight configurations, the polarization controlling means is comprised of the polarizing optical means having different polarizing/separating characteristics and the means whereby, of the polarized light in which mutually perpendicular polarized light beams are present in mixed form, one of the perpendicular mixed polarized light beams is changed to a polarized light beam having a polarization direction different therefrom. The light-quantity distributing means constituted by the polarization controlling means with the light distributing means consequently exhibits the operation of the quantities of P and S polarized light beams to the light modulating means for the respective signals at a predetermined ratio determined by the respective polarizing/separating characteristics without causing a loss in the quantity of the emergent light (the sum of mutually perpendicular P and S polarized light beams) from the light collecting means. That is, the parameters of the polarizing/separating characteristics of the polarizing optical means produce the operation of determining a predetermined ratio of distribution.

In the configuration according to the eighth configuration, in particular, of the means constituting the polarization controlling means, the phase difference means is used as the means for changing the polarization direction of one polarized light beam of the light in which mutually perpendicular light beams are present in mixed form. The phase difference means has the light transmitting characteristic due to its characteristic in which the polarization direction in set in the optical path in which the light propagates. For this reason, the phase difference means makes it possible to change the polarization direction of the polarized light as the phase difference means is merely placed in the optical path of the light distributing means. Then, since the polarized light leaking from the polarizing optical means having a different polarizing/separating characteristic is converted to the other polarized light, and is outputted from the light distributing means, it is possible to effect the so-called calculation of polarized light on the basis of the polarizing/separating characteristics of the polarizing optical means.

In accordance with the configuration according to claim 9, the polarization controlling means is constituted by the polarizing optical means and the phase difference means in the same way as in the eighth configuration. However, since the means for changing the polarizing/separating characteristic of the light in the optical path in which the light propagates is formed on the basis of a difference in the angle of spatial combination between a set of mutually perpendicular polarized light beams outputted from the phase difference means and another set of mutually perpendicular polarized light beams to be inputted to the polarizing optical means, the angle of spatial combination can be varied by, for instance, rotating the phase difference means about the optical axis of the optical path. Accordingly, the ratio of distribution of the quantities of light by the light-quantity distributing means can be made variable by simply rotating the phase difference means about the optical axis, as required. This operation is a particularly characteristic operation as compared to the operations of the seventh and eighth configurations.

In addition, in accordance with the ninth configuration, it goes without saying that the phase difference means constituting the polarization controlling means also performs the auxiliary operation of oppositely compensating the coloration of light due to the birefringence of light in the optical path.

Furthermore, in accordance with the ninth configuration, if one or both of the incident and emergent planes of the phase difference means are adjusted to parabolic shapes or inversely parabolic shapes, the slight difference in the brightness in the distribution of the quantity of light at the emergent plane due to the shape of, for example, the lamp in the light source can be oppositely compensated with a minimum loss. As a result, there is produced the auxiliary operation of making uniform the light quantity distribution at the emergent cross section of the polarized light. Furthermore, it is possible to provide the distribution of the light quantity which is unrealizable by the conventional light distributing means in that, for instance, with respect to the luminance-signal light modulating means, the distribution of the light quantity in its emergent cross-sectional area is made such that a central portion of the displayed projected image becomes bright, whereas, with respect to the chrominance-signal light modulating means, the distribution of the light quantity in its emergent cross-sectional area is made such that a peripheral portion of the displayed projected image becomes bright, and such that the distribution of the light quantity of the overall combined projected image is uniform, and the quantity of light is distributed to both light modulating means at a predetermined ratio (variable).

In accordance with the tenth configuration, the polarization controlling means for changing the polarizing/separating characteristic of the light in the optical path in which the light propagates is comprised of means having a medium which optically rotates (twists) an arbitrary first polarized light beam in the polarization direction of a second polarized light beam perpendicular thereto and, conversely, optically rotates (twists) the second polarized light beam in a perpendicular relation to the first polarized light beam in the polarization direction of the first polarized light beam perpendicular thereto, said means having a transmission characteristic in which the proportion of the quantity of light emergent due to the optical rotation of the former light beam and the proportion of the quantity of light emergent due to the optical rotation of the latter light beam differ. Therefore, the light-quantity distributing means can be realized by a simple configuration by connecting the light distributing means (e.g., polarizing optical means) to the polarization controlling means in a concatenated manner. In addition, if a medium having a property for shielding the light (e.g., infrared light) in a wavelength band which generates heat not required by the projector is used as the medium, the operation of suppressing the deterioration of both the light distributing means and the light combining means due to heat can also be provided.

In accordance with the eleventh configuration, the polarization controlling means for changing the polarizing/separating characteristic of the light in the optical path in which the light propagates is comprised of a group of pixels having a medium in which the proportion of the quantity of the light rotating from the P polarized light beam to the S polarized light beam and the proportion of the quantity of the conversely rotating polarized light beam differ. Hence, the light-quantity distributing means can be readily configured by connecting the light distributing means to the polarization controlling means in a concatenated manner.

Moreover, since the optical rotatory power of the medium having the pixels can be controlled for each pixel (i.e., by applying a bias voltage to each pixel), the control of the quantity of light can be finely adjusted over the cross section of the optical path. This makes it possible to adjust for each pixel the correction of the difference in brightness due to the shape of the lamp in the light source, the ratio of distribution of mutually perpendicular polarized light components, and the white balance and the black level of the projected screen. If the amount of the polarized light distributed to one signal light modulating means is reduced, the amount of light distributed to the other signal light modulating means increases, so that the brightness of the overall projected screen is prevented from becoming dark due to the adjustment. In other words, this is the operation which is produced by the light-quantity distributing means for controlling the distribution of the light quantity from the concept of distribution. In particular, the control by changing the applied voltage (bias field) imparts the operation whereby the light-quantity distributing means in pixel units is electronically controllable in units of pixels.

In accordance with the twelfth configuration, since there is provided the polarization controlling means having a configuration in which the pixels are not provided instead of the configuration in which the pixels are provided in claim 11 described above, the proportions of distribution of the quantities of light can be controlled together with the control of the light-quantity distribution of the cross-sectional area of the optical path in the same way as in the eleventh configuration.

That is, the distribution of light is based on the concept which conforms to the visual characteristics of a human being wherein, as for the mutually perpendicular polarized light beams, a greater amount of polarized light is distributed to a central portion of the plane of the optical path for the polarized light for one signal (the luminance signal is preferable) so as to be adapted to the human visual characteristic that the sensitivity of the human eye is high in the central portion of the viewed spot, while a lesser amount of polarized light is distributed to the central portion of the image for the polarized light for the other signal (chrominance signal), such that, in terms of the brightness of the overall projected image which is a composite image, an equal level of brightness is maintained over the overall plane as a result. The distribution of light based on this concept can be effected by so-called analog control from the conventional viewpoint of the shading correction of a CRT (the distribution ratio for the overall panel is controlled by the parabolic electric field), instead of the so-called digital control in which control is provided for each pixel as in the eleventh configuration described above.

To supplement the description, it goes without saying that if a material which cuts off infrared rays is used as the medium in the panel in the eleventh and twelfth configurations or on the incident side or emergent side of this panel, it is possible to provide the operation of shutting off heat waves. In addition, if a liquid crystal panel having both the optical rotatory power and an optical anisotropy in the polarization direction is used, it is possible to realize a polarization controlling means which is suited as a light quantity distributing means having excellent cost performance. Since it is the liquid crystal panel, a lightweight light-quantity distributing means can be configured.

In the thirteenth and fourteenth configurations, instead of the conventional technological concept in which the same usable wavelength bands are used for all of the plurality of polarizing optical means when the plurality of polarizing optical means are arranged in the optical path in which the light propagates, the arrangement provided is such that a plurality of usable wavelength bands are allotted to the polarizing optical means, and individual polarizing optical means having polarizing/separating characteristics for the allotted wavelength bands are combined, thereby to obtain polarizing/separating characteristics corresponding to at least all the usable wavelength bands of light. Therefore, this arrangement permits the optical processing of division of the wavelength of light by the polarizing optical means. The polarizing optical means performs the operation of spectrally separating the wavelengths of light and polarizing and separating the light. A description will be given of this aspect.

That is, from the viewpoint of manufacture, the present invention in this aspect permits the application of a method of manufacturing the polarizing optical means in which polarizing/separating characteristics are obtained by providing each polarizing optical means with a particular wavelength band.

Next, since the polarizing optical means are disposed for the respective wavelength bands, there is an effect that light having other wavelengths not allotted to the respective polarizing optical means is not mixed in the mutually perpendicular light beams which are made emergent after being polarized and separated by the respective polarizing optical means. For this reason, the polarized light beams distributed by the first light distributing means or the light-quantity distributing means using this polarizing optical means are mutually independent for each wavelength of the light. In other words, since the polarized light beams are independent for the respective wavelength bands of the light, and the mutual interference (interference with mutually perpendicular light having a different wavelength) is absent, the polarizing optical means operates to improve the tone of color of the projected image. Furthermore, with the configuration of the projector, this invention has the advantage in the configuration in that, since the configuration also performs the operation of the dichroic mirror conventionally used as the light separating means for extracting light by predetermining the wavelength band, the number of dichroic mirrors used can be reduced.

In other words, the thirteenth and fourteenth configurations is provided with the operation of optically separating the wavelengths of the light and polarizing and separating the light, as described above.

In the fourteenth configuration, in particular, two or three usable wavelength bands of light are allotted.

In the usable wavelength ranges based on Group (1) in the fourteenth configuration, the usable ranges are allotted substantially in 250 nm steps from the lower limit (approx. 400 nm) of visible light. In the usable wavelength ranges based on Group (2), two bands are allotted, including one in the range of 400 nm to 500 nm and another in the range of 450 nm to 800 nm which slightly overlaps with the former range, in the same way as in the range of transmission shown in FIG. 15.

The usable wavelength ranges based on Groups (1) and (4) have three allotted ranges, and include all green wavelength components which are sensitive to the human eye. Accordingly, since the respective polarizing optical means operate in such a manner as to be provided with the so-called color filters, with the result that the mutual interference of individual polarized light beams allotted to two or three wavelength bands can be suppressed in operation. Hence, there is an advantage that the hue of the projected image can be improved. Moreover, since the arrangement provided is such that the green wavelength components (approx. 500 nm to 600 nm) are positively transmitted, it is possible to reflect the quality of a natural image on the projected image.

In Group (4), in particular, green components to which the human eye is sensitive are included in all the allotted ranges, the wavelength bands are provided at equal intervals of wavelength, and wavelengths of infrared rays (approx. 700 nm or more) are cut off. Therefore, this arrangement is suitable for the reproduction of a natural image, and there is an advantage that the optical path is not heated unnecessarily.

In the fourteenth configuration based on Groups (1) to (4), since the usable wavelength bands of the light are precisely set in predetermined ranges, it is possible to reduce the occurrence of the coloration phenomenon occurring due to birefringence caused by the media of devices, such as the polarizing optical means (e.g., the phase difference means and liquid crystal panels), the video-signal light modulating means, and the like in the optical path. Even if the coloration phenomenon is present, it is basically easy to provide opposite compensation since the corresponding wavelength bands of the light are clear.

In the fifteenth configuration, when the light of the respective colors of red (R), green (G), and blue (B) is subjected to optical modulation on the basis of the video-signal light modulating means for the respective colors, in correspondence with the fact that the human eye is sensitive to information on green color, the pixel size of the light modulating means for red and blue signals is made larger than the pixel size of the light modulating means for the green signal, i.e., the pixels of the light modulating means for green are fine, and the bandwidth of the green chrominance signal is wider than the bandwidths of the other chrominance signals correspondingly. For this reason, by virtue of the synergistic effect of these two aspects, the green chrominance signal components can be reproduced as a fine projected image as compared with the other chrominance signals. That is, image light which matches the characteristics of the human eye can be supplied to the projecting means.

In the sixteenth configuration, the light which does not contribute to image formation is collected at the point light source, and the light from the point light source is received by the light collecting means, and the light from the point light source is diffused within the light collecting means.

For this reason, the operation is such that the optical power is circulated and is reutilized as the light which does not contribute to the image formation returns to the interior of the light collecting means. Namely, the efficiency with which the light from the light source (lamp) is made incident upon the light modulating means improves.

In accordance with the seventeenth configuration, since the polarized light is subjected to optical modulation by introducing parameters of wavelengths of light to the polarized light, the tone of color of the projected image can be improved as compared with the configuration in which the light modulating means are not provided independently in correspondence with the parameters of the wavelengths of the light.

Particularly in the first combination described in the seventeenth configuration, the first polarized light beam and the second polarized light beam are used for the luminance component and the chrominance component, and exclusive-use video-signal light modulating means for the luminance signal and the chrominance signal matched to the wavelengths of the respective colors are used. Therefore, it is possible to reproduce a projected image in which the tone of color is excellent and the mutual interference of colors is small. Moreover, the brightest projected image is formed among the combinations.

In the third combination, the luminance-signal light modulating means can be configured by two luminance-signal light modulating means, the number of which is one less than three required in the first combination. Moreover, the chrominance-signal light modulating means are respectively made independent for the three colors, and the first polarized light is provided independently for the luminance signal, while the second polarized light is provided independently for the chrominance signal. Hence, it is possible to provide a configuration by a smaller number of luminance-signal light modulating means while maintaining the level of the tone of color. The brightest projected image next to the first combination is formed.

In the second combination, since one luminance-signal light modulating means and respectively independent three chrominance-signal light modulating means are used in the configuration, it is possible to reproduce a projected image while at least maintaining the tone of color by using the smallest number of the video-signal light modulating means.

In the above-described first to third combinations, if a combination is adopted such that, of the linearly polarized light of P and S waves emergent from the light collecting means, light having a greater amount of linearly polarized components is used as the incident light upon all or part of the chrominance-signal light modulating means for R, G, and B (e.g., the combination shown in FIG. 28B when a light source having a greater amount of P waves for the green and red components), it is evident that there is an advantage in that the luminous flux of the optically modulated light increases.

In accordance with the eighteenth configuration, since the polarization controlling system is used, even if reflection-type panels are used, it is possible to cope with the optical modulation system of both the normally white and normally black types. For example, the system can be easily set to the normally white light modulating system in which, when no voltage is applied to the reflection-type panels, the light is emitted toward the projecting means to make the screen bright, and when a voltage is applied thereto, the quantity of light emergent toward the projecting means, i.e., the quantity of light contributing to image formation, is controlled in such a manner as to be suppressed in correspondence with the applied voltage. On the other hand, the system can be set to the normally black light modulating system in which, when no voltage is applied, the light is returned toward the light collecting means to make the screen dark, and when a voltage is applied, the quantity of light emergent toward the projecting means, i.e., the quantity of light contributing to image formation, is controlled in such a manner as to increase in correspondence with the applied voltage. In other words, the normally white system and the normally black system can be made selectable in correspondence with the characteristics of the liquid crystal panels.

In a case where liquid crystal panels, for example, are used as the reflection-type panels, the voltages applied to the light modulating means can be adjusted separately. Therefore, if the normally white light modulating system is adopted, the apparatus can be provided with a setting for reproducing a more real black image in terms of the black level. Conversely, if the normally black light modulating system is adopted, the apparatus can be provided with a setting for reproducing a more real white image.

In other words, this configuration makes it possible to cope with the image quality of either pure black or pure white by using the same panels so as to reproduce an image having the image quality complying with the customer's demand.

Particularly in the normally black light modulating system in accordance with the present invention, the polarized light which contributes to image formation is distributed toward the projecting means, while the polarized light which does not contribute to the image formation is distributed toward the light collecting means, so that the efficiency of the optical power of the light collecting means is improved over the efficiency of the conventional apparatus.

In accordance with the nineteenth configuration, the optically modulated light having luminance components (K components) is finer than the optically modulated light having chrominance components (C components).

In addition, the pixel size of the video-signal light modulating means for the chrominance components (C components) can be made larger than the pixel size of the video-signal light modulating means for the luminance components (K components), so that the aperture ratio of the pixels of the panels for the chrominance components can be easily increased. In other words, the quantity of optically modulated light emergent from the chrominance-signal light modulating means increases.

In accordance with the twentieth configuration, since two sets of integrally arranged means are provided, there is an advantage in the configuration in that the four means (the second light distributing means, the second light combining means, the first light distributing means, and the first light combining means) are constituted by the two means, making it possible to make the overall arrangement compact. Additionally, the optical path lens can be shortened as a result.

In addition, in accordance with this aspect of the present invention, if the polarized light incident upon the pixels of the video-signal light modulating means is subjected to polarization control so as to be converted to the other polarized light (i.e., the incident polarized light is subjected to 90° polarization control), the optically modulated light is made incident upon the projecting means side to reproduce a bright image, whereas if the similarly incident polarized light is not subjected to polarization control, that polarized light returns toward the light collecting means side. That is, a dark image is reproduced. Therefore, this arrangement is suitable in completing the normally black type with a minimum configuration.

Further, the effect of reducing the optical path length and the effect of the above-described compact arrangement leads to a new effect. That is, it is possible to adopt a module arrangement in which the single luminance-signal light modulating means, the three chrominance-signal light modulating means, the dichroic mirror (used jointly as the second light distributing means and the second light combining means), and the single polarizing optical means (used jointly as the fist light distributing means and the first light combining means) are accommodated three-dimensionally in "one package." Further, it is possible to adopt a new arrangement in which the positional relationships among the respective members are adjusted by adjust screws provided in the module. The twentieth configuration permits that arrangement.

In addition to the short configuration of the optical path length, this arrangement permits a four-plate projector apparatus (having the video-signal light modulating means exclusively used for the luminance signal) instead of the conventional three-plate projector apparatus, so that a sufficiently bright projected image is reproduced in terms of the brightness of the projected image. In addition to the operation in which the polarized light which does not contribute to the image formation (optically modulated light which is not subjected to polarization control) returns toward the light collecting means, and is reutilized, there is the following operation. If the overall efficiency of light in a conventional configuration (not shown) which is provided with three R, G, and B panels of the TN liquid-crystal transmission type and a dichroic mirror and is aimed at a high resolution is assumed to be 1, the overall efficiency in this claim of this application is approximately 1.8-fold. Hence, there is an effect in which the optical power of the light collecting means is made to contribute to the image formation with high efficiency as compared with the conventional example.

By virtue of its operation, in the case of the lamp of a conventional projector apparatus having a configuration using three R, G, and B panels of the TN liquid-crystal transmission type and a dichroic mirror and using, for instance, a 300 W lamp, there is an advantage in that the power of the lamp can be reduced to 1/1.8 (approx. 0.55), i.e., about 170 W or thereabouts. Coupled with the operation of the three-dimensional "one package" module configuration, the effect of reducing the size of the overall configuration can be accelerated.

In the twenty-first configuration, the video-signal light modulating means is comprised of one unit each for the C component (chrominance component) and the K component (luminance component), and the first light distributing means and the first light combining means are integrally formed by a single polarizing optical means. Further, since the dichroic mirror (constituting the second light distributing means and the second light combining means) in the twentieth configuration is not required, the optical system configuration for performing basic optical modulation can be obtained by two video-signal light modulating means and one polarizing optical means alone. In other words, there is an advantage in that the optical system configuration of the apparatus can be made compact.

For this reason, the configuration form making the optical system into "one package" three-dimensionally becomes easy to realize. In addition, the optical path length can be reduced further although there may be an optical loss due to the color filters. In general, the reflection-type light modulating means in the light of its structure basically makes it possible to provide a large aperture ratio for the pixels as compared with the transmission type. Also, since the reflection-type light modulating means is provided with at least the exclusive-use luminance-signal light modulating means, as a result of the synergistic effect of these operations, if the overall optical efficiency of a conventional apparatus using a single liquid crystal panel in which three primary color filters are integrally arranged is assumed to be 1, the optical efficiency of the chrominance component and the luminance component is approximate 0.9 or thereabouts, respectively. However, since the chrominance component and the luminance component are optically combined by the polarization optical means, it can be expected that the brightness becomes 1.8-fold or thereabouts, which is approximately double.

In other words, the apparatus in accordance with this aspect of the invention produces an effect in which a brighter projected image can be reproduced than in a case where the conventional single liquid crystal panel in which the three primary color filters are integrally arranged is used.

In accordance with the twenty-third configuration, as the video-signal light modulating means, a total of two transmission-type liquid crystal panels for transmitting optically modulated light are used, one for the luminance signal and the other for the chrominance signal, so as to form a projected color image. The polarization directions of the first and second polarized light beams from the natural light are subjected to optical modulation respectively independently in correspondence with the luminance and chrominance signals. However, since the first light combining means and the first light distributing means are also arranged independently, there is an effect in that the projector apparatus can be configured as either the normally black type or the normally white type on the basis of the mutual positional relationship between the first light combining means and the projecting means. In particular, since the first light combining means is the polarizing beam splitter which is the polarization optical means, there is an effect that when the apparatus is set to the normally black mode or the normally white mode, the selective mode setting is possible if the angle at which the projecting means is set with respect to the polarizing beam splitter is merely changed by 90°. Namely, in the light of the optical configuration, the design of the projector apparatus can be selectively made such as by adopting a configuration in which the projecting means is disposed in an extended axis of the linear optical path of the light collecting means and the first light distributing means, or a configuration in which the projecting means is disposed in a direction orthogonal to the extended axis of the linear optical path.

In the twenty-third configuration, since there is an operation in which the polarized light which does not contribute to the image formation returns to the light collecting means (or the projecting means), there is an operation in which the emergent light from the light collecting means is effectively utilized as a result.

By virtue of this operation, the video-signal light modulating means is comprised of only one set of respectively independent light modulating means for R. G, and B corresponding to the three primary colors. However, since the reflection type having a higher aperture ratio than the transmission type is used, and the emergent light from the light collecting means is effectively utilized, the efficiency of utilizing the light is made high although the optical configuration is made simple.

In accordance with the twenty-fourth configuration, the pixel size of the respectively independent light modulating means for the respective colors of R, G, and B corresponding to the three primary colors is changed over between a fine size or a plural-pixel size larger than the same and consisting of a plurality of the fine sizes. Hence, there is an operation that the video signal having a large high-frequency component is optically modulated by the fine pixel size. On the other hand, since the medium- and low-frequency components of the image signals are displayed with the pixel size (plural-pixel size) consisting of a plurality of fine sizes, there is an operation in which an optical modulation with a steep gradient is provided. It goes without saying that a similar operation can be performed if the arrangement of changing over the pixel size between the fine size and the plural-pixel size in correspondence with the level of the video signal and the composition of the high-frequency components is applied to the light modulating means of other claims.

In accordance with the twenty-fifth configuration, two sets of independent light modulating means for the respective colors of R, G, and b are provided instead of one set of independent light modulating means for the respective colors of R, G, and B, so that both the first and the second polarized light beams can be subjected to optical modulation to form a projected image. Hence, there is an effect that the light utilization efficiency improves.

In accordance with the twenty-sixth configuration, one of the two sets of independent light modulating means for the respective colors of R, G, and B stated in the twenty-fifth configuration is used for the right eye, and the other one is used for the left eye, so that there is an effect that the so-called three-dimensional projected image information is supplied to the screen.

In accordance with the twenty-seventh configuration, a total of four transmission-type light modulating means are used one for the luminance component and one each for the chrominance component, and each of the first and second polarized light beams is independently subjected to optical modulation on the basis of the video signals of the luminance component and the chrominance component. With respect to the chrominance component, after the second polarized light beam is spectrally separated into wavelengths of the respective colors by the dichroic mirror, and is optically distributed, the second polarized light beam is made incident upon the light modulating means for the respective colors, and is subjected to optical modulation. Then, the optically modulated light beams are optically combined by the second light combining means constituted again by the dichroic mirror. The configuration takes into consideration not only the chrominance signal but also the luminance signal in each process of the distribution of light, optical separation, optical modulation, and combination of light. Consequently, there are advantages in that the light utilization efficiency improves, the mutual interference of colors is small, and optical modulation for each color can be effected in correspondence with each color.

Since the carefully designed configuration is used as described above, a favorable auxiliary effect is produced in that the roles to be played by the luminance-signal light modulating means and the chrominance-signal light modulating means can be allotted in detail. For instance, optical modulation based on a video signal corresponding to a high-frequency component is executed by the luminance-signal light modulating means, while optical modulation based on video signals corresponding to medium- and low-frequency components is executed by the chrominance-signal light modulating means.

Then, if signal processing is effected such that brightness component signals among the video signals are redistributed to the luminance-signal light modulating means and the chrominance-signal light modulating means so that the luminous fluxes of modulated light beams from the two signal light modulating means become substantially equal, the balance of brightness of the modulated light beams emergent from the two modulating means can be maintained. As a consequence, there is an auxiliary effect in that the light from the light collecting means contributes to the image formation with high utilization efficiency. Moreover, a high resolution can be readily accomplished by reducing only the pixel size of the luminance-signal light modulating means.

In other words, the twenty-seventh configuration permits a new combination between the optical system and the video signal system since an optical system and an optical path corresponding to the luminance signal and the primary-color signals are respectively provided, which is not experienced with the conventional video signals. As a result, a favorable auxiliary effect is provided as the above-described projector apparatus.

In accordance with the twenty-eighth configuration, after the cross-sectional area of the light which is made incident upon the luminance-signal light modulating means is enlarged by the first optical means, the light is made incident upon the luminance-signal light modulating means, and is subjected to optical modulation. Then, the enlarged optically modulated light beam is reduced again by the second optical means down to an area adapted to the incident light cross-sectional area of the polarizing beam splitter for the first light combination. Therefore, even if the pixel sizes of the luminance-signal light modulating means and the chrominance-signal light modulating means are the same, for example, the resolution of the light optically modulated by the luminance-signal light modulating means, as compared with that of the chrominance-signal light modulating means, can be effectively made high in correspondence with the ratios of the enlargement and reduction by the first and second optical means.

In other words, if the ratios of the enlargement and reduction by the first and second optical means are set to, for example, 1.4-fold and 1/1.4-fold, and the pixel area of the luminance-signal light modulating means is set to ½ of the pixel area of the chrominance-signal light modulating means, the pixel area of the luminance-signal light modulating means can be set to approximately 1/2.8 of the pixel area of the chrominance-signal light modulating means in the light-incident cross-sectional area of the first light combining means.

In other words, even if the conditions including the aperture ratio of each light modulating means and the device-wise pixel size of each light modulating means are restricted to a certain extent, it is readily possible to optimize the pixel density in the cross-sectional area of the optical path of the first light combining means of the luminance-signal light modulating means (e.g., making identical the luminous flux of the chrominance-signal light modulating means and the luminous flux of the luminance-signal light modulating means) through the combination of the first and second optical means. This is readily possible in combination with the signal processing for redistributing the brightness component signal of the video signals to the luminance-signal light modulating means and the chrominance-signal light modulating means.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 27A and 27B are diagrams explaining the operation of a TN liquid crystal panel;

FIGS. 28A, 28B and 28C are diagrams illustrating mutual relationships between the polarized light (P, S) and K components (luminance components) and C components (chrominance components) of video signals;

DESCRIPTION OF THE PREFERRED EMBODIMENTS

First Embodiment

In the following first embodiment, a description will be given of an example in which the reflection-type liquid crystal panel is a TN liquid crystal having a twist angle of 45°, and the transmission-type liquid crystal panel is a TN liquid crystal having a twist angle of 90°.

However, in the case of the recent supertwisted nematic (STN) liquid crystal which twists 180° or more, the liquid crystal panels may be provided with angles in which 180°, for example, is added to the respective twist angles mentioned above. Namely, the reflection-type liquid crystal panel may be a STN liquid crystal having a twist angle of 225°, and the transmission-type liquid crystal panel may be a STN liquid crystal having a twist angle of 270°.

Figure 1:
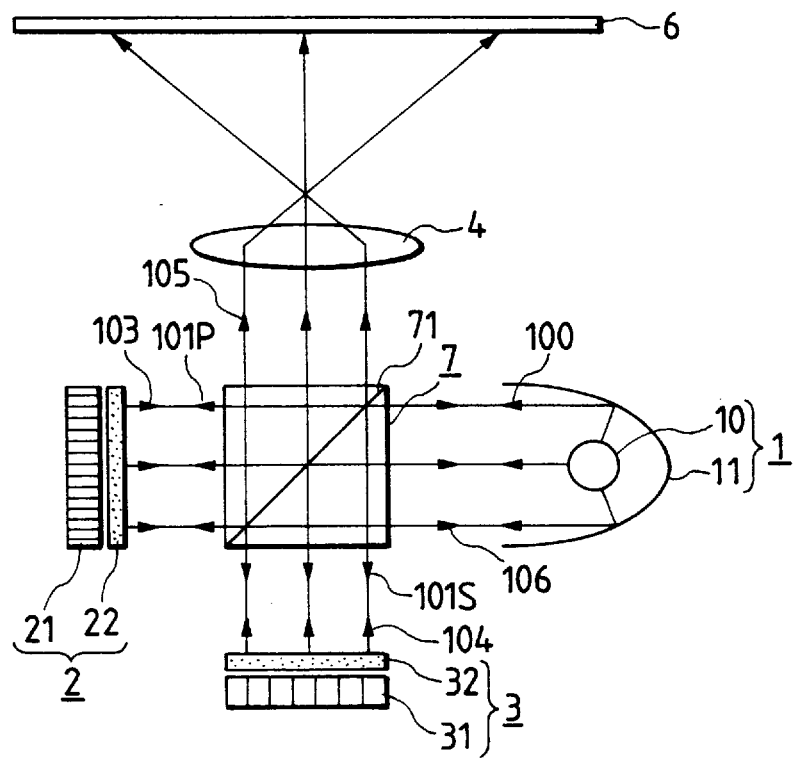
FIG. 1 is a diagram illustrating the configuration of an optical system of a projector apparatus in accordance with a first embodiment of the present invention.

In FIG. 1, reference numeral 1 denotes a projecting light source comprised of a lamp 10, serving as a light source emitting white light, and a reflecting mirror 11, serving as a means for collecting the emergent light. White emergent light 100, whose polarization direction (vibrating direction) is not polarized in a particular direction and which is the so-called natural light and is substantially parallel, is made emergent from the projecting light source 1.

It should be noted that, in the following embodiments, the arrangement for emitting the emergent light is basically the same, so that a redundant description thereof will be omitted hereafter.

Reference numeral 7 denotes a polarizing beam splitter whereby the white light, i.e., natural rays of the emergent light 100, is polarized and separated into two white light components, P waves and S waves, whose polarization directions are perpendicular to each other. The polarizing beam splitter 7 has the function of completely separating the light having a wavelength band ranging from 400 nm to 700 nm and visible to the human eye into the P waves and the S waves. Namely, the polarizing beam splitter 7 is a polarizing optical means.

The emergent light 100 is separated by a polarizing/separating plane 71 of the polarizing beam splitter 7 into the two components, P waves 101P and S waves 101S, whose polarization directions are perpendicular to each other and which are respectively applied to a liquid crystal panel 21 for the luminance signal constituting a luminance-signal light modulating means 2 and a liquid crystal panel 31 for the chrominance signal constituting a chrominance-signal light modulating means 3. That is, the emergent light 100 is optically distributed. The two liquid crystal panels are reflection-type liquid crystal panels which reflect optically modulated light. Reference numeral 22 denotes a color filter or a phase filter which compensates coloration due to the so-called optically rotatory dispersion which occurs when the polarization direction of the incident light cannot follow the twist of the liquid crystal molecules in a case where the thicknesses of the two liquid crystal panels are small. Numeral 32 denotes a color filter for selecting (filtering) the three primary colors, R, G, and B, from the white light.

Incidentally, the pixel size of the liquid crystal panel 31 for the chrominance signal may be larger than the pixel size of the liquid crystal panel 21 for the luminance signal. That is, the pixel size of the latter may be finer than the pixel size of the former. This arrangement is provided in correspondence with the visual characteristics of a human being (i.e., the chrominance information is lower in resolution than the luminance information). In addition, since the polarization directions of the light incident upon the liquid crystal panel 21 for the luminance signal and the liquid crystal panel 31 for the chrominance signal are perpendicular to each other, the rubbing directions for determining the directions of orientation of the liquid crystal molecules of the respective panels are also naturally made perpendicular to each other in accordance with the polarization directions of the incident light.

When a panel-driving voltage is applied to each liquid crystal panel, of the P waves 101P incident upon the liquid crystal panel 21 for the luminance signal, the polarization direction of the light, which is transmitted through the pixels with the voltage applied thereto and is then reflected, is resultantly rotated 90° by the incidence and reflection. In other words, the polarization direction of the light is modulated. Since that polarized light is made incident upon the polarizing beam splitter 7 as S waves 103, the polarized light is reflected toward a projection lens 4 of a projecting means by the polarizing/separating plane 71 of the polarizing beam splitter 7. Of the S waves 101S incident upon the liquid crystal panel 31 for the chrominance signal, the polarization direction of the light, which is transmitted through the pixels with the voltage applied thereto and is then reflected, is likewise rotated 90° and is made incident upon the polarizing beam splitter 7 as P waves 104. Hence, the P waves 104 are transmitted through the polarizing/separating plane 71 of the polarizing beam splitter 7, and are directed toward the projection lens 4.

Namely, the two beams of polarized light, which are subjected to polarization control after being made incident upon those pixels in the liquid crystal panel 21 for the luminance signal and the liquid crystal panel 31 for the chrominance signal with the panel-driving voltage applied thereto and after being reflected, are optically combined by the polarizing beam splitter 7. The polarized light is consequently enlarged and projected as a color image 105 onto a screen 6 by the projection lens 4. That is, the polarizing beam splitter performs the function of a light combining means.

Incidentally, at the time of the combination of the light, since light 103 reflected from the liquid crystal panel 21 for the luminance signal is reflected by the polarizing/separating plane 71, this light forms a black-and-white image in which the left and the right are reversed as compared to the color image obtained by the light from the liquid crystal panel 31 for the chrominance signal. If this state remains intact, a proper image cannot be formed. In order to obtain a proper image on the screen, it is necessary to provide a measure by inverting either the image on the liquid crystal panel 21 for the luminance signal or the image on the liquid crystal panel 31 for the chrominance signal by means of electrical signals, or by optically inverting the image by disposing a mirror for bending the direction of the light 90° between the liquid crystal panel 21 for the luminance signal and the polarizing beam splitter 7. It goes without saying that it is preferable to invert the electrical signals.

In the above-described configuration of the first embodiment, the four functions of a means for distributing emergent light from the light collecting means, a means for combining the modulated light beams (103 and 104), a polarizer on the incident side of the conventional TN liquid crystal panel, and an analyzer on the emergent side thereof are served by the polarizing beam splitter, i.e., a single polarizing optical means. Hence, a compact apparatus can be realized at low cost.

In particular, since the polarizer and the analyzer are not required, a loss of light due to these elements does not occur in the optical path (normally, a loss of 50% or thereabouts). Hence, even if the light whose power has declined after being polarized and separated into the P waves and S waves from the natural light is optically modulated, the overall optical power of the projected light reproduces a bright projected image since the modulated light beams from the respective liquid crystals are optically combined by the polarizing beam splitter 7, i.e., the polarizing optical means. In addition, it goes without saying that since the aperture ratio of the reflection-type liquid crystal panel has a higher value than that of the transmission-type panel, the configuration according to this embodiment is basically advantageous in terms of the brightness.

As for the polarized light which is made incident upon the pixels to which no panel-driving voltage is applied in both the liquid crystal panel 21 for the luminance signal and the liquid crystal panel 31 for the chrominance signal and which is then reflected, the direction of optical rotatory power of the incident light and the direction of optical rotatory power of the reflected light are substantially opposite to each other. Consequently, since the polarization direction does not rotate, the P waves incident upon the liquid crystal panel 21 for the luminance signal are reflected as they are as the P waves, are made incident again upon the polarizing beam splitter 7, are transmitted through the polarizing/separating plane 71, and return to the projecting light source 1. The S waves incident upon the liquid crystal panel 31 for the chrominance signal are made incident again upon the polarizing beam splitter 7 as they are as the S waves, are reflected by the polarizing/separating plane 71, and return to the projecting light source 1.

The configuration in which the polarizing light which does not contribute to the so-called image formation returns to the projecting light source promotes the reutilization of the projecting light source 1, and has an important meaning, as will be described below.

That is, the light 106 which thus returns to the projecting light source 1 from the respective liquid crystal panels and does not contribute to the image formation is reflected again by the reflecting mirror 11. If an arrangement is provided such that the reflected light is provided with a slightly diverging or converging characteristic or its direction changes with respect to the original emergent light 100 from the lamp 10, the light directed again toward the respective liquid crystal panels via the polarizing beam splitter 7 radiates the pixels different from the pixels radiated first by the original lightwaves 101P or 101S, and some of the light forms an image, while some other portion of the light returns still again to the lamp 10.

In other words, since the emergent light 100 from the reflecting mirror 11 repeats the above-described operation, effective use is made of the light which does not form an image, and the overall quantity of light applied to the liquid crystal panels increases as a result, so that a brighter image can be obtained on the screen.

As described above, the polarizing beam splitter 7, i.e., the polarizing optical means, performs both the function of the light distributing means for polarizing and separating the natural rays of the emergent light 100 into the P waves and S waves and optically distributing the same toward the luminance-signal light modulating means 2 and the chrominance-signal light modulating means 3 and the function of the light combining means for optically combining, of the optically modulated light, the polarized light beams from the two light modulating means which have been subjected to polarization control and contribute to the image formation. Further, the configuration can be regarded as that of a normally black mode since the projected image is dark when no panel-driving voltage is applied to the liquid crystal panels. Accordingly, if the voltages applied to the two liquid crystal panels are optimally set, respectively, and the phase filter on the emergent side of the liquid crystal panel 21 for the luminance signal is optimized, or the color filter 32 of the liquid crystal panel 31 for the chrominance signal, the voltages applied to the pixels of the three primary colors, and the like are optimized, i.e., if external conditions are optimally provided, it is possible to adjust the balance of bright portions (white balance) sufficiently appropriately.

Figure 26:
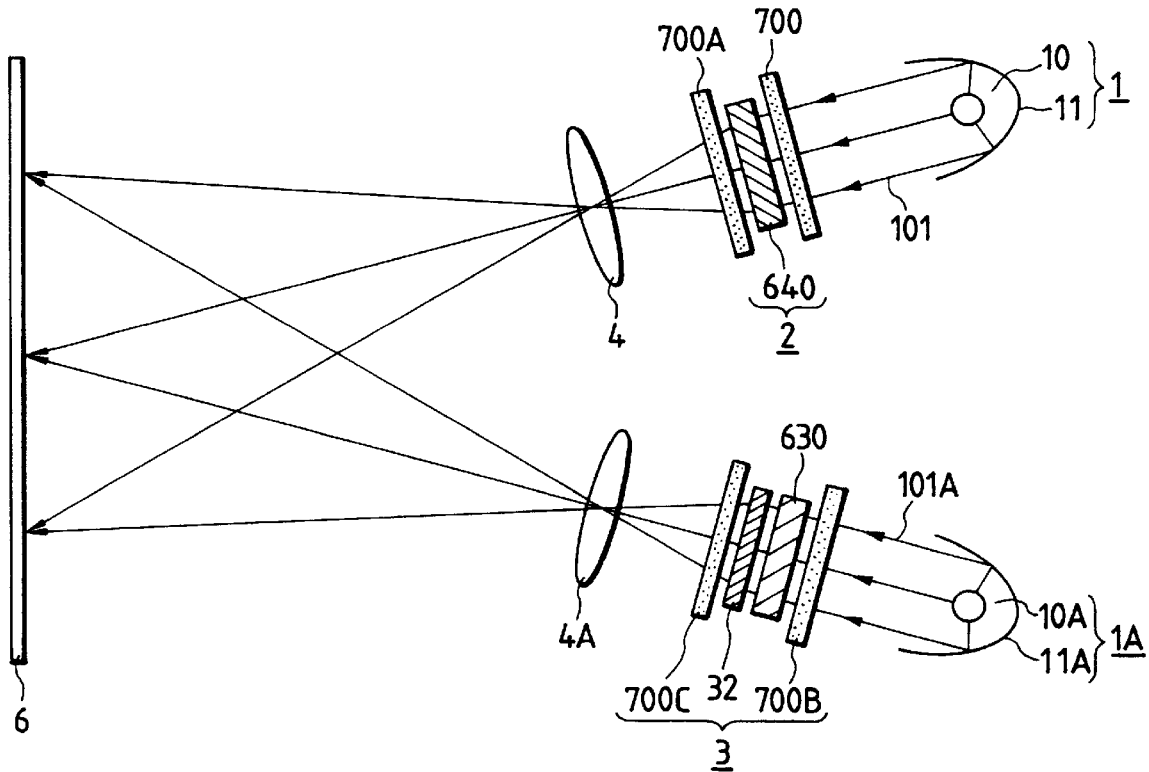
FIG. 26 is a diagram illustrating a configuration of the optical system of a conventional projector apparatus.

Furthermore, as a method of reproducing a still brighter projected image, it goes without saying that it is readily possible to provide two units of the optical system shown in FIG. 1 in parallel for the purpose of making use of the feature of the compact optical system in accordance with this first embodiment and to optically combine light beams on the screen 6 by using the concept illustrated in FIG. 26 by means of a projecting means or the like. In addition, if this dual optical system configuration is used, it is possible to develop a three-dimensional liquid-crystal projector in the future multimedia. That is, the dual optical system can be realized if the optical system shown in FIG. 1 is projected as a right-hand system and another optical system shown in FIG. 1 is projected as a left-hand system.

Moreover, this dual optical system is provided with the dual feature of the so-called projected-image reproduction mode in which the mode is changed over, as required, between a bright projected-image reproduction mode and a compact three-dimensional projected-image reproduction mode.

Figure 30:
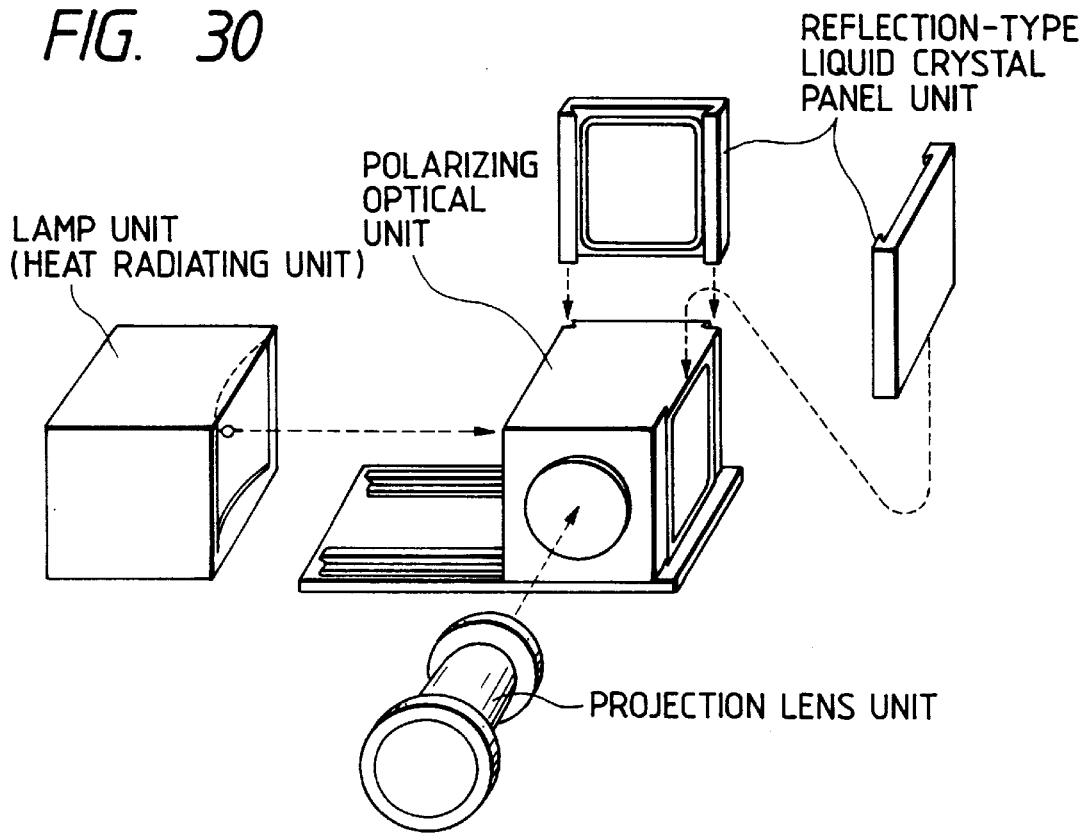
FIG. 30 is a diagram illustrating an example of a unit configuration in which the optical configuration of the first and other embodiments in accordance with the present invention are formed as one package.

In addition, since the optical system shown in FIG. 1 is provided with a shortest optical path length, and the various means can be arranged integrally, in mass production, it is possible to adopt a module configuration for arranging the system three-dimensionally into "one package" in which the polarizing beam splitter 7 is disposed in the center, the liquid crystal panel 21 for the luminance signal and the phase filter 22 as well as the liquid crystal panel 31 for the chrominance signal and the color filter 32 are fixed in place at mutually perpendicular positions, and the respective optical paths (103 and 101P, 101S and 104, 100 and 106, and 105) are provided. If the module block is provided with a heat-sinking radiator, an assembled so-called projection engine block is possible, and is suitable for the above-described dual optical system configuration as well. That which makes this possible lies in the compact feature of the optical configuration which has already been described. An example of a unit configuration for realizing the one package is shown in FIG. 30.

Second Embodiment

Figure 2:
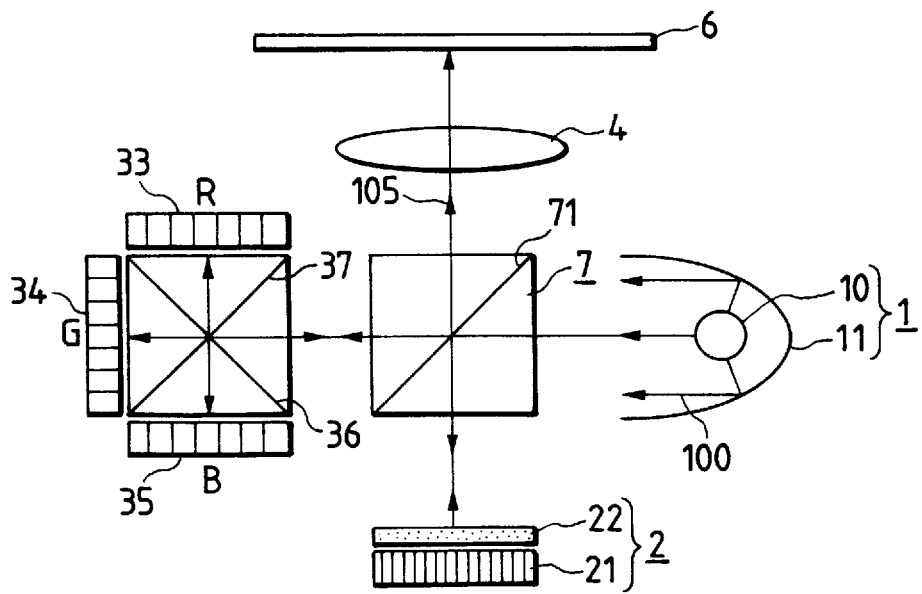
FIG. 2 is a diagram illustrating the configuration of the optical system of a projector apparatus in accordance with a second embodiment of the present invention.

FIG. 2 is a diagram illustrating a second embodiment of the present invention. This embodiment basically differs from the first embodiment in that, instead of the color filter 32 for the primaries, R, G, and B, and the single liquid crystal panel 31 for the chrominance signal used in the first embodiment, a dichroic mirror having a red-reflecting-, green-transmitting-type dichroic plane 36 and a blue-reflecting-, green-transmitting-type dichroic plane 37 as well as three liquid crystal panels for the primaries, red (R), green (G), and blue (B), are used in the configuration. As for the pixel size of each panel, the pixel size of the liquid crystal panel for the chrominance signal is larger than the pixel size o the liquid crystal panel for modulating the luminance signal, in the same way as in the first embodiment.

In FIG. 2, reference numerals 33, 34, and 35 denote liquid crystal panels used exclusively for R, G, and B, respectively; numeral 36 denotes the dichroic plane which reflects R and transmits G; and 37 denotes the dichroic plane which reflects B and transmits G. In other words, first of all, the dichroic planes 36 and 37 perform the role of a new light distributing means which guides the polarized light of the P waves toward the respective exclusive-use liquid crystal panels 33, 34, and 35 constituting the light modulating means for R, G, and B signals. Then, with respect to the pixels to which the voltage is applied in the liquid crystal panels, the polarization directions are rotated, for example, 90°, the light is made incident upon the dichroic planes 36 and 37 in directions opposite to those of incidence, R and B are reflected and G is transmitted, and the light beams are combined again. As a result, the respective polarization directions are changed 90° (i.e., the polarization directions are modulated) such that the light beams are optically combined by the polarizing beam splitter 7 so as to be directed not toward the projecting means 1 but toward the projection lens 4. That is, the polarizing beam splitter 7 optically distributes the light generally toward the chrominance-signal light modulating means (33, 34, and 35) and the luminance-signal light modulating means (22 and 21, i.e., 2) in the form of polarizing and separating the light into the P waves and the S waves, and also serves as the light combining means. Hence, in this respect, the arrangement is similar to that of the above-described first embodiment. It should be noted that the other basic operation (such as the operation in cases where no voltage is applied to the pixels) is similar to that of the first embodiment, and a description thereof will be omitted. However, since, in particular, the color filter 32 in the first embodiment is not provided, there is no loss of light due to the color filter (in principle, two-thirds of the light incident upon the color filter become a loss), so that it is possible to obtain an image which is brighter than that obtained in the first embodiment.

In addition, since optimum thicknesses of the liquid crystal panels and optimum applied voltages can be exclusively and independently selected for the respective wavelengths of the primaries, R, G, and B, so that the tone of color of the projected image can be improved more than in the above-described first embodiment. Also, it is naturally possible to adopt a three-dimensional module configuration for the overall optical system in which the system is formed as "one package," in the same way as the first embodiment. This is possible due to the fact that the lengths of the optical paths between the respective means are short. It is evident that the apparatus of this second embodiment is also a normally black type.

In addition, in the second embodiment, the reproduction of a three-dimensional projected image, for instance, is also possible in the dual optical configuration in the same way as in the first embodiment. However, the combination of the P waves and the S waves which are perpendicular to each other is not confined to one combination alone. Namely, it is readily possible to obtain from the natural light a combination of new second P waves having a polarizing angle of 45° with respect to the present P waves and second S waves perpendicular to the same. In other words, it is possible to reproduce a three-dimensional projected image by obtaining a plurality of combinations of polarized light from the natural light, by using one combination for the right eye and the other combination for the left eye, and by optically combining the light beams through optical modulation.

Furthermore, it is possible to adopt an arrangement in which only one combination of mutually perpendicular polarized light beams is used, and the optically modulated light beams from the polarization control system having an optical configuration shown in the first or the second embodiment are subjected to time-division multiplex modulation for the right eye and the left eye, and are projected. This is possible by correcting the timings at which the respective light modulating means are driven. In particular, the response speed of the pixels improves if the above-described STN-type liquid crystal panels are used.

Third Embodiment

Figure 3:
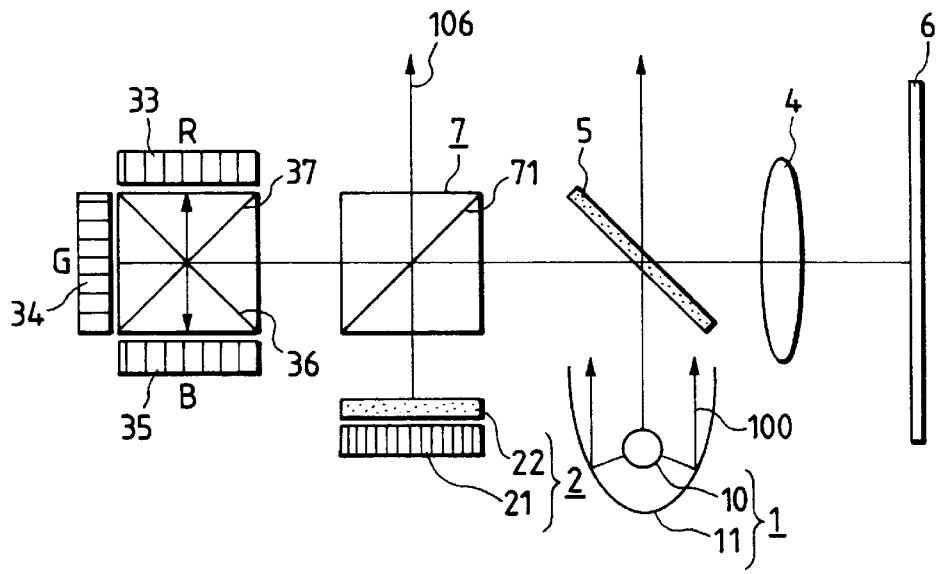
FIG. 3 is a diagram illustrating the configuration of the optical system of a projector apparatus in accordance with a third embodiment of the present invention.

FIG. 3 is a diagram illustrating a third embodiment of the present invention which employs a configuration of the normally white type in contrast to the fact that the projectors in the first and second embodiments are of the normally black type. Namely, the configuration is such that the projected image is bright when no voltage is applied to the liquid crystal panels.

In FIG. 3, reference numeral 5 denotes a half mirror for reflecting the incident light by 50% and transmitting it by 50%, and 50% of the light from the projecting light source 1 is made incident upon the polarizing beam splitter 7. By virtue of the polarizing/separating plane 71, of the natural light from the projecting light source, the S waves are made incident upon the liquid crystal panel 21 for the luminance signal, while the P waves are made incident upon the liquid crystal panels 33, 34, and 35 for the respective chrominance signals for the primaries.

Of the light incident upon the respective liquid crystal panels, the polarization direction of the light reflected from the pixels to which no driving voltage is applied in the panel is identical to the polarization direction of the light incident upon the panel. Consequently, the S waves are reflected from the liquid crystal panel 21 for the luminance signal, while the P waves are reflected from the liquid crystal panels 33, 34, and 35 for the respective chrominance signals for the respective colors in the same polarization directions as those during incidence, and the two light beams are made incident again upon the polarizing beam splitter 7. By virtue of the polarizing/separating plane 71, the S waves from the liquid crystal panel 21 for the luminance signal are reflected, while the P waves from the liquid crystal panels 33, 34, and 35 for the respective chrominance signals are transmitted through the polarizing/separating plane 71, and are projected onto the screen 6 through the projection lens 4. Then, parts of the P waves and the S waves are made incident again upon the projecting light source 1 side, and are reutilized.

On the other hand, of the light made incident upon the respective liquid crystal panels, the light reflected from the pixels to which no driving voltage is applied in the panel is subjected to polarization control, so that its polarization direction becomes perpendicular to the polarization direction of the light incident upon each panel. Consequently, this light is converted by the polarizing/separating plane 71 into the light 106 which is not directed toward the projection lens 4. Accordingly, since the projected image is bright when no driving voltage is applied to each liquid crystal panel, the projector operates as the so-called normally white type. Incidentally, numerals 36 and 37 denote mirror planes of the dichroic mirrors, which perform the same function as those of the dichroic planes 36 and 37 of the above-described second embodiment. That is, the technological concept shown in the third embodiment illustrates an embodiment in which, if the optical system of the second embodiment is provided with a minor change, the operation of the projector of the normally white type can be readily realized from the normally black type. The conversion of this operational mode is possible in other embodiments as well.

Fourth Embodiment

Figure 4:
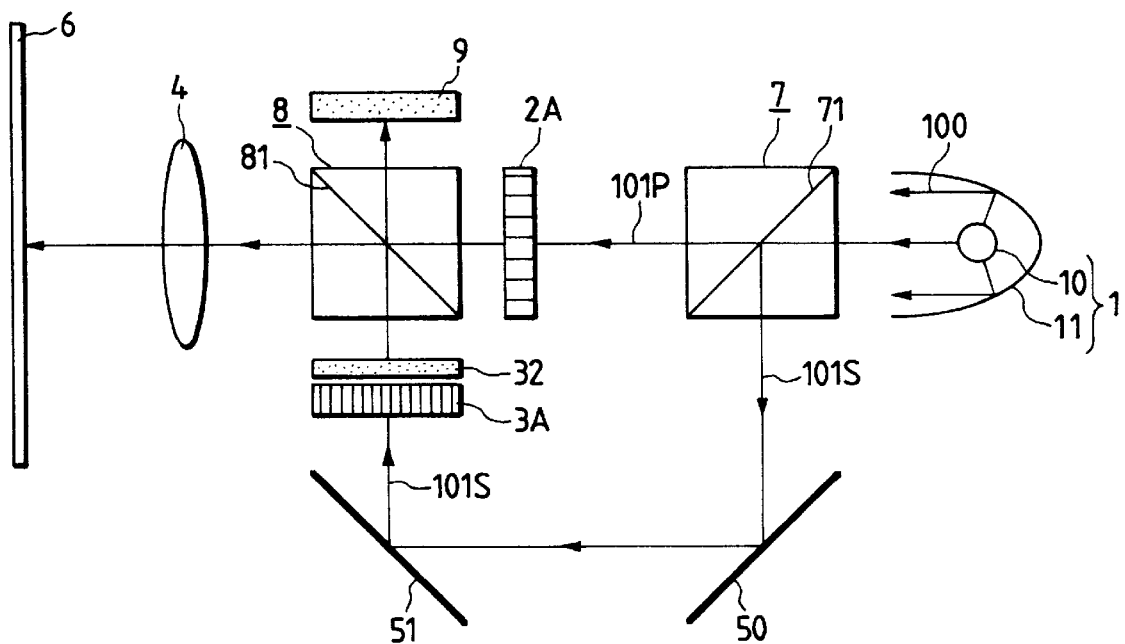
FIG. 4 is a diagram illustrating the configuration of the optical system of a projector apparatus in accordance with a fourth embodiment of the present invention.

FIG. 4 is a diagram illustrating a fourth embodiment of the present invention, in which, instead of the reflection-type liquid crystal panels, reference numeral 2A denotes a transmission-type liquid crystal panel for the luminance signal, and 3A denotes a transmission-type liquid crystal panel for the chrominance signal having the color filter 32 for the primaries, R, G, and B. Numeral 7 denotes the polarizing beam splitter serving as the light distributing means for distributing the light from the projecting light source 1. Numeral 8 denotes a polarizing beam splitter for combining light beams for forming an image from the transmitted light beams which have undergone optical modulation by being transmitted through the liquid crystal panel 2A for the luminance signal and the liquid crystal panel 3A for the chrominance signal, respectively. Numerals 71 and 81 denote polarizing/separating planes of the respective liquid crystal panels. Numerals 50 and 51 denote reflecting mirrors. Numeral 9 denotes a damper for absorbing unwanted light. The damper 9 is used to eliminate stray light in the optical system in order to improve the gradation characteristic of the projected image light and reduce the heat generation in the optical system.

Next, a description will be given of the operation. The light emitting from the projecting light source 1 is polarized and separated into the P waves 101P and the S waves 101S by the polarizing/separating plane 71 of the polarizing beam splitter 7. The P waves are guided toward the liquid crystal panel 2A for the chrominance signal, and the S waves are guided toward the liquid crystal panel 3A for the chrominance signal via the mirrors 50 and 51. In both the liquid crystal panel 2A for the luminance signal and the liquid crystal panel 3A for the chrominance signal, the light components transmitted through the pixels to which the liquid crystal-driving voltage is applied are not affected in their polarization directions. Hence, the P waves are made emergent from the liquid crystal panel 2A for the luminance signal, and the S waves are made emergent from the liquid crystal panel 3A for the chrominance signal, and the two light beams are directed towards the polarizing beam splitter 8 for combining the light beams. The P waves emergent from the liquid crystal panel 2A for the luminance signal are transmitted through the polarizing/separating plane 81, and the S waves emergent from the liquid crystal panel 3A for the chrominance signal are reflected by the polarizing/separating plane 81. Consequently, the P waves and the S waves are optically combined, and are enlarged and projected as a color image onto the screen 6 by the projection lens 4.

On the other hand, as for the light transmitted through the pixels to which no liquid crystal-driving voltage is applied, its polarization direction is rotated 90°, and the S waves and the P waves are made emergent from the liquid crystal panel 2A for the luminance signal and the liquid crystal panel 3A for the chrominance signal, respectively, and both of these waves are directed towards the polarizing beam splitter 8, i.e., the light combining means. The S waves emergent from the liquid crystal panel 2A for the luminance signal are reflected by the polarizing/separating plane 81, and are absorbed by the damper 9. Meanwhile, the P waves emergent from the liquid crystal panel 3A for the chrominance signal are also transmitted through the polarizing/separating plane 81, and are absorbed by the damper 9. As can be seen from the above-described operation, the apparatus of this embodiment is a projector apparatus of the normally black type. As described above, the polarizing beam splitters 7 and 8 serving as exclusive-use polarizing optical means are respectively used as the light distributing means and the light combining means.

Fifth Embodiment

Figure 5:
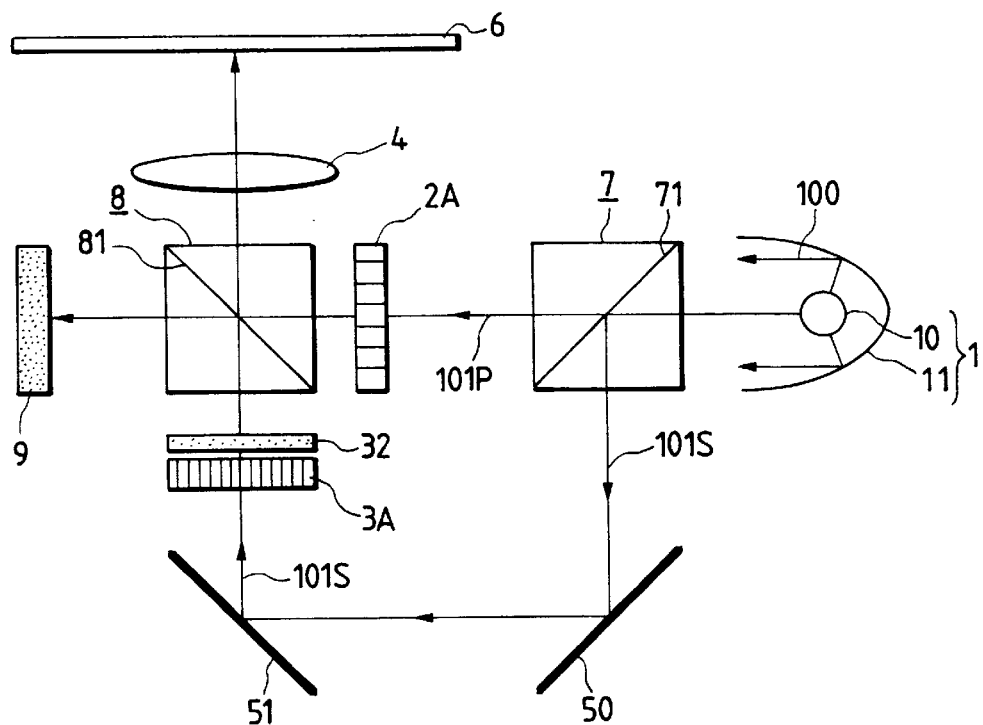
FIG. 5 is a diagram illustrating the configuration of the optical system of a projector apparatus in accordance with a fifth embodiment of the present invention.

FIG. 5 is a diagram illustrating a fifth embodiment of the present invention, which has a configuration in which the positions of the projection lens 4, the screen 6, and the damper 9 are replaced. In this configuration, as for the light transmitted through the pixels to which no liquid crystal-driving voltage is applied in the liquid crystal panel 2A for the luminance signal, its polarization direction is rotated 90°, and the light is reflected by the polarizing/separating plane 81 of the polarizing beam splitter 8 for combining the light beams, and is projected onto the screen 6 through the projection lens 4.

Also, as for the light transmitted through the pixels to which no liquid crystal-driving voltage is applied in the liquid crystal panel 3A for the chrominance signal, its polarization direction is rotated 90°, and the light is transmitted through the polarizing/separating plane 81 of the polarizing beam splitter 8 for combining the light beams, and is projected onto the screen 6 through the projection lens 4. The apparatus is configured as the so-called normally white type in terms of the operational mode.

In the projector apparatus in which a polarizing beam splitter serving as the polarizing optical means is used as the light distributing means and the light combining means, the operational mode can be changed simply by shifting the positions of the projection lens 4 and the screen 6 to the positions of those of the fourth embodiment by 90°. In the above-described normally black operational mode, it is possible to reproduce a projected image having an optimum white balance by adjusting the applied voltage, and in the normally white operational mode as in this embodiment it is possible to reproduce a projected image having an optimum black level by adjusting the applied voltage.

Accordingly, if an arrangement is provided such that two optical systems, one in the normally white operational mode in this fifth embodiment and the other in the normally black operational mode of the above-described fourth embodiment, and an image is projected in parallel (as in the conventional example shown in FIG. 26), it is possible to obtain a configuration in which both the black level and the white balance are excellent by optimally adjusting the applied voltage to the liquid crystal panels of the respective operational modes, i.e., one in which the so-called dynamic range of the projected image is wider. It goes without saying that the projected image can be further improved by adaptively varying the ratio of the projected light with respect to the projected image in both modes in correspondence with the white level component and the black level component of the video signal.

Further in this fifth embodiment, both the light components transmitted through the pixels to which the liquid crystal-driving voltage is applied in both panels 2A and 3A are not affected in their polarization directions. Hence, it goes without saying that the lightwaves 101P and 101S are transmitted or reflected by the polarizing beam splitter 8, and are consequently absorbed by the damper 9.

Sixth Embodiment

Figure 6:
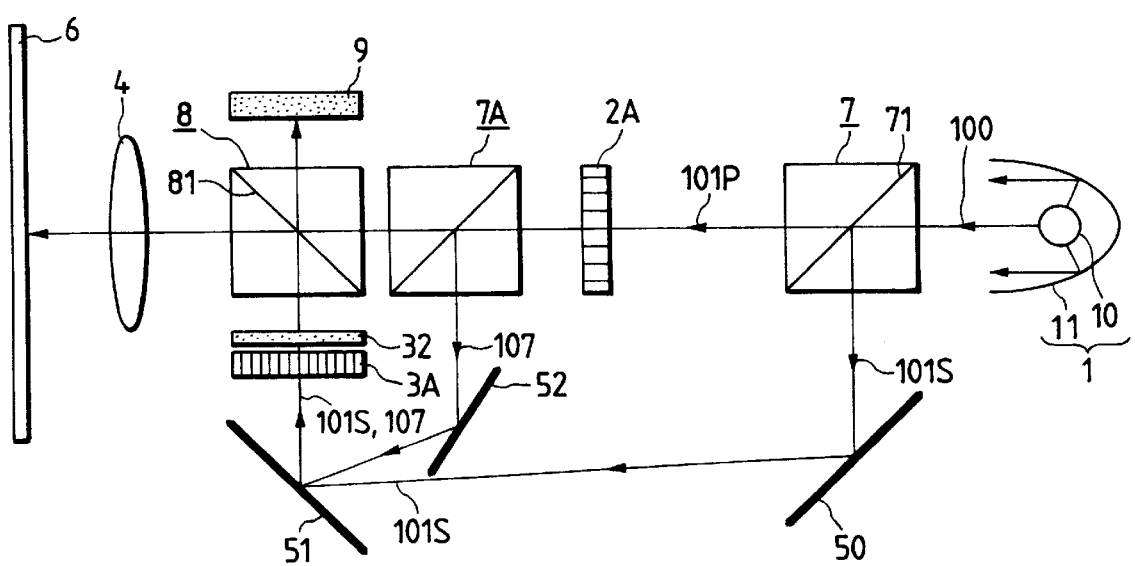
FIG. 6 is a diagram illustrating the configuration of the optical system of a projector apparatus in accordance with a sixth embodiment of the present invention.

FIG. 6 is a diagram illustrating a sixth embodiment of the present invention. In this embodiment, a new polarizing beam splitter 7A is interposed between the liquid crystal panel 2A for the luminance signal and the polarizing beam splitter 8, i.e., the light combining means, in the configuration of the above-described fourth embodiment, with the result that the light transmitted through the pixels to which no liquid crystal-driving voltage is applied in the liquid crystal panel 2A for the luminance signal, i.e., polarized light 107 of the S waves which do not contribute to the image formation is added to the light 101S for radiating the liquid crystal panel for the chrominance signal 3A via a mirror 52. In other words, the polarization directions of the light 107 and the light 101S are the same, and the lightwaves at this time are the S waves. Since the arrangement provided is such that the light which does not contribute to the image formation is guided to the other liquid crystal panel by using the polarizing optical means, the light from the projecting light source 1 can be effectively utilized, and a bright image can be obtained as a result.

In consequence, it is evident that the quantity of light absorbed by the damper 9 becomes small. This embodiment shows a first technological concept regarding how efficiently light which does not contribute to the image formation is utilized.

As a second technological concept for increasing the efficiency, a description will be given of seventh to 10th embodiments with respect to how the light from natural light is optically distributed to the respective light modulating means for the luminance signal and the chrominance signal with a minimum loss.

Seventh Embodiment

Figure 7:
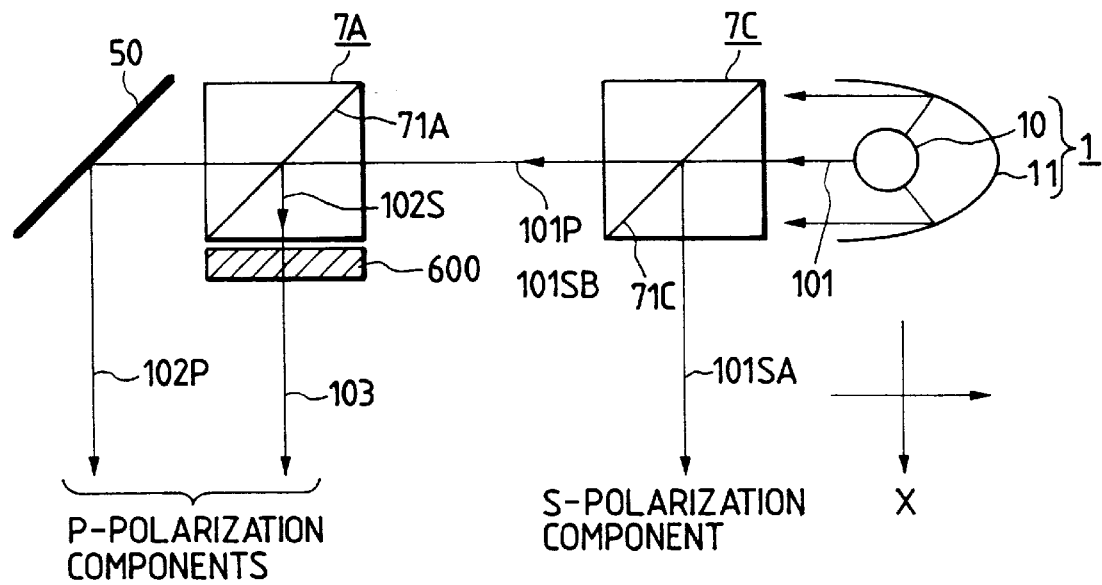
FIG. 7 is a diagram illustrating a configuration of a light-quantity distributing means of a projector apparatus in accordance with a seventh embodiment of the present invention.

FIG. 7 is a diagram illustrating a seventh embodiment in accordance with the present invention, and shows a schematic diagram of a light-quantity distributing means for distributing the quantity of light to the luminance-signal light modulating means and the chrominance-signal light modulating means of the liquid crystal projector apparatus at a predetermined ratio. In the drawing, numeral 10 denotes the lamp; 11, the reflecting mirror; 1, the projecting light source constituted by the lamp 10 and the reflecting mirror 11; 7C, a polarizing beam splitter having a P polarized light transmittance of 100% and an S polarized light reflectance of a predetermined value of 100% or less; 600, a phase difference plate for generating a phase difference in the light and changing the polarization state of the light to be propagated; 7A, the polarizing beam splitter having a P polarized light transmittance of 100% and an S polarized light reflectance of 100%; and 50, a plane reflecting mirror.

The projecting light source 1 is comprised of the lamp 10 and the reflecting mirror 1, and emits white emergent light 101 which is substantially parallel. The arrangement concerning the emergent light has been described in the first embodiment, and a detailed description thereof will be omitted.

The emergent light 101 is made incident upon the polarizing beam splitter 7C, i.e., a polarizing optical means having different polarizing/separating characteristics. Although the incident light is natural light, i.e., light which is polarized randomly in various directions, all the P polarized light is transmitted (light beam 101P) by a separating plane 71C of the polarizing beam splitter 7C, and the S polarized light perpendicular thereto is partially reflected and partially transmitted. As a result, S polarized light 101SA corresponding to the reflection ratio of the S polarized light is made emergent in the X-direction in the drawing. The P polarized light (light beam 101P) and the S polarized light (light beam 101SB) which are transmitted through the polarizing beam splitter 7C are made incident upon the polarizing beam splitter 7A.

Incidentally, the arrangement in which part of the S polarized light 101SB undergoes the so-called leakage and is propagated together with the P polarized light 101P at the polarizing/separating plane 71C becomes possible if the separating plane of the polarizing/separating plane is processed in such a manner as to be partially provided with the characteristic of completely polarizing and separating the S and P waves and to be partially provided with the characteristic of transmitting both the S and P waves. By varying the ratio of the area in the two processings, it is possible to vary the reflectance of the S polarized light substantially arbitrarily.

The P polarized light component (light beam 102P) is transmitted by 100% by the polarizing beam splitter 7A, and is reflected by the plane reflecting mirror 50 so as to be formed as the light beam 102P. Meanwhile, the S polarized light component (light beam 101SB) is reflected by 100%, and emerges in the X-direction in the drawing. The reflected S polarized light 102S passes through the phase difference plate 600, so that its polarization direction undergoes a 90° change, and the light is formed into the P polarized light. Consequently, the quantity of the light from the projecting light source 1 can be distributed into the P polarized light and the S polarized light at a predetermined ratio.

Then, if the P polarized light (102P and 103) and the S polarized light (101SA) are made incident upon the transmission-type liquid crystal panels for the luminance signal and the chrominance signal shown in, for example, FIG. 4 or FIG. 5, respectively, it is possible to provide the luminance-signal optical modulation and the chrominance-signal optical modulation on the basis of an arbitrary ratio of the quantity of light between the P waves and the S waves (the ratio of the quantity of light for establishing a balance between the projected image from the luminance-signal optically-modulated light and the chrominance-signal optically-modulated light). That is, the second technological concept of varying the ratio between the P waves and the S waves extracted from the natural light is introduced instead of the conventional arrangement in which the quantity of light must be distributed by partly shielding, i.e., causing a loss in, the quantity of either light component which is bright (e.g., the light for the luminance-signal light modulating means). Accordingly, the quantity of light can be distributed with a small loss.

Eighth Embodiment

Figure 8:
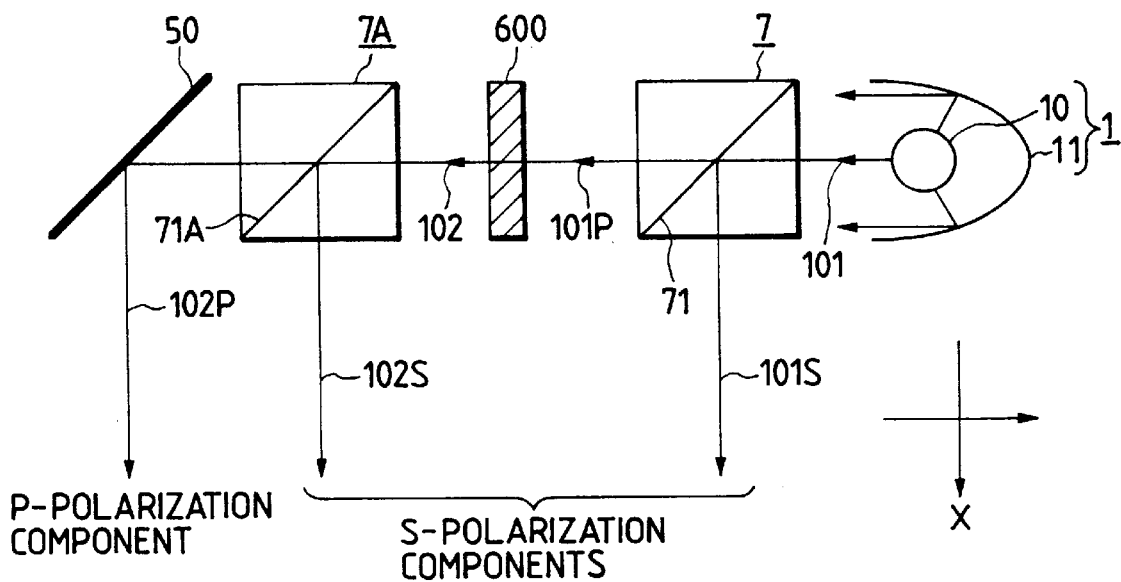
FIG. 8 is a diagram illustrating another configuration of the light-quantity distributing means of the projector apparatus in accordance with an eighth embodiment of the present invention.

FIG. 8 is a schematic diagram of another example of the light-quantity distributing means of the liquid crystal projector apparatus in accordance with an eighth embodiment of the present invention. In the drawing, numeral 10 denotes the lamp; 11, the reflecting mirror; 1, the projecting light source constituted by the lamp 10 and the reflecting mirror 11; 7, the polarizing beam splitter having a P polarized light transmittance of 100% and an S polarized light reflectance of 100%; 600, the phase difference plate; 7A, the polarizing beam splitter having a P polarized light transmittance of 100% and an S polarized light reflectance of 100%; and 50, the plane reflecting mirror.

The projecting light source 1 is comprised of the lamp 10 and the reflecting mirror 1, and emits white emergent light 101 which is substantially parallel.

The emergent light 101 is made incident upon the polarizing beam splitter 7. Although the incident light is natural light, of the light incident upon the separating plane 71 of the polarizing beam splitter 7, all the P polarized light is transmitted (light beam 101P), and the S polarized light is wholly reflected. As a result, the S polarized light 101S is made emergent in the X-direction in the drawing.

The P polarized light 101P transmitted through the polarizing beam splitter 7 is made incident upon the phase difference plate for causing a difference in the phase velocity of the propagating polarized light and for changing its polarization state. As the P polarized light 101P is transmitted through the phase difference plate 600, its polarization state undergoes a change. As the light 102 whose state has changed is made incident upon the polarizing beam splitter 7A, part of the light is polarized and separated into the P polarized light component 102P and the other part thereof is polarized and separated into the S polarized light component, and the S polarized light component emerges in the X-direction in the drawing. At this time, if the phase difference plate 600 is rotated, the ratio of division between the P polarized light component 102P and the S polarized light component 102S can be varied substantially arbitrarily.

That is, in this eighth embodiment, two polarizing beam splitters having the same characteristics are used, but as the phase difference plate 600 disposed therebetween is rotated, the ratio of the quantity of light between the P waves and the S waves from the natural light can be varied with a minimum loss. This embodiment has an advantage in that the ratio of distribution of the quantity of light is adjustable.

Ninth Embodiment

Figure 9:
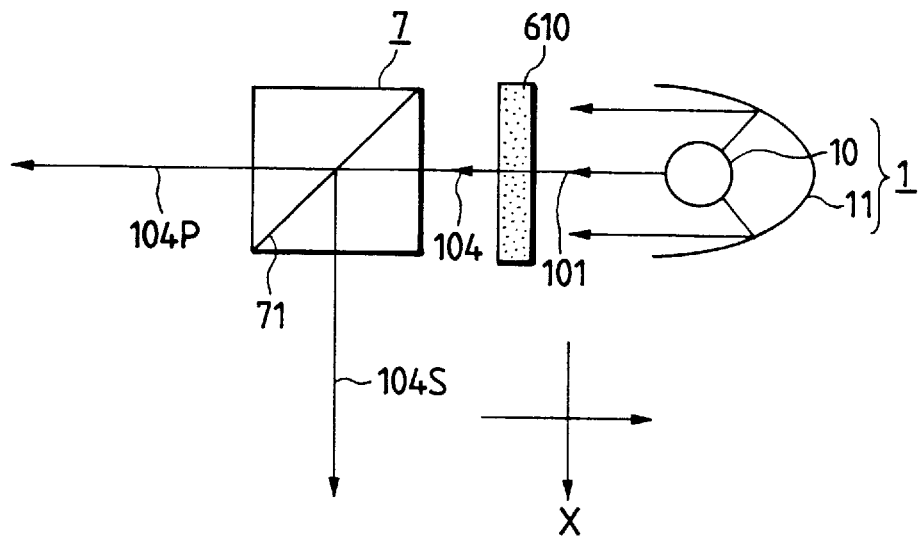
FIG. 9 is a diagram illustrating still another configuration of the light-quantity distributing means of the projector apparatus in accordance with a ninth embodiment of the present invention.

FIG. 9 is a schematic diagram of still another example of the light-quantity distributing means of the liquid crystal projector apparatus in accordance with a ninth embodiment of the present invention. In the drawing, numeral 10 denotes the lamp; 11, the reflecting mirror; 1, the projecting light source constituted by the lamp 10 and the reflecting mirror 11; 610, a monochromatic liquid crystal panel with pixels; and 7, the polarizing beam splitter having a P polarized light transmittance of 100% and an S polarized light reflectance of 100%.

The projecting light source 1 is comprised of the lamp 10 and the reflecting mirror 1, and emits white emergent light 101 which is substantially parallel.

The emergent light 101 is made incident upon the monochromatic liquid crystal panel 610 with pixels. Although the incident light is natural light, the polarization state is converted to, for example, an elliptically polarized state by the liquid crystal panel 610, the P polarized light is converted to the S polarized light, and the S polarized light becomes partially P polarized light. This light 104 emerging from the liquid crystal panel 610 is made incident upon the polarizing beam splitter 7, whereby the P polarized light component 104 is transmitted by 100%, while the S polarized light component is reflected by 100%, and emerges in the X-direction in the drawing.

Then, the operation in which the monochromatic liquid crystal panel 610 with pixels changes the polarization state of the incident natural light is capable of adjusting the degree to which the polarization state changes by changing the thickness of the liquid crystal panel or by changing the voltage applied to the respective pixels. Accordingly, the change of the thickness or the adjustment of the voltage applied to the pixels makes it possible to adjust the ratio of the quantity of light between the P waves 104P and the S waves 104S emergent from the polarizing beam splitter 7. In particular, the method of adjusting the voltage applied to the pixels permits the use of an electronic control method, so that a further advantage is imparted to the light-quantity distributing means.

10th Embodiment

Figure 10:
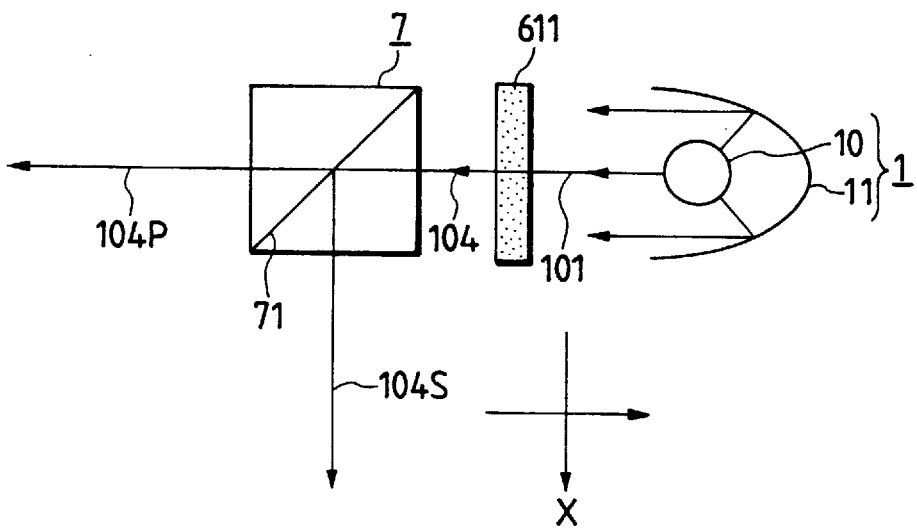
FIG. 10 is a diagram illustrating a further configuration of the light-quantity distributing means of the projector apparatus in accordance with a 10th embodiment of the present invention.

FIG. 10 is a schematic diagram of a further example of the light-quantity distributing means of the liquid crystal projector apparatus in accordance with a 10th embodiment of the present invention. In the drawing, numeral 1 denotes the projecting light source constituted by the lamp 10 and the reflecting mirror 11; 611, a monochromatic liquid crystal panel without pixels; and 7, the polarizing beam splitter having a P polarized light transmittance of 100% and an S polarized light reflectance of 100%.

The emergent light 101 is made incident upon the monochromatic liquid crystal panel 611 without pixels. Although the incident light is natural light, the polarization state is converted to, for example, an elliptically polarized state by the liquid crystal panel 611 without pixels, the P polarized light is converted to the S polarized light, and the S polarized light becomes partially P polarized light. This light 104 emerging from the liquid crystal panel 611 without pixels is made incident upon the polarizing beam splitter 7, whereby the P polarized light component 104 is transmitted by 100%, while the S polarized light component is reflected by 100%, and emerges in the X-direction in the drawing.

In other words, since the liquid crystal panel 611 without pixels is used instead of the liquid crystal panel 610 with pixels in the above-described ninth embodiment, the ratio of the quantity of light between the P waves 104P and the S waves 104S can be adjusted by changing its thickness or varying the voltage applied across the liquid crystal. Moreover, the apparatus can be fabricated at a lower cost than that of the ninth embodiment.

However, the adjustment of the voltage applied to the pixels is not taken into consideration. It goes without saying that a uniform or nonuniform voltage or electric field can be applied to the overall surface of the liquid crystal panel.

In other words, the apparatuses in the above-described seventh to 10th embodiments are each basically comprised of the polarization controlling means for determining the ratio of the quantity of light between the polarized light components which are perpendicular to each other, as well as the light distributing means for distributing the quantity of light for the luminance-signal light modulating means and the chrominance-signal light modulating means at a predetermined ratio determined by the aforementioned ratio.

In particular, since the technological concept is used in which the ratio between the P waves and the S waves from the natural light is changed by optically combining the light beams after recombining one wave to the other wave, the light-quantity distributing means has a small optical loss. This technological concept shows the second technological concept for enhancing the efficiency of the projector apparatus.

In the foregoing embodiments, the light modulating means for the luminance signal or the chrominance signal is used with respect to the entire range of optical wavelengths of all the visible light of either the P waves or the S waves. However, an arrangement is possible in which the tone of color is improved by dividing the range of optical wavelengths of the visible light into two or three optical wavelength bands in correspondence with the three primary colors and by providing optical modulation. Although the range of optical wavelengths is merely divided in the conventional art, the following embodiments show examples in which there is provided an optical modulation system which takes into consideration greater adaptation to brightness and the visual characteristics of a human being by further imparting respective roles to the P waves and the S waves in the range of the optical wavelengths. In other words, following the above-described two technological concepts concerning the enhancement of efficiency, a description will be given below of various embodiments of a third technological concept for realizing a projected image of an improved tone of color and brightness.

11th Embodiment

Figure 11:
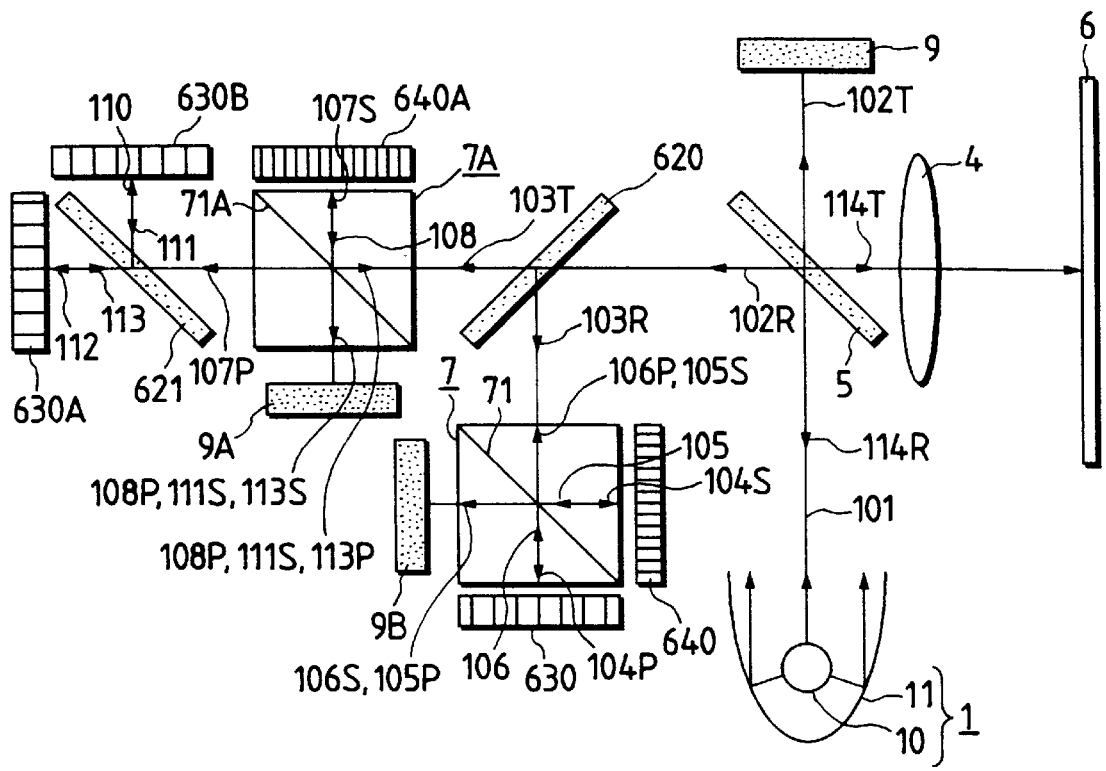
FIG. 11 is a diagram illustrating the configuration of the optical system of a projector apparatus in accordance with an 11th embodiment of the present invention.

FIG. 11 is a schematic diagram of an optical system of the liquid crystal projector apparatus in accordance with an 11th embodiment of the present invention. In the drawing, numeral 1 denotes the projecting light source constituted by the lamp 10 and the reflecting mirror 11; 5 denotes the half mirror; 620 denotes a blue-light reflecting dichroic mirror; 7 and 7A denote the polarizing beam splitters each having both a P polarized light transmittance and an S polarized light reflectance of 100%; 621 denotes a red-light reflecting dichroic mirror; 640 and 640A denote high-resolution liquid crystal panels of the luminance-signal light modulating means; 630, 630A, and 630B denote low-resolution liquid crystal panels of the chrominance-signal light modulating means; 9, 9A, and 9B denote light dampers; 4 denotes the projection lens; and 6 denotes the screen.

The projecting light source 1 is comprised of the lamp 10 and the reflecting mirror 1, and emits white emergent light 101 which is substantially parallel.

The emergent light 101 is made incident upon the half mirror 5. Light 102R reflected by the half mirror 5 is made incident upon the blue-light reflecting dichroic mirror 620.

Figure 12:
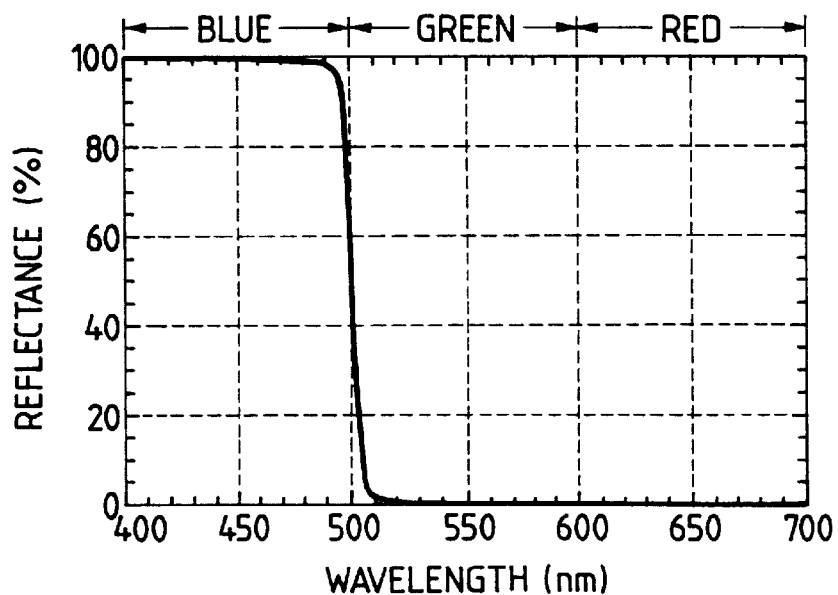
FIG. 12 is a diagram illustrating the wavelength dependence of the reflectance of a blue-light reflecting dichroic mirror used in the 11th embodiment of the present invention.

In addition, part of light 102T transmitted through the half mirror 5 is absorbed by the light damper 9. The blue-light reflecting dichroic mirror 620 is a mirror comprising a dielectric multilayered film, and selectively reflects only the blue light due to the wavelength dependence of its reflectance, as schematically shown in FIG. 12. Light 103R reflected by the blue-light reflecting dichroic mirror 620 is made incident upon the polarizing beam splitter 7.

The light 103R incident upon the polarizing beam splitter 7 is separated substantially by 100% into the P polarized light 104P and the S polarized light 104S by the polarizing/separating plane 71, and the respective light beams are made incident upon the low-resolution liquid crystal panel 630 and the high-resolution liquid crystal panel 640, respectively.

When voltages applied to both the high-resolution liquid crystal panel 640 and the low-resolution liquid crystal panel 630 are zero, the polarization plane of each of the incident light 104S and 104P rotates along the orientation direction of the liquid crystal molecules in the liquid crystal panel, and the light is reflected by a reflecting film located at the bottom of the liquid crystal panel. As the reflected light passes through the liquid crystal panel again, the reflected light undergoes the rotation of the polarization plane in a direction opposite to that during the initial incidence (i.e., returns to the same polarization direction as in the beginning), thereby to be formed as the emergent light 105 and 106. In this case, since the polarization directions of the emergent light 105 and 106 are the same as those of the incident light 104S and 104P, the emergent light 105 and 106 follows the opposite routes, and is made incident upon the sides of the projection lens 4 and the projecting light source 1. The light incident upon the projection lens 4 is projected onto the screen as a projected image contributing to the image formation.

When voltages are applied to the high-resolution liquid crystal panel 640 and the low-resolution liquid crystal panel 630, the incident light beams 104S and 104P are respectively converted to elliptically polarized light beams due to the birefringence effect of the liquid crystal molecules in the respective liquid crystal panels, and are reflected by the reflecting films located at the bottoms of the liquid crystal panels. As the reflected light passes through the respective liquid crystal panels again, the reflected light is further subjected to the birefringence effect, thereby to be formed as the emergent light 105 and 106 (in this case, elliptically polarized light; however, the light becomes linearly polarized light whose polarization plane is rotated 90° from the state during incidence upon the application of a voltage). Of the emergent elliptically polarized light 105 and 106, the S polarized light component 105S of the light 105 and the P polarized light component 106P of the light 106 follow the opposite route, are made incident upon the projection lens 4, and are projected onto the screen 6 as an image.

Of the elliptically polarized light 105 and 106, the remaining P polarized light 105P and the remaining S polarized light 106S are absorbed by the light damper 9B. These light components do not contribute to the image formation.

Light 103T transmitted through the blue-light reflecting dichroic mirror 620 is made incident upon the polarizing beam splitter 7A. The light 103T incident upon the polarizing beam splitter 7A is separated into P polarized light 107P and S polarized light 107S by a polarizing/separating plane 71A. The S polarized light 107S reflected by the polarizing/separating plane 71A is made incident upon the high-resolution liquid crystal panel 640A. As for the light 107S incident upon the high-resolution liquid crystal panel 640A, light corresponding to the applied voltage (the S polarized light component 108S of the return light 108) is projected onto the screen 6 through the projection lens 4 on the basis of the same principle as described above. (However, since the half mirror 5 is present, part of the light returns to the projecting light source 1.)

Figure 13:
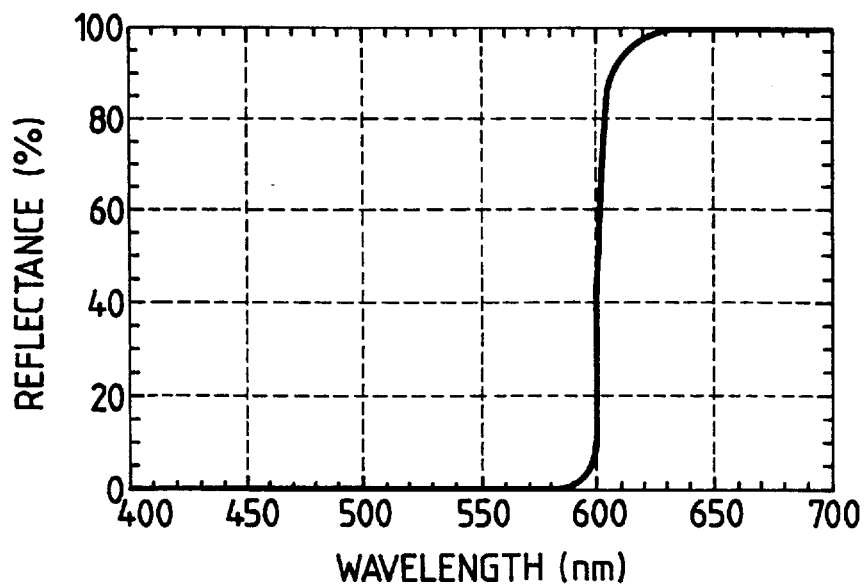
FIG. 13 is a diagram illustrating the wavelength dependence of the reflectance of a red-light reflecting dichroic mirror used in the 11th embodiment of the present invention.

The P polarized light 107P transmitted through the polarizing beam splitter 7A is made incident upon the red-light reflecting dichroic mirror 621. The red-light reflecting dichroic mirror 621 is a mirror comprising a dielectric multilayered film, and selectively reflects only the red light due to the wavelength dependence of its reflectance, as schematically shown in FIG. 13. Light 110 reflected by the red-light reflecting dichroic mirror 621 is made incident upon the low-resolution liquid crystal panel 630B. Meanwhile, light 112 transmitted through the red-light reflecting dichroic mirror 621 is made incident upon the low-resolution liquid crystal panel 630A. As for the light 112 and 110 incident upon the low-resolution liquid crystal panels 630A and 630B, light corresponding to the applied voltage (the P polarized light components 111P and 113P of the return light 111 and 113) is projected onto the screen 6 through the projection lens 4 on the basis of the same principle as described above.

The polarized light components 108P, 111S, and 113S which do not contribute to the image formation, i.e., the polarized light components whose polarization planes, i.e., polarization directions, have been rotated 90° by birefringence due to incidence and reflection, are absorbed by the light damper 9A.

A proper image is projected onto the screen by the combination of the light beams projected onto the screen in the above-described process. Of the light projected onto the screen, the light 108S and 105S which returned from the high-resolution liquid crystal panel forms an image of the luminance signal, while the light 106P, 111P, and 113P which returned from the low-resolution liquid crystal panel forms an image of the chrominance signal.

In other words, optical modulation is carried out by the following combination with respect to the primary-color signals: The S waves are subjected to optical modulation by a single luminance-signal light modulating means (in this case, the high-resolution liquid crystal panel 640A) on the basis of a luminance signal (K component) combining two luminance signals concerning green and red. The P waves are subjected to optical modulation by respectively independent chrominance-signal light modulating means (630A for green and 630B for red) on the basis of respective chrominance signals (C components) concerning green and red. Further, the S waves are subjected to optical modulation by another independent luminance-signal light modulating means (in this case, 640) on the basis of the remaining luminance signal (K component) for blue, while the P waves are subjected to optical modulation by the chrominance-signal light modulating means (in this case, 630) on the basis of the remaining chrominance signal (C component) for blue.

The relationship between the polarized light (P, S) and the K and C components of the primary-color video signals is shown in FIG. 28A. Incidentally, parentheses above the characters, blue, green, and red, indicate liquid crystal panels. In this case, a five-panel configuration is shown.

In addition, if an arrangement is adopted in which the positions of the blue-light reflecting dichroic mirror 620 and the red-light reflecting dichroic mirror 621 are replaced with each other, it is possible to obtain similar results. Such a configuration of the optical system is the so-called normally white system in which a white screen is formed on the screen when no voltage is applied to the liquid crystal panels.

A combination which is described below is also present as the relationship between the polarized light (P, S) and the K and C components of the primary-color video signals. A description will be given of this combination as a 12th embodiment.

12th Embodiment

Figure 14:
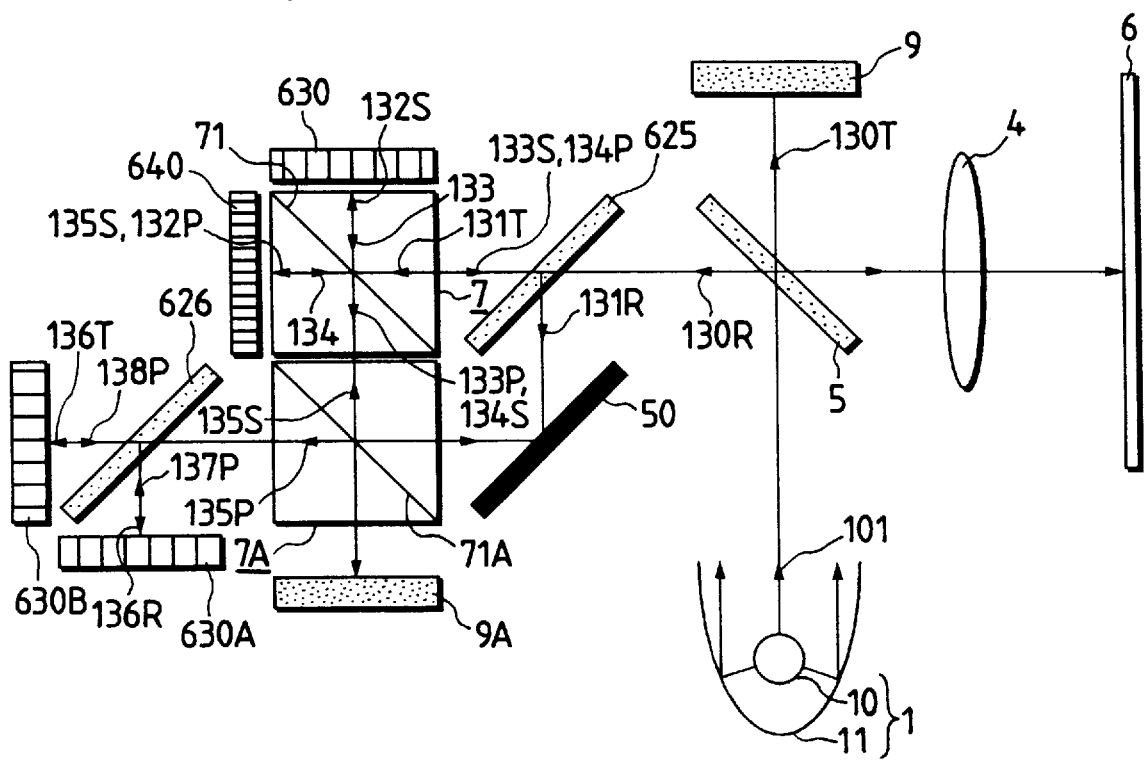
FIG. 14 is a diagram illustrating the configuration of the optical system of a projector apparatus in accordance with a 12th embodiment of the present invention.

FIG. 14 is a schematic diagram of the optical system of the liquid crystal projector apparatus in accordance with a 12th embodiment of the present invention. In the drawing, numeral 1 denotes the projecting light source constituted by the lamp 10 and the reflecting mirror 11; 5 denotes the half mirror; 9 and 9A denote the light dampers; 625 denotes a blue-light transmitting dichroic mirror; 50 denotes a total reflection mirror; 626 denotes a red-light reflecting dichroic mirror; 7 and 7A denote the polarizing beam splitters each having both a P polarized light transmittance and an S polarized light reflectance of 100%; 640 denotes the high-resolution liquid crystal panel; 630, 630A, and 630B denote the low-resolution liquid crystal panels; 4 denotes the projection lens; and 6 denotes the screen.

The emergent light 101 is made incident upon the half mirror 5, and is thereby branched into reflected light 130R and transmitted light 130T. Part of the transmitted light 130T is absorbed by the light damper 9. The reflected light 130R is made incident upon the blue-light transmitting dichroic mirror 625. Light 131R reflected by the blue-light transmitting dichroic mirror 625 is made incident upon the polarizing beam splitter 7A. Further, light 131T transmitted through the blue-light transmitting dichroic mirror 625 is made incident upon the polarizing beam splitter 7.

Figure 15:
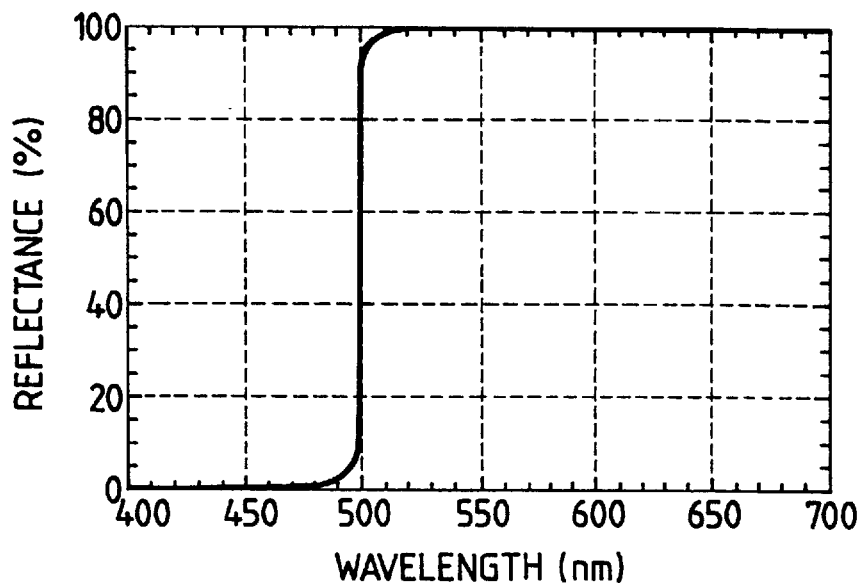
FIG. 15 is a diagram illustrating the wavelength dependence of a blue-light transmitting dichroic mirror used in the 12th embodiment of the present invention.

The blue-light transmitting dichroic mirror 625 is a mirror comprising a dielectric multilayered film, and selectively transmits only the blue light due to the wavelength dependence of its reflectance, as schematically shown in FIG. 15. The light 131T transmitted through the blue-light transmitting dichroic mirror 625 is made incident upon the polarizing beam splitter 7. The light 131T incident upon the polarizing beam splitter 7 is polarized and separated into P polarized light 132P and S polarized light 132S by the polarizing/separating plane 71, and the respective light beams are made incident upon the high-resolution liquid crystal panel 640 and the low-resolution liquid crystal panel 630, respectively.

When voltages applied to both the high-resolution liquid crystal panel 640 and the low-resolution liquid crystal panel 630 are zero, the polarization plane of each of the incident light 132P and 132S rotates along the orientation direction of the liquid crystal molecules in the liquid crystal panel, and the light is reflected by a reflecting film located at the bottom of the liquid crystal panel. As the reflected light passes through the liquid crystal panel again, the reflected light undergoes the rotation of the polarization plane in a direction opposite to that during the initial incidence (i.e., returns to the same polarization direction as in the beginning), thereby to be formed as emergent light 133 and 134. In this case, since the polarization directions of the emergent light 133 and 134 are the same as those of the incident light 132S and 132P, the emergent light 133 and 134 follows the opposite routes, and half of the light is returned to the projecting light source 1 by the half mirror 5, while the remaining half is projected onto the screen 6 through the projection lens 4.

When voltages are applied to the high-resolution liquid crystal panel 640 and the low-resolution liquid crystal panel 630, the incident light beams 132S and 132P are respectively converted to elliptically polarized light beams due to the birefringence effect of the liquid crystal molecules in the respective liquid crystal panels, and are reflected by the reflecting films located at the bottoms of the liquid crystal panels. As the reflected light passes through the respective liquid crystal panels again, the reflected light is further subjected to the birefringence effect, thereby to be formed as the emergent light 133 and 134 (in this case, elliptically polarized light; however, the light becomes linearly polarized light whose polarization plane is rotated 90° from the state during incidence upon the application of a voltage). Of the emergent elliptically polarized light 133 and 134, an S polarized light component 133S of the light 133 and a P polarized light component 134P of the light 134 are made incident upon the projection lens 4, and are projected onto the screen 6 as an image signal. The light 133P and 134S which does not contribute to the image formation is made incident upon the other polarizing beam splitter 7A. Then, the light 133P is absorbed by the light damper 9A, and the light 134S is consequently returned to the projecting light source 1.

The light beams 131R (e.g., light beams each having optical wavelengths of green and red) other than the blue color reflected by the blue-light transmitting dichroic mirror 625 is made incident upon the polarizing beam splitter 7A through the total reflection mirror 50. The light 131R incident upon the polarizing beam splitter 7A is polarized and separated into P polarized light 135P and S polarized light 135S by the polarizing/separating plane 71A. The S polarized light 135S reflected by the polarizing/separating plane 71A is made incident upon the polarizing beam splitter 7, is reflected by the polarizing/separating plane 71, and is made incident upon the high-resolution liquid crystal panel 640. As for the light 135S incident upon the high-resolution liquid crystal panel 640, light corresponding to the applied voltage (part of the P polarized light component 134P of the return light 134) is projected onto the screen 6 through the projection lens 4 on the basis of the same principle as described above.

The P polarized light 135P transmitted through the polarizing beam splitter 7A is made incident upon the red-light reflecting dichroic mirror 626. The red-light reflecting dichroic mirror 626 is a mirror comprising a dielectric multilayered film, and the wavelength dependence of its reflectance is schematically shown in FIG. 13. Light 136R reflected by the red-light reflecting dichroic mirror 626 is made incident upon the low-resolution liquid crystal panel 630A. Meanwhile, light 136T transmitted through the red-light reflecting dichroic mirror 626 is made incident upon the low-resolution liquid crystal panel 630B. As for the light 136R and 136T incident upon the low-resolution liquid crystal panels 630A and 630B, light corresponding to the applied voltage (the P polarized light components 137P and 138P of the return light 137 and 138) is projected onto the screen 6 through the projection lens 4 on the basis of the same principle as described above.

A proper image is projected onto the screen by the combination of the light beams projected onto the screen in the above-described process.

In other words, the S waves in the optical wavelength bands of green and red are subjected to optical modulation by a single luminance-signal light modulating means (in this case, the high-resolution liquid crystal panel 640) on the basis of a luminance signal (K component) combining two luminance signals concerning green and red among the primary-color signals. Meanwhile, the P waves in the optical wavelength band of blue are subjected to optical modulation by the same luminance-signal light modulating means (640) on the basis of the chrominance signals concerning blue.

Then, the respective light beams are subjected to optical modulation by the independent liquid crystal panels (630, 630B, 630A) on the basis of the chrominance signals (C components) concerning blue, green and red among the primary-color signals. The configuration provided is such that, at this time, with respect to green and red, the P waves are subjected to optical modulation, and as for blue the S waves are subjected to optical modulation.

As compared with the preceding embodiment, this 12th embodiment (FIG. 14) offers an advantage in that the luminance-signal light modulating means can be configured by the single high-resolution liquid crystal panel 640.

Incidentally, the relationship between the polarized light (P, S) and the K and C components of the primary-color video signals is shown in FIG. 28B. In this drawing, blue of the P waves and green and red of the S waves are formed by an identical liquid crystal panel, so that the parentheses are connected by a single line, as shown in the drawing. That is, this drawing illustrates a four-liquid-crystal-panel configuration.

Figure 16:
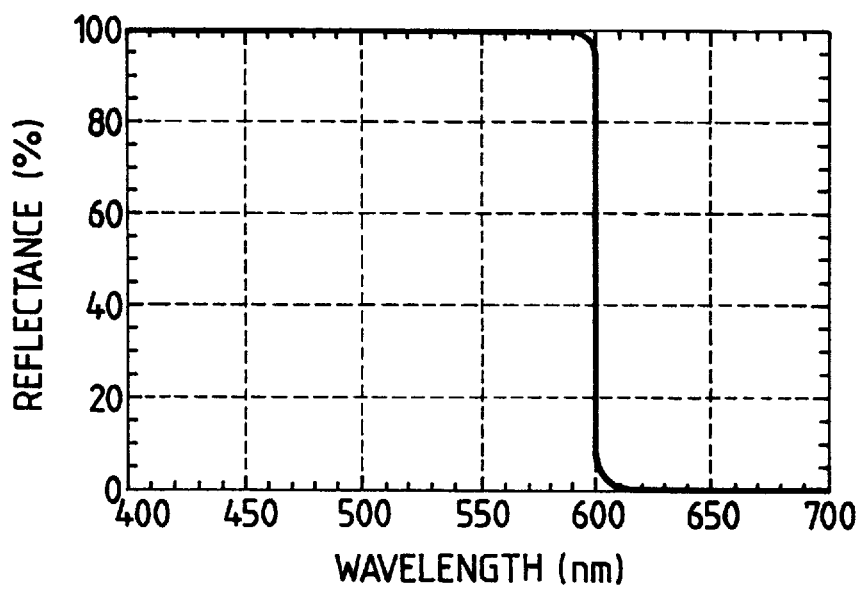
FIG. 16 is a diagram illustrating the wavelength dependence of a red-light transmitting dichroic mirror used in the 12th embodiment of the present invention.

In addition, it is possible to obtain similar effects if the blue-light transmitting dichroic mirror 625 and the red-light reflecting dichroic mirror 626 are replaced by the red-light transmitting dichroic mirror having the characteristic schematically shown in FIG. 16 and the blue-light reflecting dichroic mirror having the characteristic shown in FIG. 12.

With such a configuration of the optical system, the apparatus operates as the so-called normally white system described above. To obtain the so-called normally black system in which a black screen is formed on the screen when no voltages are applied to the liquid crystal panels, it suffices if the configuration of the following 13th embodiment shown in FIG. 17 is adopted.

13th Embodiment

Figure 17:
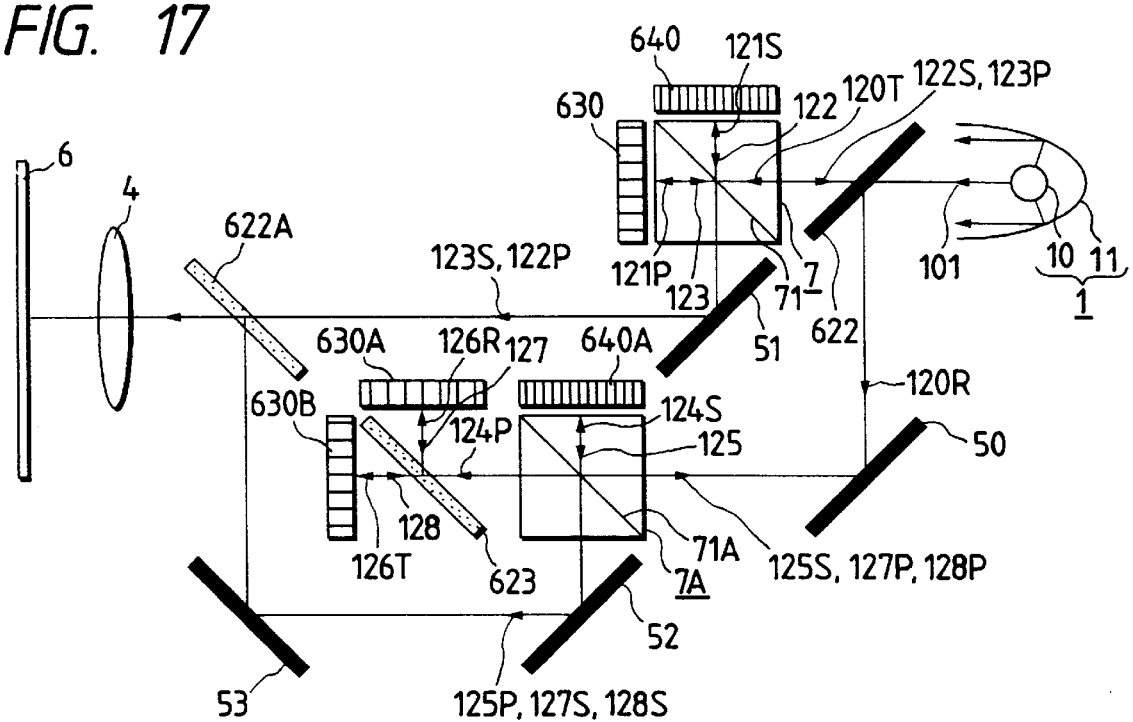
FIG. 17 is a diagram illustrating the configuration of the optical system of a projector apparatus in accordance with a 13th embodiment of the present invention.

FIG. 17 is a schematic diagram of the optical system of the normally black type in accordance with a 13th embodiment of the present invention. In the drawing, numeral 1 denotes the projecting light source constituted by the lamp 10 and the reflecting mirror 11; 622 and 622A denote blue-light transmitting dichroic mirrors; 50 to 53 denote total reflection mirrors; 623 denotes a red-light reflecting dichroic mirror; 7 and 7A denote the polarizing beam splitters each having both a P polarized light transmittance and an S polarized light reflectance of 100%; 640 and 640A denote the high-resolution liquid crystal panels; 630, 630A, and 630B denote the low-resolution liquid crystal panels; 4 denotes the projection lens; and 6 denotes the screen.

The projecting light source 1 is comprised of the lamp 10 and the reflecting mirror 1, and emits white emergent light 101 which is substantially parallel.

The emergent light 101 is made incident upon the blue-light transmitting dichroic mirror 622. Light 120R reflected by the blue-light transmitting dichroic mirror 622 is made incident upon the polarizing beam splitter 7A. Further, light 120T transmitted through the blue-light transmitting dichroic mirror 622 is made incident upon the polarizing beam splitter 7.

The blue-light transmitting dichroic mirror 622 is a mirror comprising a dielectric multilayered film, and selectively transmits only the blue light due to the wavelength dependence of its reflectance, as schematically shown in FIG. 15. The light 120T incident upon the polarizing beam splitter 7 is polarized and separated into P polarized light 121P and S polarized light 121S by the polarizing/separating plane 71, and the respective light beams are made incident upon the low-resolution liquid crystal panel 630 and the high-resolution liquid crystal panel 640, respectively.

When voltages applied to both the high-resolution liquid crystal panel 640 and the low-resolution liquid crystal panel 630 are zero, the polarization plane of each of the incident light 121S and 121P rotates along the orientation direction of the liquid crystal molecules in the liquid crystal panel, and the light is reflected by a reflecting film located at the bottom of the liquid crystal panel. As the reflected light passes through the liquid crystal panel again, the reflected light undergoes the rotation of the polarization plane in a direction opposite to that during the initial incidence (i.e., returns to the same polarization direction as in the beginning), thereby to be formed as emergent light 122 and 123. In this case, since the polarization directions of the emergent light 122 and 123 are the same as those of the incident light 121S and 121P, the emergent light 122 and 123 follows the opposite routes, and returns to the projecting light source 1, so that the light is not emitted toward the screen 6. In other words, a light reutilizing circulation system is configured in which the light which does not contribute to the image formation is returned again toward the projecting light source 1.

When voltages are applied to the high-resolution liquid crystal panel 640 and the low-resolution liquid crystal panel 630, the incident light beams 121S and 121P are respectively converted to elliptically polarized light beams due to the birefringence effect of the liquid crystal molecules in the respective liquid crystal panels, and are reflected by the reflecting films located at the bottoms of the liquid crystal panels. As the reflected light passes through the respective liquid crystal panels again, the reflected light is further subjected to the birefringence effect, thereby to be formed as the emergent light 122 and 123 (in this case, elliptically polarized light; however, the light becomes linearly polarized light whose polarization plane is rotated 90° from the state during incidence upon the application of a voltage). Of the emergent elliptically polarized light 122 and 123, a P polarized light component 122P of the light 122 and an S polarized light component 123S of the light 123 are transmitted through another blue-light transmitting dichroic mirror 622A via the mirror 51 as a result of the optical combination due to the other operation, i.e., the light combining operation, of the polarizing beam splitter 7, are then made incident upon the projection lens 4, and are projected onto the screen 6 as the image.

The light 120R reflected by the blue-light transmitting dichroic mirror 622 is made incident upon the polarizing beam splitter 7A through the total reflection mirror 50. S polarized light 124S, which is obtained when the light 120R incident upon the polarizing beam splitter 7A is reflected by the polarizing/separating plane 71A, is made incident upon the high-resolution liquid crystal panel 640A. As for the light 124S incident upon the high-resolution liquid crystal panel 640A, light corresponding to the applied voltage (a P polarized light component 125P of return light 125) is projected onto the screen 6 through the projection lens 4 on the basis of the same principle as described above.

P polarized light 124P transmitted through the polarizing beam splitter 7A is made incident upon the red-light reflecting dichroic mirror 623. The red-light reflecting dichroic mirror 623 is a mirror comprising a dielectric multilayered film, and the wavelength dependence of its reflectance is schematically shown in FIG. 13. Light 126R reflected by the red-light reflecting dichroic mirror 623 is made incident upon the low-resolution liquid crystal panel 630A. Meanwhile, light 126T transmitted through the red-light reflecting dichroic mirror 623 is made incident upon the low-resolution liquid crystal panel 630B. As for the light 126R and 126T incident upon the low-resolution liquid crystal panels 630A and 630B, light corresponding to the applied voltage (S polarized light components 127P and 128S of return light 127 and 128) is projected onto the screen 6 through the projection lens 4 on the basis of the same principle as described above.

In other words, this configuration has the same relationship as the relationship between the P waves and the S waves, on the one hand, and the video signals, on the other, in the same way as in FIG. 28A. In this case of this embodiment, the liquid crystal panels 630, 630B, and 630A correspond to the blue, green, and red liquid crystal panels, and optical modulation of polarized light of the P waves is carried out for each color. In addition, the liquid crystal panel 640A performs optical modulation of the S waves in the two optical wavelength bands of green and red by means of luminance signals in which green and red components of brightness are added at a predetermined ratio. Meanwhile, the liquid crystal panel 640 performs optical modulation of the S waves in the optical wavelength band of blue by means of a predetermined luminance signal of the independent blue component of brightness.

In addition, it is possible to obtain similar results if the blue-light transmitting dichroic mirrors 622 and 622A and the red-light reflecting dichroic mirror 623 are replaced by the red-light transmitting dichroic mirror having the characteristic schematically shown in FIG. 16 and the blue-light reflecting dichroic mirror having the characteristic shown in FIG. 12.

14th Embodiment

Figure 18:
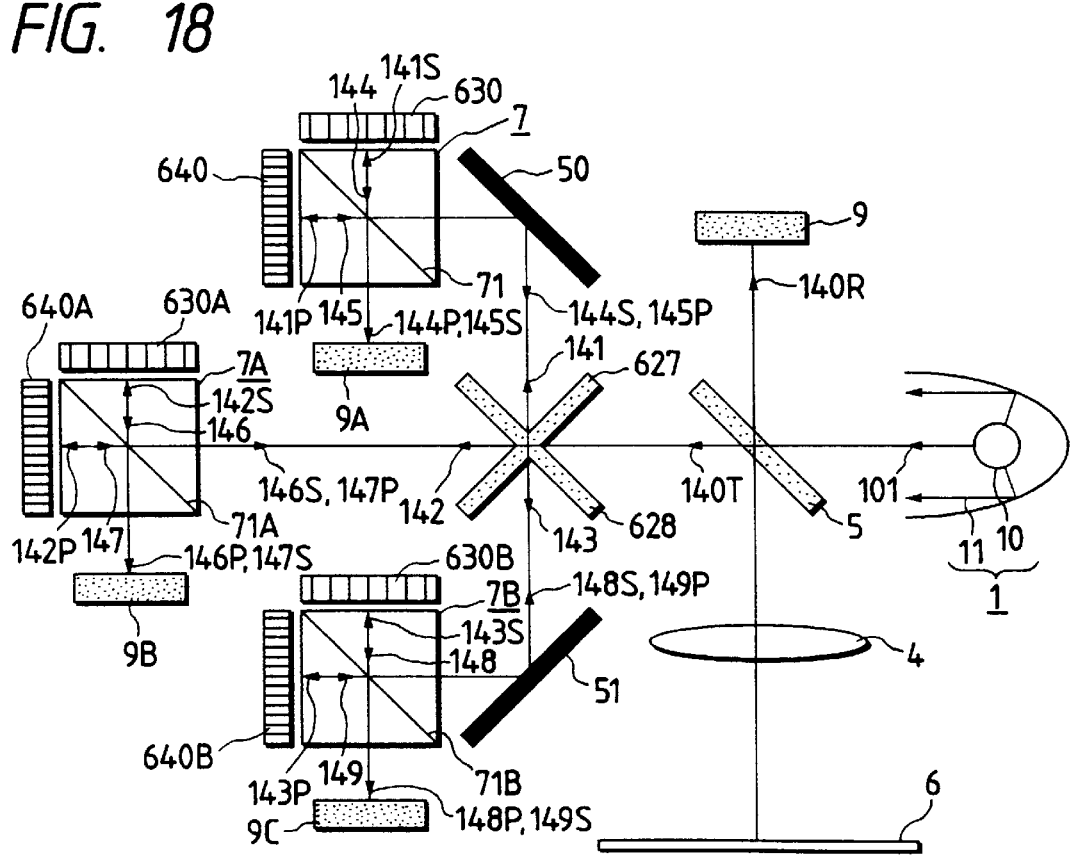
FIG. 18 is a diagram illustrating the configuration of the optical system of a projector apparatus in accordance with a 14th embodiment of the present invention.

FIG. 18 is a schematic diagram of the optical system in accordance with a 14th embodiment of the present invention. In the drawing, numeral 1 denotes the projecting light source constituted by the lamp 10 and the reflecting mirror 11; 50 and 51 denote total reflection mirrors; 5 denotes the half mirror; 627 denotes a red-light reflecting dichroic mirror; 628 denotes a blue-light reflecting dichroic mirror; 7, 7A, and 7B denote the polarizing beam splitters each having both a P polarized light transmittance and an S polarized light reflectance of 100%; 630, 630A, and 630B denote the low-resolution liquid crystal panels; 640, 640A, and 640B denote the high-resolution liquid crystal panels; 9, 9A, 9B, and 9C denote light dampers; 4 denotes the projection lens; and 6 denotes the screen.

The projecting light source 1 is comprised of the lamp 10 and the reflecting mirror 1, and emits white emergent light 101 which is substantially parallel. The emergent light 101 is transmitted through the half mirror 5, and is made incident upon the blue-light reflecting dichroic mirror 628 and the red-light reflecting dichroic mirror 627. The blue-light reflecting dichroic mirror 628 and the red-light reflecting dichroic mirror 627 are mirrors each comprising a dielectric multilayered film, and the wavelength dependence of their reflectances are schematically shown in FIGS. 12 and 13, respectively. Light 141 reflected by the blue-light reflecting dichroic mirror 628 is reflected by the total reflection mirror 50, while light 143 reflected by the red-light reflecting dichroic mirror 627 is reflected by the total reflection mirror 51, and the two beams are made incident upon the polarizing beam splitters 7 and 7B, respectively.

In addition, light 142 transmitted through both the blue-light reflecting dichroic mirror 628 and the red-light reflecting dichroic mirror 627 is made incident upon the polarizing beam splitter 7A.

The light 141 incident upon the polarizing beam splitter 7 is polarized and separated into a P polarized light component 141P and an S polarized light component 141S by the polarizing/separating plane 71, and the respective light beams are made incident upon the high-resolution liquid crystal panel 640 and the low-resolution liquid crystal panel 630, respectively, and are subjected to the rotation of their polarization planes or the conversion into elliptically polarized light in response to the application of voltages to the liquid crystal panels.

Of light beams 144 and 145 which returned from the liquid crystal panels after being subjected to the rotation of their polarization planes or the conversion into elliptically polarized light, an S polarized light 144S of the light 144 and a P polarized light 145P of the light 145 are reflected by or transmitted through the polarizing/separating plane 71 of the polarizing beam splitter 7, are reflected by the total reflection mirror 50, and are made incident upon the blue-light reflecting dichroic mirror 628. The light 144S and 145P incident upon the blue-light reflecting dichroic mirror 628 is totally reflected, and is projected onto the screen 6 through the projection lens 4.

The light 143 incident upon the polarizing beam splitter 7B is polarized and separated into a P polarized light 143P and an S polarized light 143S by the polarizing/separating plane 71B, and these light beams are respectively made incident upon the high-resolution liquid crystal panel 640B and the low-resolution liquid crystal panel 630B, and are subjected to the rotation of their polarization planes or the conversion into elliptically polarized light in response to the voltages applied to the liquid crystal panels.

Of light beams 148 and 149 which returned from the liquid crystal panels after being subjected to the rotation of their polarization planes or the conversion into elliptically polarized light, an S polarized light 148S of the light 148 and a P polarized light 149P of the light 149 are reflected by or transmitted through the polarizing/separating plane 71B of the polarizing beam splitter 7B1, are reflected by the total reflection mirror 51, and are made incident upon the red-light reflecting dichroic mirror 627. The light 148S and 149P incident upon the red-light reflecting dichroic mirror 627 is totally reflected, and is projected onto the screen 6 through the projection lens 4.

The light 142 incident upon the polarizing beam splitter 7A is polarized and separated into a P polarized light 142P and an S polarized light 142S by the polarizing/separating plane 71A, and these light beams are respectively made incident upon the high-resolution liquid crystal panel 640A and the low-resolution liquid crystal panel 630A, and are subjected to the rotation of their polarization planes or the conversion into elliptically polarized light in response to the voltages applied to the liquid crystal panels.

Of light beams 146 and 147 which returned from the liquid crystal panels after being subjected to the rotation of their polarization planes or the conversion into elliptically polarized light, an S polarized light 146S of the light 146 and a P polarized light 147P of the light 147 are reflected by or transmitted through the polarizing/separating plane 71A of the polarizing beam splitter 7A, and are projected onto the screen 6 through the projection lens 4.

A proper image is projected onto the screen by the combination of the light beams projected onto the screen in the above-described process.

In other words, in this configuration, the liquid crystal panels 640, 640A, and 640B constitute the light modulating means for the luminance signals corresponding to the brightness components of blue, green, and red, respectively, and optically modulate the P waves independently with respect to the optical wavelengths of the respective colors. Further, the liquid crystal panels 630, 630A, and 630B constitute the light modulating means for the chrominance signals of blue, green and red, respectively, and optically modulate the S waves independently with respect to the optical wavelengths of the respective colors. This optical configuration provides small mutual interference of the colors and is excellent in the tone of color. The relationship between the P waves and the S waves, on the one hand, and the video signals, on the other, is shown in FIG. 28C.

With such a configuration of the optical system, the apparatus operates as the so-called normally white system in which a white screen is formed on the screen when no voltages are applied to the liquid crystal panels.

Figure 19:
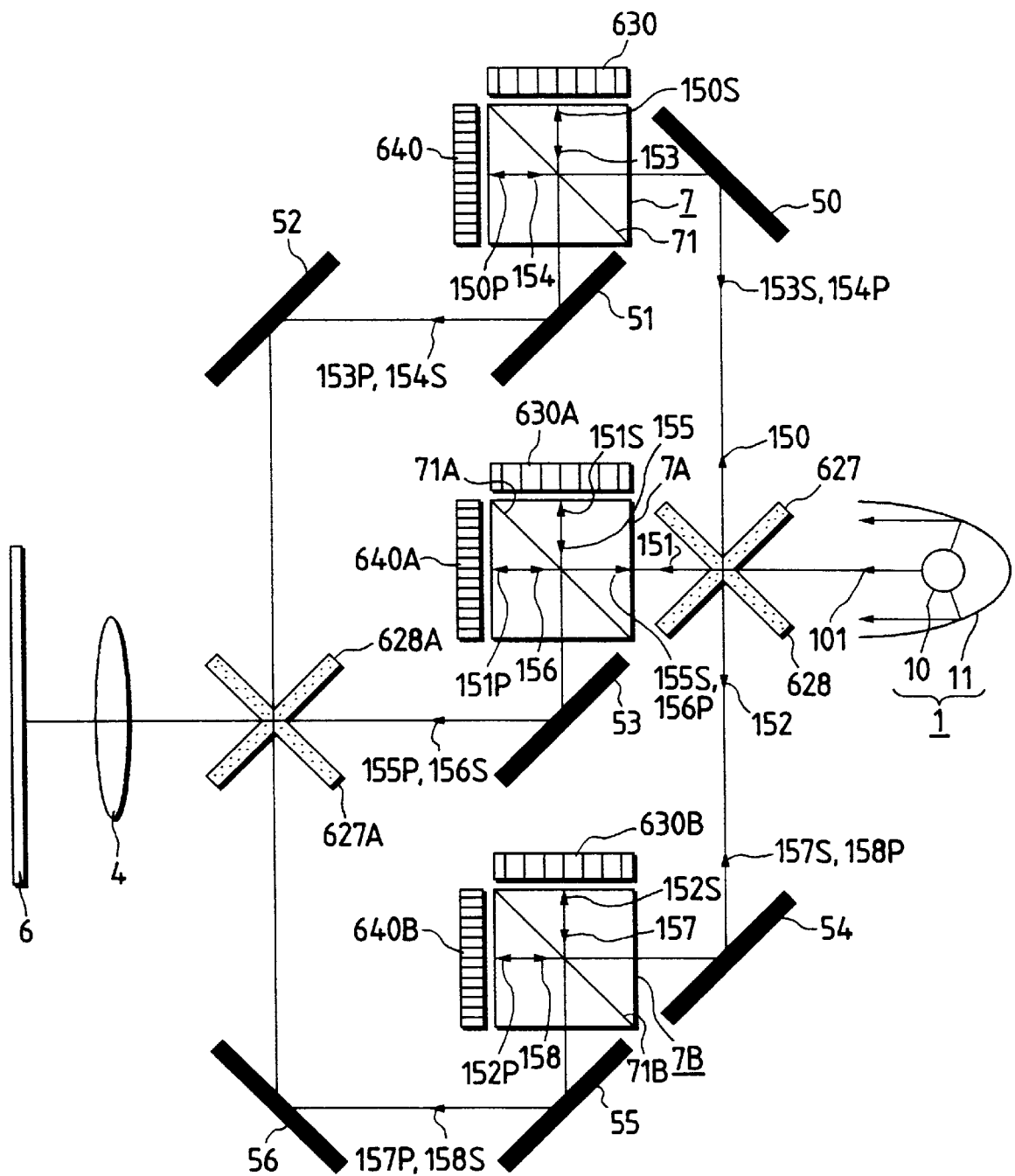
FIG. 19 is a diagram illustrating the configuration of the optical system of a projector apparatus in accordance with a 15th embodiment of the present invention.

To obtain the so-called normally black system in which a black screen is formed on the screen when no voltages are applied to the liquid crystal panels, it suffices if the configuration of the following 15th embodiment shown in FIG. 19 is adopted.

15th Embodiment

FIG. 19 is a schematic diagram of the normally black-type optical system of the liquid crystal projector apparatus in accordance with a 15th embodiment of the present invention. In the drawing, numeral 1 denotes the projecting light source constituted by the lamp 10 and the reflecting mirror 11; 50 to 56 denote total reflection mirrors; 627 and 627A denote red-light reflecting dichroic mirrors; 628 and 628A denote blue-light reflecting dichroic mirrors; 7, 7A, and 7B denote the polarizing beam splitters each having both a P polarized light transmittance and an S polarized light reflectance of 100%; 630, 630A, and 630B denote the low-resolution liquid crystal panels; 640, 640A, and 640B denote the high-resolution liquid crystal panels; 4 denotes the projection lens; and 6 denotes the screen.

The projecting light source 1 is comprised of the lamp 10 and the reflecting mirror 1, and emits white emergent light 101 which is substantially parallel.

The emergent light 101 is made incident upon the blue-light reflecting dichroic mirror 628 and the red-light reflecting dichroic mirror 627. The blue-light reflecting dichroic mirror 628 and the red-light reflecting dichroic mirror 627 are mirrors each comprising a dielectric multilayered film, and the wavelength dependence of their reflectances are schematically shown in FIGS. 12 and 13, respectively. Light 150 reflected by the blue-light reflecting dichroic mirror 628 is reflected by the total reflection mirror 50, while light 152 reflected by the red-light reflecting dichroic mirror 627 is reflected by the total reflection mirror 54, and the two beams are made incident upon the polarizing beam splitters 7 and 7B, respectively.

In addition, light 151 transmitted through both the blue-light reflecting dichroic mirror 628 and the red-light reflecting dichroic mirror 627 is made incident upon the polarizing beam splitter 7A.

The light 150 incident upon the polarizing beam splitter 7 is polarized and separated into a P polarized light component 150P and an S polarized light component 150S by the polarizing/separating plane 71, and the respective light beams are made incident upon the high-resolution liquid crystal panel 640 and the low-resolution liquid crystal panel 630, respectively, and are subjected to the rotation of their polarization planes or the conversion into elliptically polarized light in response to the application of voltages to the liquid crystal panels.

Of light beams 153 and 154 which returned from the liquid crystal panels after being subjected to the rotation of their polarization planes or the conversion into elliptically polarized light, an S polarized light 154S of the light 154 and a P polarized light 153P of the light 153 are reflected by or transmitted through the polarizing/separating plane 71 of the polarizing beam splitter 7. Consequently, the light beams 154S and 150P are optically combined, are reflected by the total reflection mirrors 50 and 52, and are made incident upon the blue-light reflecting dichroic mirror 628A. The light 153P and 154S incident upon the blue-light reflecting dichroic mirror 628A is totally reflected, and is projected onto the screen 6 through the projection lens 4.

The light 152 incident upon the polarizing beam splitter 7B is polarized and separated into a P polarized light 152P and an S polarized light 152S by the polarizing/separating plane 71B, and these light beams are respectively made incident upon the high-resolution liquid crystal panel 640B and the low-resolution liquid crystal panel 630B, and are subjected to the rotation of their polarization planes or the conversion into elliptically polarized light in response to the voltages applied to the liquid crystal panels.

Of light beams 157 and 158 which returned from the liquid crystal panels after being subjected to the rotation of their polarization planes or the conversion into elliptically polarized light, an S polarized light 158S of the light 158 and a P polarized light 157P of the light 157 are reflected by or transmitted through the polarizing/separating plane 71B of the polarizing beam splitter 7B, and after being similarly optically combined, these light beams are reflected by the total reflection mirrors 55 and 56, and are made incident upon the red-light reflecting dichroic mirror 627A. The light 15SS and 157P incident upon the red-light reflecting dichroic mirror 627A is totally reflected, and is projected onto the screen 6 through the projection lens 4.

The light 151 incident upon the polarizing beam splitter 7A is polarized and separated into a P polarized light 151P and an S polarized light 151S by the polarizing/separating plane 71A, and these light beams are respectively made incident upon the high-resolution liquid crystal panel 640A and the low-resolution liquid crystal panel 630A, and are subjected to the rotation of their polarization planes or the conversion into elliptically polarized light in response to the voltages applied to the liquid crystal panels.

Of light beams 155 and 156 which returned from the liquid crystal panels after being subjected to the rotation of their polarization planes or the conversion into elliptically polarized light, an S polarized light 156S of the light 156 and a P polarized light 155P of the light 155 are reflected by or transmitted through the polarizing/separating plane 71A of the polarizing beam splitter 7A, and after being similarly optically combined, these light beams are projected onto the screen 6 through the projection lens 4.

A proper image is projected onto the screen by the combination of the light beams projected onto the screen in the above-described process. With such a configuration of the optical system, the apparatus operates as the so-called normally black system.

As can be understood from the above description, the light separating means for spectrally separating the natural light into three primary-color components of light are constituted by dichroic mirrors, and the light distributing means for distributing the spectrally distributed light to the luminance-signal light modulating means and the chrominance-signal light modulating means for the respective colors and the light modulating/emitting means for optically combining the optically modulated light beams and emitting the combine light are constituted by the polarizing beam splitters. Further, the optically modulated light beams of the respective colors (the light combined by the light modulating means for the luminance signal and the chrominance signal, i.e., the emergent light from the polarizing beam splitters) are optically combined by the light combining means constituted by the dichroic mirrors (628A, 627A) located immediately before the projection lens 4. The configuration of the relationship between the P waves and the S waves, on the one hand, and the video signals, on the other, corresponds FIG. 28C.

16th Embodiment

Figure 20:
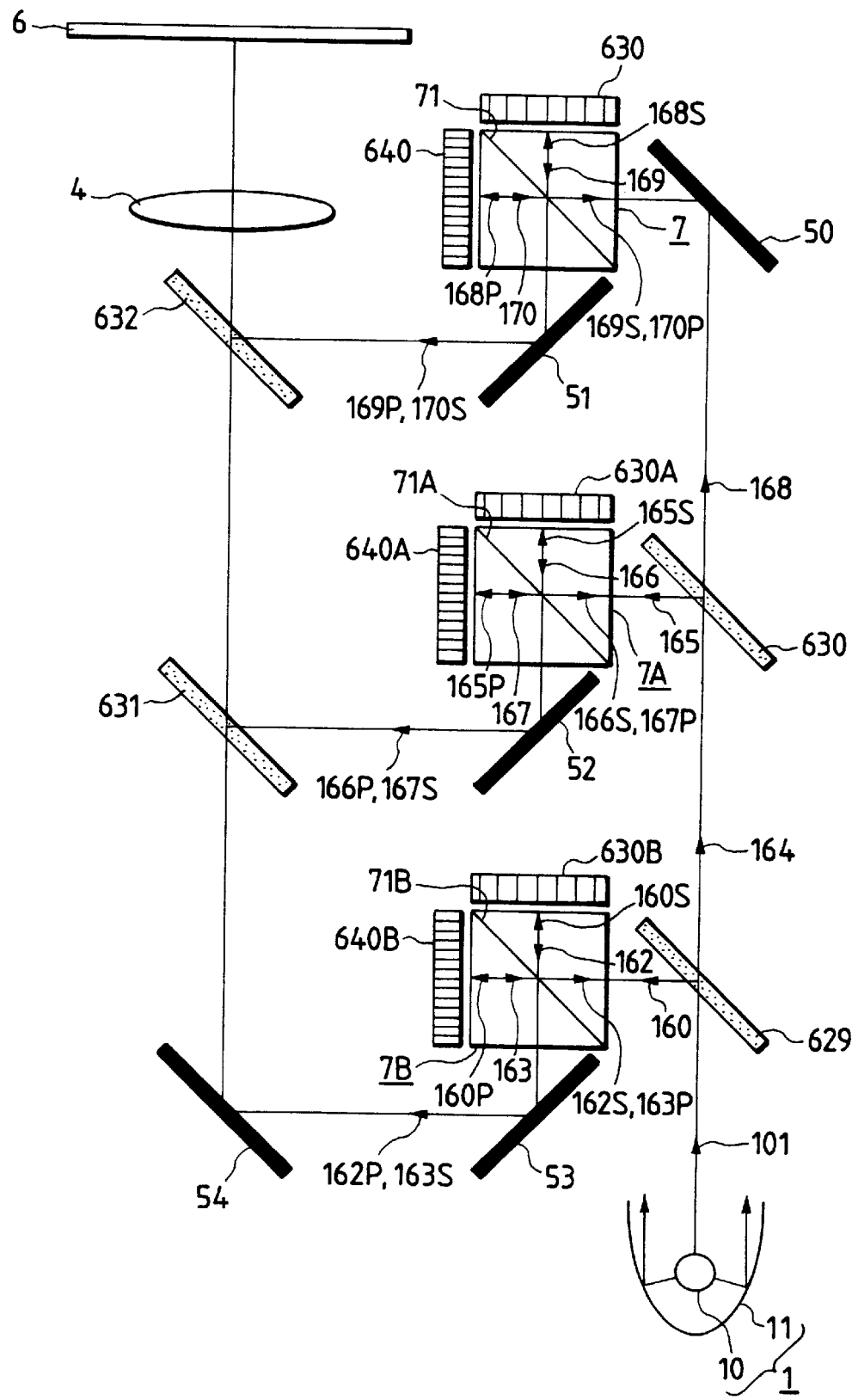
FIG. 20 is a diagram illustrating the configuration of the optical system of a projector apparatus in accordance with a 16th embodiment of the present invention.

FIG. 20 is a schematic diagram of the optical system of the liquid crystal projector apparatus in accordance with a 15th embodiment of the present invention. In the drawing, numeral 1 denotes the projecting light source constituted by the lamp 10 and the reflecting mirror 11; 629 denotes a red-light reflecting dichroic mirror; 630 denotes a blue-light transmitting dichroic mirror; 632 denotes a blue-light reflecting dichroic mirror; 50 to 54 denote the total reflection mirrors; 7, 7A, and 7B denote the polarizing beam splitters each having both a P polarized light transmittance and an S polarized light reflectance of 100%; 640, 640A, and 640B denote the high-resolution liquid crystal panels; 630, 630A, and 630B denote the low-resolution liquid crystal panels; 4 denotes the projection lens; and 6 denotes the screen.

The projecting light source 1 is comprised of the lamp 10 and the reflecting mirror 1, and emits white emergent light 101 which is substantially parallel. The emergent light 101 is made incident upon the red-light reflecting dichroic mirror 629. The red-light reflecting dichroic mirror 629 is a mirror comprising a dielectric multilayered film, and selectively reflects only the red light as the wavelength dependence of its reflectance is schematically shown in FIG. 13. Light 160 reflected by the red-light reflecting dichroic mirror 629 is made incident upon the polarizing beam splitter 7B. The incident light 160 is polarized and separated into a P polarized light component 160P and an S polarized light component 160S by the polarizing/separating plane 71B of the polarizing beam splitter 7B, and the respective light beams are made incident upon the high-resolution liquid crystal panel 640B and the low-resolution liquid crystal panel 630B, respectively, and are subjected to the rotation of their polarization planes or the conversion into elliptically polarized light in response to the application of voltages to the liquid crystal panels. Namely, the light beams are subjected to optical modulation.

Of light beams 162 and 163 which returned from the liquid crystal panels after being subjected to the rotation of their polarization planes or the conversion into elliptically polarized light, an S polarized light 163S and a P polarized light 162P are reflected by or transmitted through the polarizing/separating plane 71B of the polarizing beam splitter 7B. Consequently, the light beams 162P and 163S are optically combined, are reflected by the total reflection mirrors 53 and 54, and are projected onto the screen 6 through the projection lens 4.

Light 164 transmitted through the red-light reflecting dichroic mirror 629 is made incident upon the blue-light transmitting dichroic mirror 630. The blue-light transmitting dichroic mirror 630 is a mirror comprising a dielectric multilayered film, and selectively reflects light having wavelengths of substantially green light and the light of longer wavelengths, as the wavelength dependence of its reflectance is schematically shown in FIG. 15. Light 165 reflected by the blue-light transmitting dichroic mirror 630 is made incident upon the polarizing beam splitter 7A. The incident light 165 is polarized and separated into a P polarized light component 165P and an S polarized light component 165S by the polarizing/separating plane 71A of the polarizing beam splitter 7A, and the respective light beams are made incident upon the high-resolution liquid crystal panel 640A and the low-resolution liquid crystal panel 630A, respectively, and are subjected to the rotation of their polarization planes or the conversion into elliptically polarized light in response to the application of voltages to the liquid crystal panels. Namely, the light beams are subjected to optical modulation.

Of light beams 166 and 167 which returned from the liquid crystal panels after being subjected to the rotation of their polarization planes or the conversion into elliptically polarized light, an S polarized light 167S of the light 167 and a P polarized light 166P of the light 166 are reflected by or transmitted through the polarizing/separating plane 71A of the polarizing beam splitter 7A. Consequently, the light beams 166P and 167S are optically combined, and the combined light is reflected by the total reflection mirror 52, and is made incident upon the red-light transmitting dichroic mirror 631. The red-light transmitting dichroic mirror 631 selectively transmits light having wavelengths of substantially red light and the light of longer wavelengths, as its wavelength dependence is schematically shown in FIG. 16. The light 166P and 167S incident upon the red-light transmitting dichroic mirror 631 is projected onto the screen 6 through the projection lens 4.

Light 168 reflected by the blue-light transmitting dichroic mirror 630 is reflected by the total reflection mirror 50, and is made incident upon the polarizing beam splitter 7. The incident light 168 is polarized and separated into a P polarized light component 168P and an S polarized light component 168S by the polarizing/separating plane 71 of the polarizing beam splitter 7, and the respective light beams are made incident upon the high-resolution liquid crystal panel 640 and the low-resolution liquid crystal panel 630, respectively, and are subjected to the rotation of their polarization planes or the conversion into elliptically polarized light in response to the application of voltages to the liquid crystal panels. Namely, the light beams are subjected to optical modulation.

Of light beams 169 and 170 which returned from the liquid crystal panels after being subjected to the rotation of their polarization planes or the conversion into elliptically polarized light, an S polarized light 170S of the light 170 and a P polarized light 169P of the light 169 are reflected by or transmitted through the polarizing/separating plane 71 of the polarizing beam splitter 7. Consequently, the light beams 169P and 170S are optically combined, and the combined light is reflected by the total reflection mirror 51, and is made incident upon the blue-light reflecting dichroic mirror 632. The blue-light reflecting dichroic mirror 632 is a mirror comprising a dielectric multilayered film, and selectively reflects light having wavelengths of substantially blue light and the light of shorter wavelengths, as the wavelength dependence of its reflectance is schematically shown in FIG. 12. The light 169P and 170S incident upon the blue-light reflecting dichroic mirror 632 is projected onto the screen 6 through the projection lens 4.

In this configuration, since the reflected light (169S, 170P, 166S, 167P, 162S, 163P) from the respective liquid crystal panels which does not contribute to the image formation is returned to the projecting light source 1, as shown in FIG. 20, it goes without saying that effective use is made of the power of the light source.

As is apparent from the above description, the light separating means for spectrally separating the natural light into three primary-color components of light are constituted by dichroic mirrors, and the light distributing means for distributing the spectrally distributed light to the luminance-signal light modulating means and the chrominance-signal light modulating means for the respective colors and the light modulating/emitting means for optically combining the optically modulated light beams and emitting the combine light are constituted by the polarizing beam splitters. Further, the optically modulated light beams of the respective colors (the light combined by the light modulating means for the luminance signal and the chrominance signal, i.e., the emergent light from the polarizing beam splitters) are optically combined by the light combining means constituted by the dichroic mirrors 632 and 632 located immediately before the projection lens 4 and arranged in series. The configuration of the relationship between the P waves and the S waves, on the one hand, and the video signals, on the other, corresponds to FIG. 28C.

The quality of this projected image is one which is classified as being the highest level among the embodiments of the present invention. In other words, the best mode of the white balance, in particular, can be configured since optimum voltages can be set in detail for the respective panels of the luminance and chrominance signals for each color. In addition, production efficiency is excellent since an optical system for one color (e.g., a blue-light modulating optical system consisting of the optical elements 632, 51, 640, 630, 7, and 50) is fabricated as a module, and this module can be used in a modified form for the optical systems for the other colors.

A proper image is projected onto the screen by the combination of the light beams projected onto the screen in the above-described process. With such a configuration of the optical system, the apparatus operates as the so-called normally black system in which a black screen is formed when no voltages are applied to the liquid crystal panels.

17th Embodiment

Figure 21:
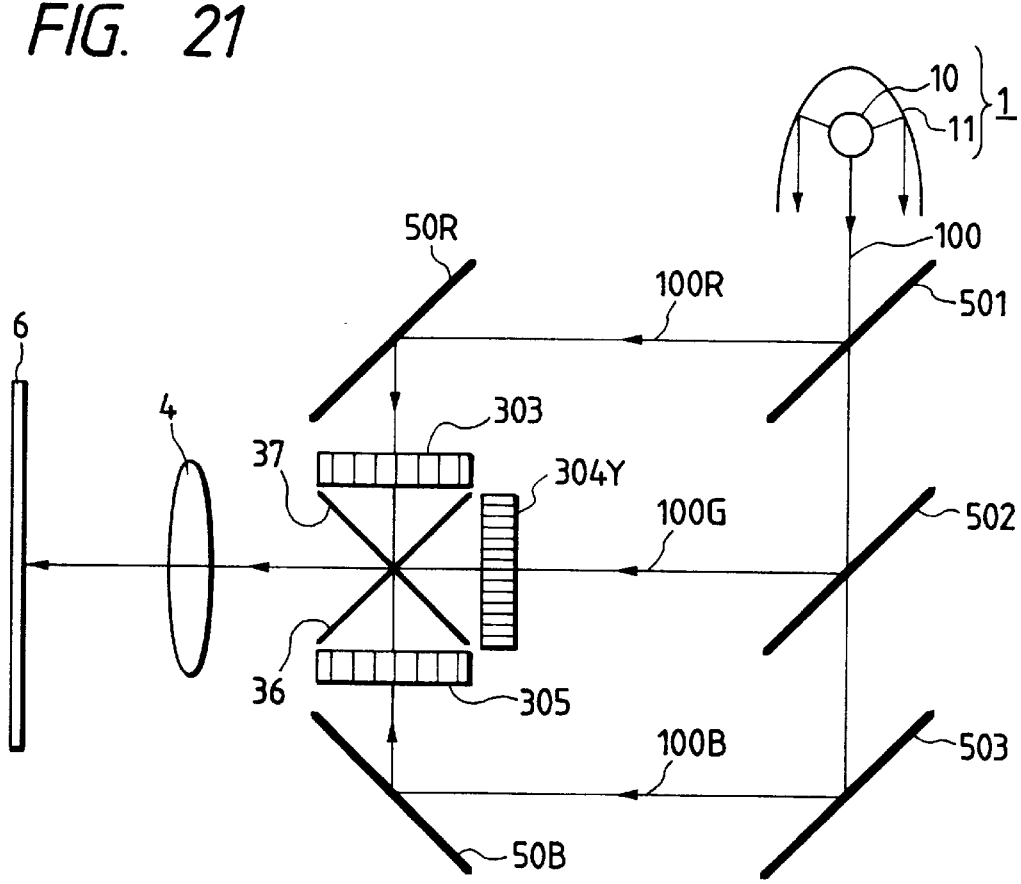
FIG. 21 is a diagram illustrating the configuration of the optical system of a projector apparatus in accordance with a 17th embodiment of the present invention.

FIG. 21 is a schematic diagram of the optical system of the liquid crystal projector apparatus in accordance with a 17th embodiment of the present invention. In FIG. 21, numeral 1 denotes the projecting light source constituted by the lamp 10 and the reflecting mirror 11, and adapted to emit white emergent light 100 which is substantially parallel. The emergent white light 100 is spectrally separated into a red (R) component 100R, a green (G) component 100G, and a blue (B) component 100B by dichroic mirrors 501, 502, and 503, and the separated light beams are made incident upon a liquid crystal panel 303 for R, a liquid crystal panel 304Y for G, and a liquid crystal panel 305 for B, respectively. Each of the liquid crystal panels has a polarizer and an analyzer (not shown), and about 50% of the incident light is converted into heat by the polarizer. Numerals 5OR and 50B denote mirrors for reflecting R and B, respectively.

The pixel size of each of the liquid crystal panel 303 for R and the liquid crystal panel 305 for B is arranged to be larger than the pixel size of the liquid crystal panel 304 for G. This arrangement is provided in correspondence with the fact that the visual sensitivity of green, among the three primary colors, is high in the visual characteristics of a human being. The bandwidth of the green video signal is naturally made wider correspondingly.

Also, with respect to the characteristic width of reflection concerning the respective wavelengths in the reflection R, g, and B by the dichroic mirrors 501, 502, and 503, the wavelength bandwidth of the green light should preferably be at least wider than the wavelength bandwidth of the blue and red light which are on both sides of the wavelength band of the green light. For this reason, three dichroic mirrors are provided in place of the two dichroic mirrors conventionally used. Further, it goes without saying that these three dichroic mirrors constitute the light separating means for optically separating the white light into three light components of R, G, and B.

Furthermore, the video-signal light modulating means for the three primary colors constituted by the transmission-type liquid crystal panels are used instead of the reflection-type liquid crystal panels. In this configuration, the optically modulated light components for the respective colors are optically combined by the two dichroic mirrors, and are emitted to the projection lens 4 of the projecting means. The dichroic plane 36 is a plane for reflecting R and transmitting G, while the dichroic plane 37 is a plane for reflecting B and transmitting G. This embodiment corresponds to the fifteenth configuration.

The bandwidth of the light modulating means for the G video signal should preferably be wider than those of the other colors in correspondence with the wavelength bandwidth of the light. Accordingly, it is possible to reproduce a projected image having a high resolution with respect to the green color.

18th Embodiment

Figure 22:
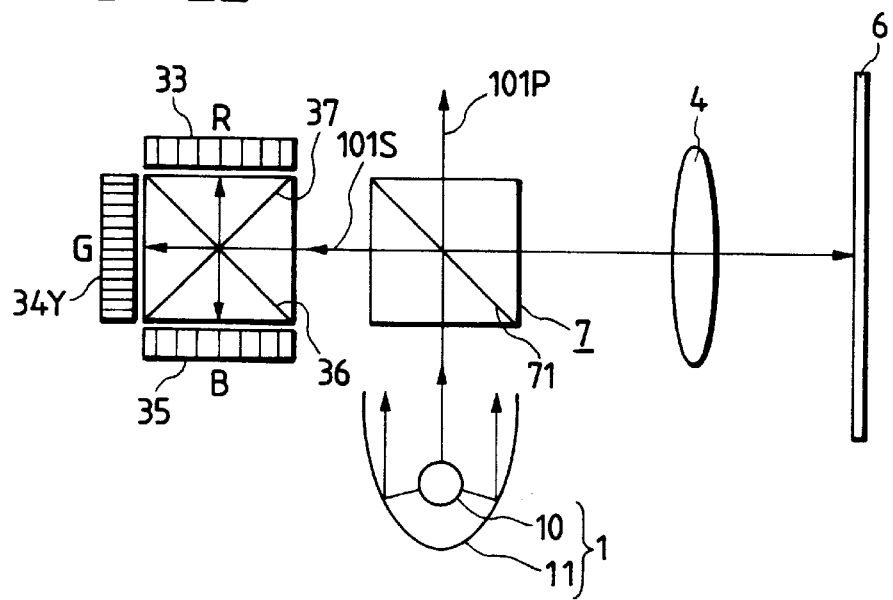
FIG. 22 is a diagram illustrating the configuration of the optical system of a projector apparatus in accordance with an 18th embodiment of the present invention.

FIG. 22 is a schematic diagram of the optical system of the liquid crystal projector apparatus in accordance with an 18th embodiment of the present invention. In FIG. 22, numeral 1 denotes the projecting light source constituted by the lamp 10 and the reflecting mirror 11, and adapted to emit white emergent light 100 which is substantially parallel. The emergent white light 100 is polarized and separated into the P waves and the S waves whose polarization directions are perpendicular to each other by means of the polarizing/separating plane 71 of the polarizing beam splitter 7, and the S waves 101S are directed toward the liquid crystal panels. The P waves 101P are not used in this embodiment. To give a description for reference' sake, although the apparatus shown in the second embodiment makes use of both polarized light components of the P waves and the S waves, this embodiment makes use of only one of the polarized light components. The S waves 101S directed toward the liquid crystal panels are spectrally separated into the three primary colors by the dichroic plane 37 reflecting B and transmitting G and the dichroic plane 36 for reflecting R and transmitting G, and the respective light beams are made incident upon the liquid crystal panel 33 for R, a liquid crystal panel 24Y for G and the liquid crystal panel 35 for B, respectively. At this time, the pixel size of each of the liquid crystal panel 33 for R and the liquid crystal panel 35 for B is made larger than the pixel size of the liquid crystal panel 34Y for G, and a green signal having a wider bandwidth is applied to the liquid crystal panel 34Y for G, in the same way as in the 17th embodiment.

The light beams, which are subjected to optical modulation in which the polarization directions of the light are controlled by the respective liquid crystal panels, and are then reflected, are combined by the dichroic planes 36 and 37, and are made incident upon the polarizing beam splitter 7. At this time, since the polarization direction of the incident light is rotated 90°, so that the polarization direction is changed from that of the S waves into that of the P waves. Hence, the light is transmitted through the polarizing/separating plane 71, and is enlarged and projected onto the screen 6 as a color image.

Although light 101P which does not contribute to the image formation at all is present in this embodiment, its rate (50%) is substantially equivalent to the rate of a loss due to the polarizers in the 17th embodiment using the transmission-type liquid crystal panels. Since the liquid crystal panels are of the reflection type, it is possible to obtain a higher aperture ratio (an effective display area with respect to a unit area of pixels in the liquid crystal panel) than the transmission-type panel, so that the effective utilization rate of the total light becomes higher than that in the 17th embodiment.

This configuration is arranged such that, in a way, the light modulating means for the luminance signal (22, 21, i.e., 2) in the configuration of the second embodiment (FIG. 2) is not used, and the pixel size of the green-signal light modulating means is made finer than those of the other colors instead, and the bandwidth of the green video signal is wider so as to obtain sufficient reproduction reality of the green color which is sensitive to the resolution. It is naturally possible to reuse this light not being used, by using a means (19th embodiment which will be described later) for feeding back the unused light to the projecting light source.

In addition, since there are various patterns of color in the actual natural image, it is possible to adopt a configuration in which the image size of not only the green color but also the R, G, and B of the liquid crystal panels 33, 34Y, and 35 can be varied by, for example, ½ (or ⅓, i.e., arbitrarily) with respect to a normal size 1 (a configuration in which one panel of fine pixels is used, or two or three panels having such pixels are juxtaposed in parallel), so as to adaptively select the pixels of one of R, G, and B in correspondence with the relative magnitude of the R, G, and B levels of the video signals and the high-band components (adaptive light modulating means). In other words, in cases where the image is a red rose, and the red chrominance signals are more numerous than the other signal levels, and there are higher components in terms of the frequency, the R liquid crystal panel may be changed (switched over) to the fine pixel mode only at that timing. This novel technological concept is summarized as corresponding to the twenty-fourth configuration.

19th Embodiment

Figure 23:
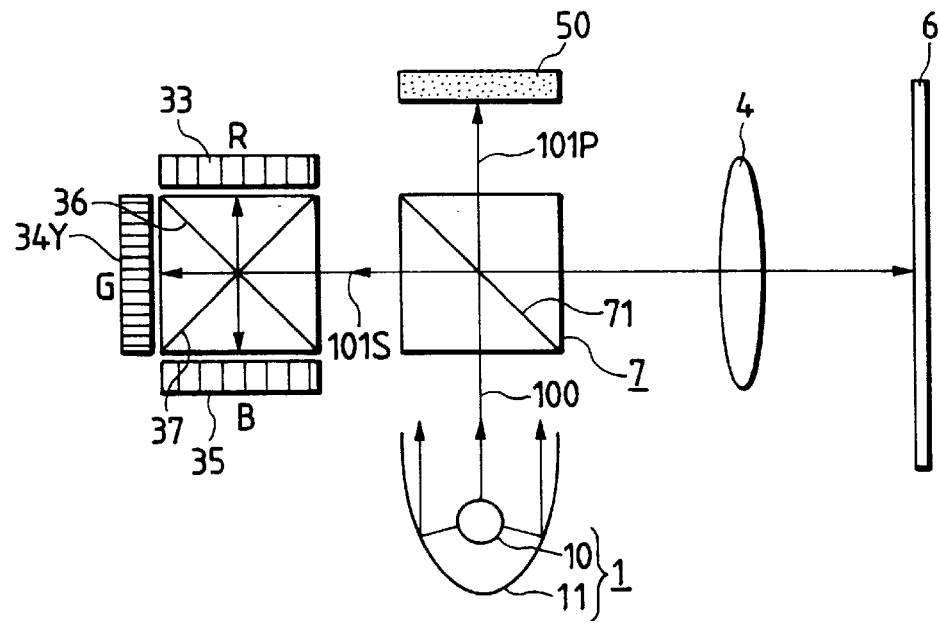
FIG. 23 is a diagram illustrating the configuration of the optical system of a projector apparatus in accordance with a 19th embodiment of the present invention.

FIG. 23 is a schematic diagram of the optical system of the liquid crystal projector apparatus in accordance with a 19th embodiment of the present invention. In the configuration of this embodiment, the mirror 50 for reflecting the light 101P which does not contribute to the image formation in the preceding 18th embodiment is provided. The remaining portions are similar to those of the 18th embodiment. In this embodiment, the light 101P with the P waves are transmitted through the polarizing/separating plane 71 by the mirror 50, and return to the lamp. The light which returned to the lamp undergoes a change in its polarization direction due to a combination of the reflecting mirror 11 and a aspherical lamp, with the result that the light is directed again toward the polarizing beam splitter 7 as light having both the P and S components. The S waves are directed towards the liquid crystal panels by the polarizing/separating plane, while the P waves are directed toward the mirror 50, but are reflected again, and return to the lamp. As the above-described operation is repeated, as for the P waves which reciprocate between the projecting light source 1 and the mirror 50, some of them are converted to the S waves on each occasion of the reciprocation and are directed toward the liquid crystal panels, so that the effective utilization ratio of the light improves. This embodiment corresponds to the twenty-third embodiment. An embodiment for further improving the effective utilization ratio is shown next.

20th Embodiment

Figure 24:
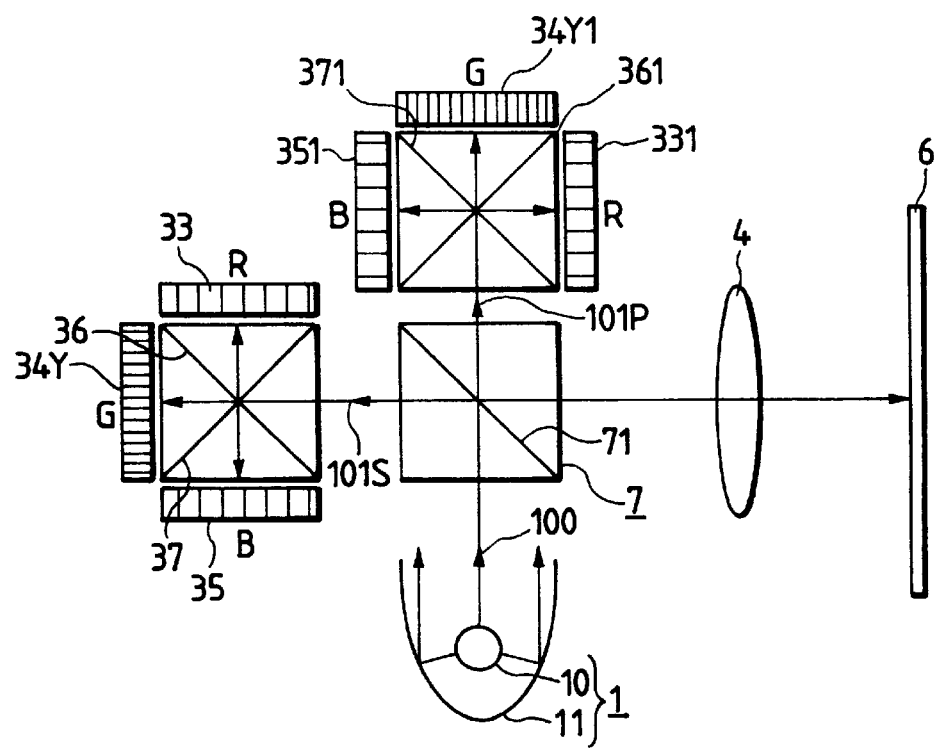
FIG. 24 is a diagram illustrating the configuration of the optical system of a projector apparatus in accordance with a 20th embodiment of the present invention.

FIG. 24 is a schematic diagram of the optical system of the liquid crystal projector apparatus in accordance with a 20th embodiment of the present invention. In the drawing, reference numerals 33 and 331 denote reflection-type liquid crystal panels for R having the same arrangements; 35 and 351 denote reflection-type liquid crystal panels for B having the same arrangements; and 34Y and 34Y1 denote reflection-type liquid crystal panels for G having the same arrangements. The pixel size of each of the reflection-type liquid crystal panels 33, 331 for R and the liquid crystal panels 35, 351 for B is larger than the pixel size of each of the reflection-type liquid crystal panels 34Y and 34Y1 for G, and the green-video signal is applied to the reflection-type liquid crystal panels 34Y and 34Y1 for G, in the same way as in the 18 and 19th embodiments.

That is, in this 20th embodiment, optical modulation is carried out by the video-signal light modulating means for each color by using the P waves of the light component 101P, just as the S waves are subjected to video-signal light modulation for each color in the 19th embodiment instead of reflecting the light component 101P by the total reflection mirror 50 in the preceding 19th embodiment.

In this 20th embodiment, a very bright image can be obtained since reflection-type liquid crystal panels having a high aperture ratio and all the P waves and the S waves are utilized although the number of liquid crystal panels and the number of the polarizing beam splitters increase. This embodiment corresponds to the twenty-fifth embodiment.

Also, when seen from a different perspective, this configuration has another capacity for development in that if the configuration of optical modulation of the S waves on the left-hand side of FIG. 24 is used for the left eye, and the configuration of optical modulation of the P waves on the right-hand side is used for the right eye, the apparatus in accordance with this embodiment can be used for a projected-image reproducing apparatus for reproducing a three-dimensional image.

21st Embodiment

Figure 25:
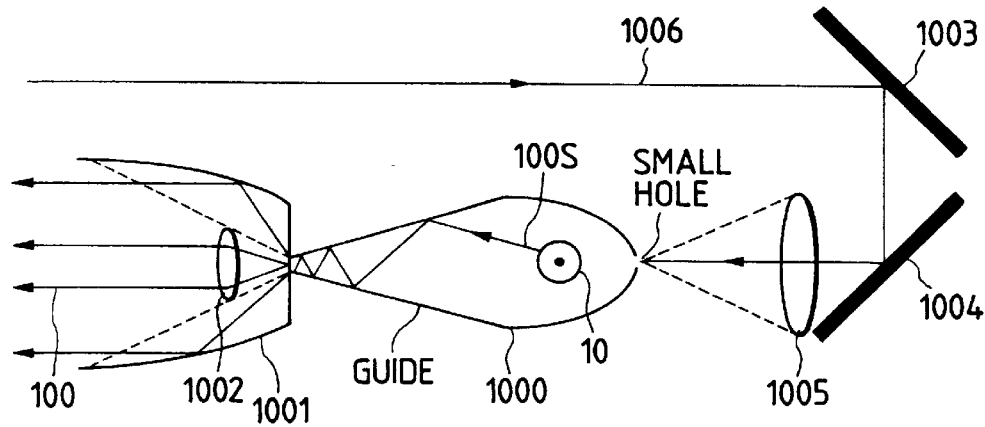
FIG. 25 is a diagram illustrating the configuration of the optical system of a projector apparatus in accordance with a 21st embodiment of the present invention (however, the configuration is one in which the light which does not contribute to image formation is returned toward the light collecting side)

FIG. 25 is a schematic diagram of the optical system of the liquid crystal projector apparatus in accordance with a 21st embodiment of the present invention. This is an embodiment in which attention is focused on the reutilization of light (e.g., light 106 in FIG. 3) which does not contribute to the image formation. In the drawing, numeral 10 denotes the lamp; 1000 denotes an integrated reflection mirror constituted by a guide for collecting white light 100S emitted from the lamp 10; 1001 denotes a parabolic mirror for converting light, having a large divergence angle among the light components from the integrated reflection mirror 1000, into a substantially parallel beam of light; 1002 denotes a lend for converting light, having a small divergence angle among the light components from the integrated reflection mirror 1000, into a substantially parallel beam of light.

A substantially total quantity of the white light 100S emitted from the lamp 10 is radiated to the parabolic mirror 1001 and the lens 1002 by the integrated reflection mirror 1000, and is emitted toward the liquid crystal panels as the substantially parallel white light 100 by means of the parabolic mirror 1001 and the lens 1002. Of the emitted light 100, the light 1006 which did not contribute to the image formation (e.g., the light 106 in FIG. 3 or the light 102T in FIG. 11) is guided toward a mirror 1003 by an optical system (not shown), its direction is changed by a mirror 1004, and the light is focused into a small spot by a focusing lens 1005, and is radiated to the interior of the integrated reflection mirror 1000 through a small hole.

The light radiated to the interior of the integrated reflection mirror 1000 through the small hole is superposed on the light 100S emitted from the lamp, and is directed toward the liquid crystal panels as the substantially parallel white light 100 by the parabolic mirror 1001 and the lens 1002. As the above-described operation is repeated, as for the light which did not contribute to the image formation, its ratio of contribution to the image formation gradually increases. hence, the rate of utilization of the light emitted from the lamp 10 increases, thereby making it possible to obtain a bright image.

Incidentally, although the mirrors 1003 and 1004 are used to return the light which did not contribute to the image formation to the light source section, if, for example, an optical fiber is used, the flexibility of the light path improves remarkably, so that leeway in the fabrication of the apparatus increases.

In addition, if the optical members 1003, 1004, and 1005, when seen as a whole, constitute a point-light-source generating means, and the small hole on the right-hand side of the integrated reflection mirror 1000 is a light receiving hole.

22nd Embodiment

Figure 29:
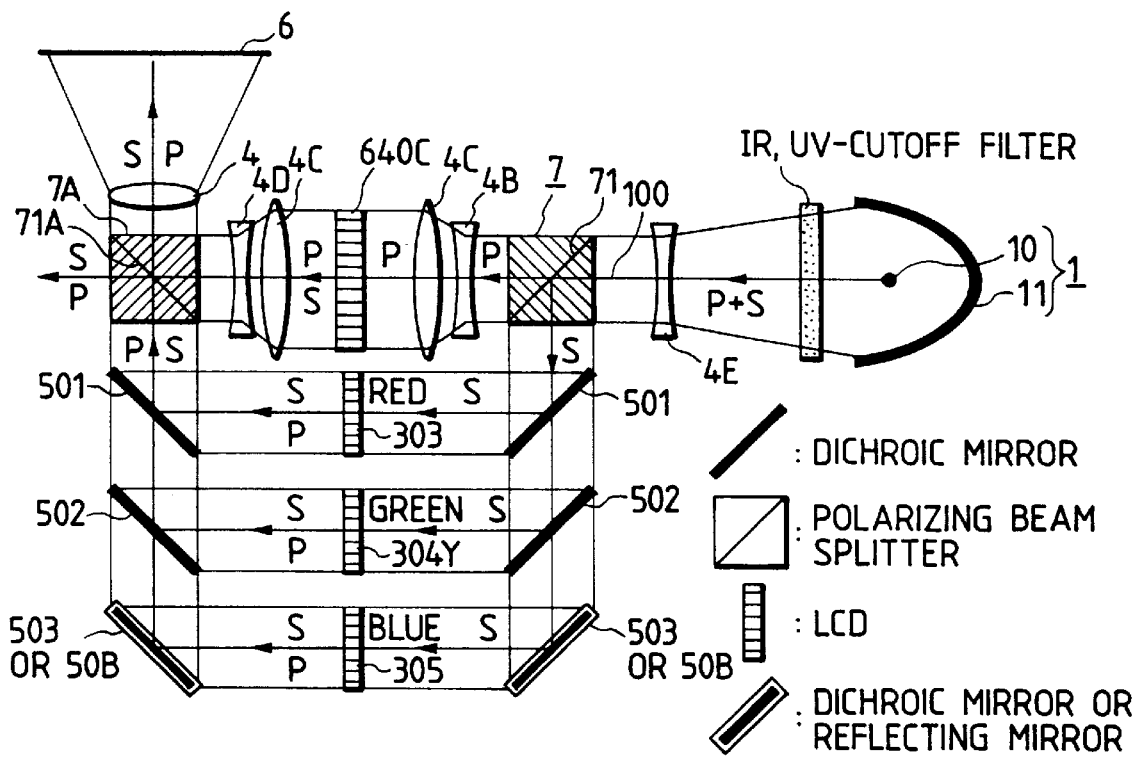
FIG. 29 is a diagram illustrating the configuration of the optical system of a projector apparatus in accordance with a 22nd embodiment of the present invention.

FIG. 29 is a schematic diagram of the optical system of the liquid crystal projector apparatus in accordance with a 22nd embodiment of the present invention. Reference numeral 1 denotes the projecting light source constituted by the lamp 10 and a reflecting mirror (e.g., an elliptical mirror in this embodiment) 11 of a means for collecting the emergent light, and the projecting light source emits white emergent light which is substantially parallel. This emergent light passes through IR, UV cutoff filters for shielding unwanted infrared rays and ultraviolet rays and through the lens 4E, and is made incident upon the polarizing beam splitter (first light distributing means) 7.

The P waves and the S waves which are perpendicular to each other are transmitted through or reflected by the polarizing/separating plane 71.

The reflected S waves are spectrally separated into the red (R), green (G), and blue (B) components by the dichroic mirrors 501 and 502, and 503, and the light components are made incident upon the liquid crystal panel 303 for R, the liquid crystal panel 304Y for G, and the liquid crystal panel 305 for B, respectively. Here, the dichroic mirror 503 may be the total reflection mirror 50B. In this configuration, as for the light transmitted through pixels to which the liquid-crystal driving voltages are not applied in the liquid crystal panels 303, 304, and 305 for the respective colors, their polarization directions are optically rotated (the S waves are converted to the P waves), and the light components are made incident again upon the dichroic mirrors 501, 502, and 503, and are made incident upon another polarizing beam splitter (first light combining means) 7A. Then, the P waves of this light are transmitted through the polarizing/separating plane 71A, passes through the projection lens 4, and reproduce a projected image on the screen 6.

Meanwhile, as for the P waves transmitted through the polarizing beam splitter 7, the cross section of their optical path is enlarged by a first optical means constituted by lenses 4B and 4C, and this light beam is made incident upon a high-resolution liquid crystal panel (however, transmission-type) 640C. As for the light transmitted through pixels to which the liquid-crystal driving voltage is not applied in the liquid crystal panel 640C, its polarization direction is optically rotated by 90° (the P waves are converted to the S waves), the cross section of the optical path is reduced by a second optical means constituted by lenses 4C and 4D, and the light beam is made incident upon another polarizing beam splitter 7A. The light beam is reflected by its polarizing/separating plane 71A, passes through the projection lens 4, and reproduces a projected image on the screen 6.

The light transmitted through pixels to which the liquid-crystal driving voltage is applied in the liquid crystal panels does not undergo optical rotation, so that this light is focused on the left-hand side of the polarizing beam splitter 7A and is emitted, and does not contribute to the image formation.

It is apparent that the set of dichroic mirrors 501 and 502, and 503, which spectrally separate the polarized light of the S waves reflected by the polarizing/separating plane 71 of the polarizing beam splitter 7 serving as the first light distributing means into the optical wavelengths of the respective colors of R, G, and B, and which optically distribute the light components toward the liquid crystal panels for the respective colors, constitute a fifth light distributing means. It is also apparent that another set of dichroic mirrors 501, 502, and 503, which optically combine the optically modulated light components of the respective colors transmitted through the liquid crystal panels 303, 304Y, and 305 and emit the combined light toward the polarizing beam splitter 7A (first light combining means), constitute a third light combining means.

Accordingly, the configuration is provided with a minute design such that the apparatus in accordance with this embodiment is comprised of a total of four independent liquid crystal panels serving as the light modulating means including at least the transmission-type luminance-signal light modulating means of the polarization controlling type for controlling the polarization state of the polarized light, as well as the first light distributing means and the first light combining means each constituted by independent polarizing beam splitters, the polarized light incident upon the chrominance-signal light modulating means being spectrally separated in correspondence with the optical wavelengths of the three primary colors. In particular, the cross section of the light in the optical path which is not subjected to optical modulation and the cross section of the light in the optical path which is subjected to optical modulation are independent of each other, and independent optical paths are provided in correspondence with a total of four signals, i.e., the luminance signal and the three kinds of chrominance signals as the video signals. Such a minute configuration is not seen in other embodiments of the present invention. (On other words, in the reflection-type light modulating means in the other embodiments, the incident light and the modulated light are optically processed in a common optical path cross section.)

For this reason, this configuration permits new combinations of processing between the optical processing system and the video-signal processing system. for example, it is possible to adopt a combination of the signal processing system and the optical processing system whereby the optical modulation corresponding to the high-frequency component of the video signals estimated from other embodiments is executed by the luminance-signal light modulating means, while the optical modulation corresponding to the medium- and low-frequency components of the video signals is executed by the chrominance-signal light modulating means. Additionally, it is possible to provide signal processing wherein the distribution of the brightness components of the video signals are redistributed to the luminance-signal light modulating means and the chrominance-signal light modulating means such that the modulated light beams from the two light modulating means become substantially equal in the cross sections of the mutually perpendicular optical paths in the polarizing beam splitter 7A of the first light combining means.

For this reason, the polarized light (polarized light in which the P waves are converted to the S waves, and vice versa) modulated by the two light modulating means increases relatively with a good balance. Consequently, it is possible to obtain the effect of increased efficiency due to the operation different from those of the other embodiments in that the light which does not contribute to the image formation (the above-described polarized light which is focused on the left-hand side of the polarizing beam splitter 7A and is emitted) decreases in an active mode, thereby making it possible to obtain high efficiency.

In addition, in this configuration, since the first and second optical means are inserted before and after the liquid crystal panel 640C of the luminance-signal light modulating means, so that it is possible to effectively emit modulated light smaller than the pixel size of the liquid crystal panel toward the polarizing beam splitter 7A. For this reason, it is readily possible to provide an optimum configuration (the identification of the two modulated light beams in the cross sections of the optical paths of the first light combining means and the effective minimization of the pixel size of the luminance light modulated light) by overriding the constraints (the aperture ratio and the pixel size) in the light of the devices of the respective modulating means.

As described above, in accordance with the above configurations, a polarizing beam splitter is used in at least one of the means for distributing light to the luminance-signal light modulating means and the chrominance-signal light modulating means or combining the light therefrom. Therefore, the polarizer or analyzer which is conventionally used in the liquid crystal panel or the like serving as the light modulating means, as described above, is made unnecessary. For this reason, the light which is absorbed by the polarizer or analyzer provided in the conventional liquid crystal panel can be effectively utilized as projection light, with the result that a bright image is obtained. Moreover, heat generation due to the absorption by the polarizer or analyzer is suppressed, and a compact design is possible.

For example, the distribution of light is effected by a polarizing beam splitter, i.e., the polarizing optical means. In addition to the first light distributing means of the invention, the light-quantity distributing means (constituted by the polarization controlling means for determining each proportion of the quantity of mutually perpendicular polarized light and the third light distributing means for distributing the quantity of light to the two light modulating means for the luminance and chrominance signals at a predetermined ratio determined by the polarization controlling means), or in accordance with the invention stated in the claims in which both the light modulating means for the luminance and chrominance signals are provided, the natural light from the light source is separated into P and S polarized light beams at a predetermined ratio, different polarized light beams are made incident upon the light modulating means for the luminance signal and the chrominance signal, respectively, and after the polarized light beams are subjected to optical modulation, the polarized light beams are combined to form an image. Since the above-described configuration is used, these operations act synergistically, with the result that the light from the light source is utilized by 100%.

In other words, by virtue of the arrangement comprising the light-quantity distributing means and the two light modulating means, the natural light from the light source is separated into P and S polarized light beams at a predetermined ratio without causing a loss, and can be used by 100% for the luminance-signal light modulating means and the chrominance-signal light modulating means. For this reason, it is possible to obtain a special advantage in that the brightness of at least about 2-fold that of the conventional TN-type liquid crystal system (the brightness of 1.8-fold from the viewpoint that all the P waves and S waves are utilized) can be obtained. Thus, a unique advantage is obtained which is produced from the combination in accordance with the present invention in which both P waves and S waves are used for the two light modulating means.

If consideration is given to the fact that the absorption of light (approx. 50%) by the polarizer or analyzer is substantially nil, the apparatus of the present invention is provided with a latent capability of obtaining an even brighter projected image.

In addition, if the present invention is viewed from an overall point of view, there is an advantage in that the mutual combination of various processings of light, such as the configuration for returning polarized light which does not contribute to image formation toward the projecting light source, the use of the polarized light which does not contribute to the image formation as the polarized light for the other light modulating means, and the recombination of the ratio of the P waves and the S waves extracted from the natural light, becomes possible concerning the embodiments of the present invention, together with other combinations of the embodiments and combinations which can be estimated from the embodiments. The underlying reason for this is that the natural light is utilized on the basis of the technological concept that the natural light is regarded as being a combination of mutually perpendicular polarized light.

In accordance with the embodiment of the present invention in which the luminance-signal light modulating means which is not provided in the conventional projector apparatus is newly added as one of the plurality of light modulating means constituting the video-signal light modulating means, in addition to the merit that one polarized light beam can be utilized as the luminance component indicating the brightness among the video signals, there is an advantage in that new combinations are made possible between the optical system and the video signal system. Hence, the efficiency of mutual utilization of the light and the video signals can be enhanced further.

In other words, as an example of the configuration of combination in which, for example, the luminous flux of one polarized light beam emergent from the luminance-signal light modulating means and the luminous flux of the other polarized light beam emergent from the chrominance-signal light modulating means are made substantially equal by reducing a loss, it is possible to obtain an unprecedented new combination in which the signal of the brightness component of the video signals is redistributed to the luminance-signal light modulating means and the chrominance-signal light modulating means, and a high-frequency component of the video signals is processed by the former means, while medium- and low-frequency components of the video signals are processed by the latter means. Consequently, it is possible to realize a projector apparatus for reproducing a highly bright projected image the realization of which has hitherto been difficult.

In addition, if the present invention is viewed from a different perspective, the number of projection lenses used is reduced to one. In other words, since the combination of light from the luminance-signal modulating liquid crystal panel and the chrominance-signal modulating liquid crystal panel is effected by the polarizing beam splitter, the conventionally used polarizer has become unnecessary, and only one projection lens can be used, with the result that a compact and inexpensive apparatus has become possible. Since the luminance-signal modulated light and the chrominance-signal modulated light are optically combined in the projector apparatus, the image is not deformed in a trapezoidal shape, and it is unnecessary to adjust the angle of the projection lens each time the distance between the projector apparatus and the screen is changed, thereby making the handling convenient.

In addition to the above-described overall effects of the present invention seen from the overall perspective, a description will be given hereafter individually of the respective aspects of the invention in order.

The combination of the arbitrary set of mutually perpendicular polarized light beams and another set of linearly polarized light beams is made possible, so that the emergent light can be used as multifaceted information carrying means. For instance, time-axis multiplex processing is used for the optical system and the video signal system, it is possible to realize a projector apparatus for optically modulating two mutually perpendicular sets of polarized light beams on the basis of three-dimensional video signals (left and right video signals) so as to project a three-dimensional image.

Because an arbitrary set of mutually perpendicular polarized light beams of the emergent light from the natural light is utilized for the optical modulation of the luminance signal and the optical modulation of the chrominance signal, the brightness of the projected image can be substantially doubled as compared with the conventional TN-type liquid crystal system (including the polarization controlling system).

The first light distributing means and the first light combining means are used jointly by a single polarizing beam splitter, which is a reflection-type light modulating means having a high aperture ratio, so that it is possible to realize a projector apparatus in which the optical path length is the shortest, the projected image is bright, and the optical configuration is compact. A notable point is that the light which does not contribute to the image formation is returned to the projecting light source, and the light is effectively utilized. Since the respective means can be arranged compactly as a lamp unit (also serving as a heat radiating unit), a polarizing optical unit, a reflection-type liquid crystal unit, and a projection lens unit (see FIG. 30), the apparatus excels in the mass production and production efficiency.

In accordance with another configuration, since the video-signal light modulating means is of the transmission type in addition to the polarization controlling system for modulating the polarization state of the light, the overall operational mode can be used as either normally black or normally white operational mode by a simple minor change of the optical system. That is, the apparatus can be formed as a type in which emphasis is placed on the white balance of the projected image or a type in which emphasis is placed on the black level balance, to suit the taste.

In addition, if the apparatus is configured in such a manner that both modes of normally black and normally white are projected substantially simultaneously by using the, so to speak, dual feature of the operational mode, it is possible to realize a projector apparatus which simultaneously compensates for the drawbacks of the conventional liquid crystal projector which lacks either the balance as seen in pure white and pure white experienced in the past and the gradient (depth from the black level to the white level).

In accordance with another configuration of the invention, the arrangement provided is such that the polarized light which does not contribute to the image formation in the luminance-signal light modulating means or the chrominance-signal light modulating means is introduced to the chrominance-signal light modulating means or the luminance-signal light modulating means, so that the light is effectively utilized, and a brighter projected image is obtained.

In accordance with other configurations according to the invention, since the light-quantity distributing means is comprised of the polarization controlling means (with the light distributing means), of the emergent light from the light collecting means, the light is allotted without a loss in the total quantity of mutually perpendicular polarized light, and is distributed to the light modulating means for the respective signals. In other words, since the technological concept is used in which the ratio of the P waves and the S waves from the natural light is changed by effecting optical combination after one wave is recombined with another wave, a light-quantity distributing means in which the loss of light is small. As a result, the efficiency of the projector apparatus (particularly the optical efficiency and small heat generation) is enhanced.

Then, as the polarization controlling means, various configurations are adopted in which a polarizing beam splitter having different polarizing/separating characteristics is used, a phase difference means is used for causing a difference in the phase velocity of propagating polarized light and changing the polarization state, a difference in the angle of spatial combination of the polarizing optical means and the phase difference means is used, optical anisotropy of the optical rotatory power typically seen in liquid crystals is used, and a monochromatic panel with or without pixels as typically seen in liquid crystals is used. In conclusion, however, since the arrangement provided is such that the polarization controlling means is provided in part of the optical path, the distribution of the quantity of light with a minimum loss which makes it possible to readily arrange the polarization controlling means is made possible.

In accordance with another configuration of the invention, in particular, it is possible to make variable the ratio of the combination of the P waves and the S waves by making variable the angle of spacial combination of the phase difference means and the polarizing optical means, i.e., by simply rotating the phase difference means, so that the apparatus is suitable for mass production.

Because the so-called monochromatic liquid crystal panels are possibly used as the polarization controlling means, the polarization controlling means can be disposed before and after the optical path of the polarizing beam splitter, the fine adjustment of the control of the quantity of light can be can be electronically controlled including the control of distribution of light quantity over the entire cross section of the optical path, and that arrangement can be made low in cost. Namely, light-quantity control compatible with the polarization controlling means is made possible. In addition, high efficiency is attained for the liquid crystal projector apparatus using the polarization controlling system.

In accordance with other configurations of the invention, the usable wavelength ranges of the polarization optical means are allotted, and the polarizing optical means are hence provided with the polarizing/separating characteristics for the respective allotted wavelength ranges. The fact that the polarization optical means are provided with particular wavelength bands to obtain polarizing/separating characteristics means that the production cost of the polarization optical means is made low and that only particular wavelengths are transmitted or reflected, i.e., the light is separated into spectral components. This serves to prevent the mutual interference of light in the optical path, and the dichroic mirror serves to act in a complementary manner. Consequently, depending on the optical configuration, it is possible to realize a projector optical configuration which is low in cost and capable of projecting an image with an excellent tone of color, and in which the number of dichroic mirrors used is small.

In accordance with another configuration of the invention, a projected image in which green information of the natural world is expressed finely is reproduced.

In accordance with another configuration of the invention, the light which does not contribute to image formation is returned to the light collecting means. In other words, the efficiency of the light incident upon the light modulating means improves. There is an advantage in that the overall efficiency of the projector apparatus improves.

In accordance with other configurations of the invention, the invention is arranged such that respective optical systems corresponding to the luminance component (K component) of the video signals and the three kinds of chrominance components (C components) corresponding to the three primary colors are provided. New combinations between the optical systems and the video signal system (first, second, and third combinations) are made possible. For example, a projector apparatus having the following various characteristics is realized: the first combination gives the best tone of color, the third combination gives an excellent tone of color and is low in cost, and in the second combination the number of liquid crystal panels of the video-signal light modulating means is small.

As means for embodying the apparatus, the video-signal light modulating means is of the reflection type, and has the polarization optical means and optical elements, i.e., dichroic mirrors, which reflect or transmit specific wavelengths of light. When an image is displayed, this arrangement offers an important effect in which the apparatus is capable of coping with either operational mode of normally black or normally white. Thus, there is an effect in that a projected image matching the visual characteristics of a human being is reproduced, and the color information is made sufficiently bright.

In accordance with other configurations according to the invention, although one polarized light beam is fixedly set for the luminance component, while the other polarized light beam is fixedly set for the chrominance component, the optical path length is reduced most by an optical arrangement using the polarizing optical means and dichroic mirrors (36, 37) of a compact configuration, and the formation of a one-packet unit (e.g., FIG. 30) of the optical configuration is made possible.

A unit in which three primary color filters arranged integrally are used as the chrominance-signal light modulating means, the dichroic mirrors are made unnecessary, so that a liquid crystal projector having a simpler optical system is made possible.

In accordance with another configuration to the invention, it is possible to realize a low-cost projector apparatus using light modulating means of the polarization controlling system and of the transmission type. The apparatus is easily capable of coping with either operational mode of normally white and normally black.

This is one effect due to the fact that the first light distributing means and the first light combining means are provided independently. For example, since it is possible to cope with the two modes by simply changing only the arrangement of the first light combining means and the projecting means by 90°, if two optical systems are used in parallel, it is possible to obtain a projected image excelling in both the black level and the white balance.

In accordance with another configuration according to the invention, the video-signal light modulating means is comprised of only a set of respectively independent reflection-type light modulating means for the respective colors of R, G, and B corresponding to the three primary colors, and the polarized light which does not contribute to the image formation serves to return to the light collecting means by the reflecting means, so that the rate of effective utilization of the light is high. Hence, even if the luminance-signal light modulating means is not provided as in the case of the conventional liquid crystal projector, the projected image is bright.

In accordance with yet another configuration according to the invention, since the light modulating means is adaptive-type light modulating means which is adaptively changed over to the large pixel size or small pixel size of the light modulating means in correspondence with the levels of the primary colors of the video signals and the relative magnitude of the high-frequency components (high-frequency band components), even if the luminance-signal light modulating means is not provided, it is possible to reproduce a fine projected image. In a case where the luminance-signal light modulating means is provided, the optical modulation based on the video signals of the high-frequency components is made possible by the a fine pixel size for both the luminance-signal light modulating means and the chrominance-signal light modulating means, so that a more favorable projected image (having a high resolution) is made possible.

In accordance with still another configuration according to the invention, since two sets of independent light modulating means for the respective colors of R, G, and B are provided, a bright projected image is reproduced with high efficiency of light utilization. In particular, two sets of light modulation means may be used for right and left eyes, respectively, such that a low-cost projector apparatus for reproducing a three-dimensional image may be constructed.

In accordance with another configuration according to the invention, the polarization controlling system for controlling the modulation of the polarization state of light is used, and an arrangement is provided in which the processing of light, including the distribution of light, optical separation, optical modulation, and optical combination concerning the optical system, is carefully designed in correspondence with the signal processing of the chrominance component and the luminance component in the video signal system. The transmission type is used for all the four light modulating means, respectively.

Accordingly, new combinations between the optical system and the video signal processing system are made possible. In other words, the optical modulation corresponding to the high-frequency component of the video signals is executed by the luminance-signal light modulating means, while the optical modulation corresponding to the medium- and low-frequency components of the video signals is executed by the chrominance-signal light modulating means. Additionally, it becomes possible to provide signal processing for redistributing the brightness components to the luminance-signal light modulating means and the chrominance-signal light modulating means by tracing back to not only the control of light but also the distribution of the signals of brightness components of the video signals, i.e., by tracing back to video signal processing, such that the luminous fluxes of the modulated light from the two light modulating means become substantially equal in the respective input optical path cross sections of the first light combining means. Another advantage derived from this effect is that the amount of light which does not contribute to the image formation is actively made small. That is, high efficiency is attained.

In particular, if the configuration is provided as in the present invention such that a plurality of light modulating means including at least the luminance-signal light modulating means of the polarization controlling system and of the transmission type are provided, and the first light distributing means and the first light combining means are independently provided, the above-described novel technological concept in which the luminous fluxes of the two modulated light beams at the first light combining means are made equal becomes possible. As a consequence, it is possible to realize a liquid crystal projector apparatus for reproducing a bright projected image having an excellent tone of color and optimum efficiency. Additionally, the projected image has a high resolution.

In addition, the realization of such a projector apparatus is accelerated. In other words, since the first and second optical means are provided, it is possible to provide an optimum configuration (the identification of the two modulated light beams in the cross sections of the optical paths of the first light combining means and the effective minimization of the pixel size of the luminance light modulated light) by overriding the constraints (the aperture ratio and the pixel size) in the light of the devices of the respective modulating means.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. A projector apparatus including light source means for emitting white light, light collecting means for collecting emergent light from said light source means, video-signal light modulating means for subjecting emergent light from said light collecting means to optical modulation in accordance with inputted video signals, and projecting means for enlarging and projecting image light from said video-signal light modulating means onto a display screen, wherein said video-signal light modulating means comprises luminance-signal light modulating means and chrominance-signal light modulating means for modulating a polarization state of the light in accordance with a luminance signal and chrominance signals, respectively, of the inputted video signals, said projector apparatus comprising:

first light distributing means for distributing the emergent light from said light collecting means to said luminance-signal light modulating means and said chrominance-signal light modulating means; and first light combining means for combining modulated light beams from said luminance-signal light modulating means and said chrominance-signal light modulating means, wherein said first light distributing means and said first light combining means are constituted of polarizing optical means for separating natural light into polarized light beams of a plurality of polarization states or combining the light beams of the plurality of polarization states, and wherein said luminance-signal light modulating means and said chrominance-signal light modulating means are constituted of transmission-type light modulating means or reflection-type light modulating means, and wherein a component, not contributing to image formation, of light transmitted through or reflected by said luminance-signal light modulating means or said chrominance-signal light modulating means is guided to at least one of said chrominance-signal light modulating means and said luminance-signal light modulating means by using second light distributing means constituted of polarizing optical means.

2. A projector apparatus including light source means for emitting white light, light collecting means for collecting emergent light from said light source means, video-signal light modulating means for subjecting emergent light from said light collecting means to optical modulation in accordance with inputted video signals, and projecting means for enlarging and protecting image light from said video-signal light modulating means onto a display screen, wherein said video-signal light modulating means comprises luminance-signal light modulating means and chrominance-signal light modulating means for modulating a polarization state of the light in accordance with a luminance signal and chrominance signals, respectively, of the inputted video signals, said projector apparatus comprising:

first light distributing means for distributing the emergent light from said light collecting means to said luminance-signal light modulating means and chrominance-signal light modulating means; and first light combining means for combining modulated light beams from said luminance-signal light modulating means and said chrominance-signal light modulating means, wherein said first light distributing means and said first light combining means are constituted of polarizing optical means for separating natural light into polarized light beams of a plurality of polarization states or combining the light beams of the plurality of polarization states, wherein said luminance-signal light modulating means and said chrominance-signal light modulating means are constituted of reflection-type light modulating means, and said first light distributing means and said first light combining means are constituted of a single polarizing optical means.

3. The projector apparatus according to claim 1, wherein said luminance-signal light modulating means and said chrominance-signal light modulating means are constituted of transmission-type light modulating means.

4. A projector apparatus including light source means for emitting white light, light collecting means for collecting emergent light from said light source means, video-signal light modulating means for subjecting emergent light from said light collecting means to optical modulation in accordance with inputted video signals, and projecting means for enlarging and projecting image light from said video-signal light modulating means onto a display screen, wherein said video-signal light modulating means comprises luminance-signal light modulating means and chrominance-signal light modulating means for modulating a polarization state of the light in accordance with a luminance signal and chrominance signals, respectively, of the inputted video signals, said projector apparatus comprising:

first light distributing means for distributing the emergent light from said light collecting means to said luminance-signal light modulating means and chrominance-signal light modulating means;

first light combining means for combining modulated light beams from said luminance-signal light modulating means and said chrominance-signal light modulating means, wherein said first light distributing means and said first light combining means are constituted of polarizing optical means for separating natural light into orthogonally polarized light beams or combining the orthogonally polarized light beams; and polarization control means for controlling a ratio between quantities of the orthogonally polarized light beams distributed to said luminance-signal light modulating means and said chrominance-signal light modulating means.

5. The projector apparatus according to claim 4, wherein said polarization control means comprises polarizing optical means for polarizing natural light into orthogonally polarized light beams with different polarization light separating characteristics, and means for changing a polarization direction of at least one of the orthogonally polarized light beams to a different polarization direction different than another one of the orthogonally polarized light beams.

6. The projector apparatus according to claim 5, wherein said means for changing a polarization direction is constituted of phase difference means having a medium for causing a difference in a phase velocity of propagating polarized light to change its polarization state.

7. The projector apparatus according to claim 4, wherein said polarization controlling means comprises phase difference means having a medium for causing a difference in a phase velocity of propagating polarized light to change its polarization state, and polarizing optical means for separating natural light into orthogonally polarized light beams, and wherein said phase difference means and said polarizing optical means are arranged in series to form means for changing polarization light separating characteristics in accordance with a relationship between spatial polarizing orientations thereof.

8. The projector apparatus according to claim 4, wherein said polarization controlling means is constituted of means having an anisotropically polarizing, rotatory medium capable of changing a ratio between quantities of orthogonally polarized light beams.

9. The projector apparatus according to claim 4, wherein said polarization controlling means is constituted of a panel with pixels having an anisotropically polarizing, rotatory medium capable of converting a P wave and an S wave into an S wave and a P wave, respectively while changing a ratio between quantities thereof.

10. The projector apparatus according to claim 4, wherein said polarization controlling means is constituted of a panel without pixels having an anisotropically polarizing, rotatory medium capable of converting a P wave and an S wave into an S wave and a P wave, respectively while changing a ratio between quantities thereof.

11. A projector apparatus including light source means for emitting white light, light collecting means for collecting emergent light from said light source means, video-signal light modulating means for subjecting emergent light from said light collecting means to optical modulation in accordance with inputted video signals, and projecting means for enlarging and projecting image light from said video-signal light modulating means onto a display screen, wherein said video-signal light modulating means comprises luminance-signal light modulating means and chrominance-signal light modulating means for modulating a polarization state of the light in accordance with a luminance signal and chrominance signals, respectively, of the inputted video signals, said projector apparatus comprising:

first light distributing means for distributing the emergent light from said light collecting means to said luminance-signal light modulating means and chrominance-signal light modulating means; and first light combining means for combining modulated light beams from said luminance-signal light modulating means and said chrominance-signal light modulating means, wherein said first light distributing means and said first light combining means are constituted of polarizing optical means for separating natural light into orthogonally polarized light beams or combining the orthogonally polarized light beams, wherein the polarizing optical means includes a plurality of polarizing optical means for separating natural light into orthogonally polarized light beams that are disposed at said polarization controlling means and said first light distributing means such that a combination of the polarizing optical means is used for each of a plurality of wavelength ranges.

12. The projector apparatus according to claim 11, wherein the plurality of wavelength ranges are one of following groups (1) to (4):

group (1): approximately 400 nm to 650 nm and approximately 550 to 800 nm;

group (2): approximately 400 nm to 500 nm and approximately 450 to 800 nm;

group (3): approximately 400 nm to 550 nm, approximately 450 to 600 nm, and approximately 550 nm to 800 nm; and group (4): approximately 400 nm to 550 nm, approximately 450 to 600 nm, and approximately 550 nm to 700 nm.

13. The projector apparatus according to claim 1 wherein said first light distributing means, said first light combining means, and said second light distributing means are integrally formed as single polarizing optical means.

14. The projector apparatus according to claim 1 wherein said first light distributing means and said first light combining means are integrally formed as single polarizing optical means.

* * * * *